US011351745B2

(12) United States Patent
Buoni

(10) Patent No.: US 11,351,745 B2
(45) Date of Patent: Jun. 7, 2022

(54) MICROPRISMATIC RETROREFLECTIVE MOLD, SHEET, AND ARTICLE AND METHODS OF MANUFACTURE THEREOF

(71) Applicant: Aura Optical Systems, LP, Fort Worth, TX (US)

(72) Inventor: Drew J. Buoni, Fort Worth, TX (US)

(73) Assignee: Aura Optical Systems, LP, Fort Worth, TX (US)

(*) Notice: Subject to any disclaimer, the term of this patent is extended or adjusted under 35 U.S.C. 154(b) by 0 days.

(21) Appl. No.: 17/298,821

(22) PCT Filed: Sep. 28, 2020

(86) PCT No.: PCT/US2020/053048
§ 371 (c)(1),
(2) Date: Jun. 1, 2021

(87) PCT Pub. No.: WO2022/046134
PCT Pub. Date: Mar. 3, 2022

(65) Prior Publication Data
US 2022/0063219 A1    Mar. 3, 2022

Related U.S. Application Data

(60) Provisional application No. 63/071,172, filed on Aug. 27, 2020.

(51) Int. Cl.
*G02B 5/124* (2006.01)
*B29D 11/00* (2006.01)

(52) U.S. Cl.
CPC ........ *B29D 11/00625* (2013.01); *G02B 5/124* (2013.01)

(58) Field of Classification Search
CPC ... B29D 11/00625; G02B 5/124; G02B 5/126
See application file for complete search history.

(56) References Cited

U.S. PATENT DOCUMENTS

| 835,648 A | 11/1906 | Straubel |
| 1,591,572 A | 7/1926 | Stimson |

(Continued)

FOREIGN PATENT DOCUMENTS

| CN | 209150134 U | 7/2019 |
| DE | 4236799 A1 | 5/1994 |

(Continued)

OTHER PUBLICATIONS

Eckhardt; "Simple Model of Corner Reflector Phenomena"; Applied Optics; vol. 10, No. 7; Jul. 1971; 8 pgs.

*Primary Examiner* — Timothy Kennedy
*Assistant Examiner* — Alexander A Wang
(74) *Attorney, Agent, or Firm* — Parker Justiss, P.C.

(57) ABSTRACT

Method of manufacturing articles, including providing a substrate having a surface, forming first and second sets of first and second grooves in the surface, respectively, the first grooves parallel to each other along a same first direction across the surface and each of the first grooves including a repeating interleaved pattern of at least two first zones and at least two second zones and a maximum depth of the first zones greater than a maximum depth of the second zones, and the second grooves parallel to each other along a same second direction across the surface, the second direction being substantially perpendicular to the first direction, the second grooves passing through second zones of the first grooves, where a groove pattern is thereby formed on the surface, the groove pattern including microprisms. Articles including a substrate surface with such groove patterns or inverted groove patterns including microprisms or inverted microprisms.

15 Claims, 47 Drawing Sheets

(56) References Cited

U.S. PATENT DOCUMENTS

| | | |
|---|---|---|
| 3,541,606 A | 11/1970 | Heenan et al. |
| 3,632,695 A | 1/1972 | Howell |
| 3,689,346 A | 9/1972 | Rowland |
| 3,712,706 A | 1/1973 | Stamm |
| 3,926,402 A | 12/1975 | Heenan |
| 4,025,159 A | 5/1977 | McGrath |
| 4,244,683 A | 1/1981 | Rowland |
| 4,486,363 A | 12/1984 | Pricone et al. |
| 4,588,258 A | 5/1986 | Hoopman |
| 4,775,219 A | 10/1988 | Appeldorn et al. |
| 4,938,563 A | 7/1990 | Nelson et al. |
| 5,156,863 A | 10/1992 | Pricone et al. |
| 5,450,235 A | 9/1995 | Smith et al. |
| 5,557,836 A | 9/1996 | Smith et al. |
| 5,585,164 A | 12/1996 | Smith et al. |
| 5,706,132 A | 1/1998 | Nestegard et al. |
| 5,734,501 A | 3/1998 | Smith |
| 5,759,468 A | 6/1998 | Smith et al. |
| 5,764,413 A | 6/1998 | Smith et al. |
| 5,822,121 A | 10/1998 | Smith et al. |
| 5,898,523 A | 4/1999 | Smith et al. |
| 5,945,042 A | 8/1999 | Minura et al. |
| 5,959,774 A | 9/1999 | Benson et al. |
| 5,981,032 A | 11/1999 | Smith et al. |
| 6,010,609 A | 1/2000 | Mimura et al. |
| 6,015,214 A | 1/2000 | Heenan et al. |
| 6,021,559 A | 2/2000 | Smith |
| 6,036,322 A | 3/2000 | Nilsen et al. |
| 6,083,607 A | 7/2000 | Mimura et al. |
| 6,114,009 A | 9/2000 | Smith |
| 6,120,881 A | 9/2000 | Smith et al. |
| 6,136,416 A | 10/2000 | Smith et al. |
| 6,253,442 B1 | 7/2001 | Benson et al. |
| 6,257,860 B1 | 7/2001 | Luttrell et al. |
| 6,302,992 B1 | 10/2001 | Smith et al. |
| 6,318,866 B1 | 11/2001 | Mimura et al. |
| 6,318,987 B1 | 11/2001 | Luttrell et al. |
| 6,375,776 B1 | 4/2002 | Buoni et al. |
| 6,386,855 B1 | 5/2002 | Luttrell et al. |
| 6,390,629 B1 | 5/2002 | Mumura et al. |
| 6,533,887 B1 | 3/2003 | Smith et al. |
| 6,540,367 B1 | 4/2003 | Benson et al. |
| 6,767,102 B1 | 7/2004 | Heenan et al. |
| 6,802,616 B2 | 10/2004 | Mumura |
| 6,883,921 B2 | 4/2005 | Mumura et al. |
| 6,884,371 B2 | 4/2005 | Smith |
| 6,984,047 B2 | 1/2006 | Couzin et al. |
| 7,074,463 B2 | 7/2006 | Jones et al. |
| 7,152,983 B2 | 12/2006 | Smith |
| 7,156,527 B2 | 1/2007 | Smith |
| 7,174,619 B2 | 2/2007 | Smeenk et al. |
| 7,188,960 B2 | 3/2007 | Smith |
| 7,261,424 B2 | 8/2007 | Smith |
| 7,261,425 B2 | 8/2007 | Benson et al. |
| 7,261,426 B2 | 8/2007 | Smith |
| 7,309,135 B2 | 12/2007 | Smith |
| 7,329,012 B2 | 2/2008 | Smith |
| 7,384,161 B2 | 6/2008 | Benson et al. |
| 7,401,396 B2 | 7/2008 | Smeenk et al. |
| RE40,455 E | 8/2008 | Heenan et al. |
| 7,422,334 B2 | 9/2008 | Smith |
| 7,427,139 B2 | 9/2008 | Couzin et al. |
| 7,458,694 B2 | 12/2008 | Smith |
| 7,556,386 B2 | 7/2009 | Smith |
| 7,562,991 B2 | 7/2009 | Benson et al. |
| 7,712,904 B2 | 5/2010 | Benson et al. |
| 7,722,197 B2 | 5/2010 | Smith |
| 7,744,228 B2 | 6/2010 | Smith |
| 7,815,319 B2 | 10/2010 | Mimura |
| 7,943,206 B2 | 5/2011 | Jones et al. |
| 7,950,813 B2 | 5/2011 | Mimura |
| 8,016,435 B2 | 9/2011 | Smith |
| 8,201,953 B2 | 6/2012 | Mimura |
| 8,226,880 B2 | 7/2012 | Pricone |
| 8,251,525 B2 | 8/2012 | Smith |
| 8,262,237 B2 | 9/2012 | Smith |
| 8,388,154 B2 | 3/2013 | Mimura et al. |
| 8,419,197 B2 | 4/2013 | Smith |
| 8,485,672 B2 | 7/2013 | Benson et al. |
| 8,573,789 B2 | 11/2013 | Smith |
| 8,596,800 B2 | 12/2013 | Smith |
| 8,708,504 B2 | 4/2014 | Smith |
| 8,714,757 B1 | 5/2014 | Smith |
| 8,851,686 B2 | 10/2014 | Smith |
| 8,998,428 B2 | 4/2015 | Smith |
| 9,188,715 B2 | 11/2015 | Smith |
| 9,465,147 B2 | 10/2016 | Smith |
| 9,470,822 B2 | 10/2016 | Smith |
| 9,724,882 B2 | 8/2017 | Smith |
| 10,101,509 B2 | 10/2018 | Smith |
| 10,495,792 B2 | 12/2019 | Smith |
| 10,502,875 B2 | 12/2019 | Smith et al. |
| 10,562,249 B2 | 2/2020 | Smith |
| 2005/0018292 A1* | 1/2005 | Mimura ............ G02B 5/124 359/529 |
| 2006/0007543 A1 | 1/2006 | Couzin et al. |
| 2014/0036367 A1 | 2/2014 | Smith |
| 2015/0355393 A1 | 12/2015 | Lu et al. |

FOREIGN PATENT DOCUMENTS

| | | |
|---|---|---|
| DE | 4410994 A1 | 10/1995 |
| EP | 1424572 B1 | 10/2006 |
| EP | 2442148 B1 | 6/2016 |
| EP | 2442144 B1 | 10/2016 |
| EP | 2442143 B1 | 11/2016 |
| EP | 2442145 B1 | 11/2016 |
| EP | 2442147 B1 | 4/2017 |
| WO | 03104858 A1 | 12/2003 |

\* cited by examiner

MICROPRISMATIC RETROREFLECTIVE MOLD, SHEET, AND ARTICLE AND METHODS OF MANUFACTURE THEREOF

CROSS-REFERENCE TO RELATED APPLICATION

This application is the National Stage of, and therefore claims the benefit of, International Application No. PCT/US2020/053048 filed on Sep. 28, 2020, entitled "MICROPRISMATIC RETROREFLECTIVE MOLD, SHEET, AND ARTICLE AND METHODS OF MANUFACTURE THEREOF," which claims priority to U.S. Provisional Application Ser. No. 63/071,172, filed on Aug. 27, 2020, and entitled "MICROPRISMATIC RETROREFLECTIVE MOLD, SHEET, AND ARTICLE AND METHODS OF MANUFACTURE THEREOF," which is commonly assigned with this application and incorporated herein by reference in its entirety.

TECHNICAL FIELD

This application is directed, in general, to microprismatic retroreflective material and, more specifically, to articles of molds and sheets, for retroreflective films and methods of manufacture thereof.

BACKGROUND

Microprismatic cube corner retroreflective articles having reduced inactive area (RIA) microprisms (which are also known as full cube or preferred geometry microprisms) are used in traffic signing, vehicle number plates, safety signing, vehicle markings, and many other applications. Although such articles, due to the presence of the RIA microprisms, can have high levels of retroreflection, producing a master mold for their manufacture can be costly and difficult to machine.

SUMMARY

One embodiment of the disclosure is a method including manufacturing an article. The method can include providing a substrate having a surface, forming a first set of first grooves in the surface and forming a second set of second grooves in the surface. The first grooves can be parallel to each other along a same first direction across the surface and each of the first grooves can include a repeating interleaved pattern of at least two first zones and at least two second zones. A maximum depth $Z_T$ of the first zones can be greater than a maximum depth $Z_S$ of the second zones. The second grooves can be parallel to each other along a same second direction across the surface, the second direction being substantially perpendicular to the first direction. The second grooves pass through second zones of the first grooves, where a groove pattern is thereby formed on the surface, the groove pattern including microprisms.

In some embodiments, the providing of the substrate can include providing a monolithic block substrate. In some such embodiments, the article can be configured as a master mold. Any such embodiments can further include forming a replicate article, using the article configured as a master mold, the replicate article having an inverted copy of the grooved pattern on a surface of a replicate substrate of the replicate article.

In any such embodiments, the forming of the first zones of the first grooves can include moving a first cutting tool through the surface in a repeating rising and diving motion along a third direction and the moving can also be along the first direction, where the third direction is perpendicular to the first direction and to the second direction.

In any such embodiments, the forming of the first zones of the first grooves can include forming a dive section and a rise section. In some such embodiments, the dive section can be formed at a dive angle, α, having a value in a range from about 5° to about 50° and the rise section 269 can formed at a rise angle, β, having a value in a range from about 5° to about 50°. In some such embodiments, the dive angle, α, can be about equal to the rise angle, β. In some such embodiments, the dive angle, α, can be within 1° of the rise angle, β. In some such embodiments, the dive angle, α, can have a value in a range from about 5.26° to about 35.25° or in a range from about 18.26° to about 32.26°. In some such embodiments, forming of the first zones of the first grooves can include forming a transition section located between the dive section and the rise section. In some such embodiments, the transition section can include a curved surface located along a groove base surface of the first groove. In some such embodiments, the curved surface can have a radius in a range from about 1 micron to about 50 microns, a range from 1 micron to about 25 microns, or a range from about 1 micron to about 10 microns. In some such embodiments, the first grooves can have a V-shape with a constant vertical included angle, θ. In some such embodiments, the constant vertical included angle, θ, can be a value in a range from about 65° to about 90°, a range from about 78.47° to about 90° or a range from about 80° to about 87°.

In any such embodiments, the maximum depth $Z_T$ of the first zones of the first grooves can be a value in a range from about 10 microns to about 1000 microns or in a range from about 20 microns to about 250 microns. In any such embodiments, the forming of the first set of the first grooves can include using a first cutting tool having a first cutting angle θ, and, the forming of the second set of the second grooves can include using a second cutting tool having a second cutting angle φ, wherein the value of the first cutting angle θ is different than value of the second cutting angle φ.

In any such embodiments, the forming of the second set of the second grooves can include removing at least portions of the second zones of the first grooves.

In some such embodiments, the maximum depth, $Z_C$, of each of the second grooves can be substantially a same depth as each other. In some such embodiments, the maximum depth of $Z_C$ of the second grooves can be greater than the maximum depth $Z_T$ of the first zones of the first grooves. In some such embodiments, the maximum depth, $Z_C$, of the second grooves can be less than the maximum depth $Z_T$ of the first zones of the first grooves.

In any such embodiments, the forming of the first set of the first grooves can include forming at least a first subset of first subset grooves and a second subset of second subset grooves, where the first subset grooves can have a constant vertical included angle, $\theta_A$, that can be greater than a constant vertical included angle, $\theta_B$, of the second subset grooves. In some such embodiments, the first subset grooves can alternate with the second subset grooves across the top surface in the second direction. In some such embodiments, the first subset grooves and the second subset grooves can be formed using two different cutting tools where each cutting tool can have a different cutting angle.

Another embodiment is an article including a substrate having a surface with a groove pattern including microprisms thereon. The groove pattern can include a first set of first grooves intersecting with a second set of second grooves. The first grooves can be parallel to each other along a same first direction across the groove pattern, and each of the first grooves can include a plurality of repeating variable depth zones. Each of the variable depth zones can include a dive section having a first maximum depth, $Z_{D2}$, and a rise section having a second maximum depth, $Z_{R2}$. The second grooves can be parallel to each other along a same second direction across the surface, the second direction being substantially perpendicular to the first direction.

In some embodiments, the first grooves can be V-shaped grooves and the second grooves can be V-shaped grooves. In some embodiments, the microprisms can be reduced inactive area microprisms.

In some embodiments, the substrate can be a monolithic block substrate. In some such embodiments, the article can be configured as a master mold. In some such embodiments, the article can be configured as a cylindrical tooling.

In some embodiments, each of the variable depth zones can include a transition section located between the dive sections and the rise section. In some such embodiments, the transition section can include a continuous surface transition between the dive sections and the rise sections. In some such embodiments, the transition section can include a transition exit, a transition entrance, and a third maximum depth, $Z_F$, there-between. In any such embodiments, the transition entrance can be adjacent to the dive section at the location of the first maximum depth, $Z_{D2}$, and the transition exit can be adjacent to the rise section at the location of the second maximum depth, $Z_{R2}$. In some such embodiments, the transition section can include a curved surface located along a groove base surface of the first groove. In some such embodiments, the curved surface can have a radius in a range from about 1 micron to about 50 microns, a range from 1 micron to about 25 microns, or a range from about 1 micron to about 10 microns.

In some embodiments, adjacent pairs of microprisms can be arranged as symmetrically opposite matched pairs of microprisms.

In some embodiments, the first grooves can have a V-shape with a constant vertical included angle, $\theta$. In some such embodiments, the constant vertical included angle, $\theta$, can be a value in a range from about 65° to about 90°, a range from about 78.47° to about 90°, or a range from about 80° to about 87°.

In any such embodiments, the first maximum depth, $Z_{D2}$, or the second maximum depth, $Z_{R2}$, of the first grooves can have a value in a range from about 10 microns to about 1000 microns or in a range from about 20 microns to about 250 microns. In some such embodiments, the third maximum depth, $Z_F$, of the first grooves can have a value in a range from about 10 microns to about 1000 microns or in a range from about 20 microns to about 250 microns.

In any such embodiments, the dive section can have a dive angle, $\alpha$, with a value in a range from about 5° to about 50°. In some such embodiments, the dive angle, $\alpha$, can have a value in a range from about 5.26° to about 35.25° or in a range from about 18.26° to about 32.26°.

In any such embodiments, the first set of first grooves can include at least a first subset of first subset grooves and a second subset of second subset grooves, where the first subset grooves can have a constant vertical included angle, $\theta_A$, that can be greater than the constant vertical included angle, $\theta_B$, of the second subset grooves 214B. In some such embodiments, the first groove subset can alternate with the second groove subset across the top surface in the second direction. In any such embodiments, a quaternary set of microprisms can be arranged as a quaternary set of symmetrically opposite matched microprisms. In any such embodiments, the first subset grooves and second subset grooves can each include a transition section located between the dive section and rise section, where the transition section can include a transition entrance, a transition exit, and a third maximum depth, $Z_{FA}$ and $Z_{FB}$, respectively. In some such embodiments, the third maximum depth, $Z_{FA}$, of the first subset grooves can be greater than the third maximum depth, $Z_{FB}$, of the second subset grooves.

In some embodiments, each of the second grooves can have substantially a same maximum depth, $Z_C$ as each other. In some such embodiments, the maximum depth, $Z_C$, of each of the second grooves can be greater than the third maximum depth, $Z_F$, of the transition section. In some such embodiments, the maximum depth, $Z_C$, of each of the second grooves can be less than the third maximum depth, $Z_F$, of the transition section.

In any such embodiment, the substrate can be a polymeric film. In any such embodiments, the article can be configured as a retroreflective sheeting.

Another embodiment is an article including a transparent sheet. The transparent sheet can have a first side with a structured surface. The structured surface can include microprisms thereon, the microprisms being part of a microprism array on the structured surface. Each one of the microprisms can be part of adjacent pairs of the microprisms. For each one of the adjacent pairs: the first microprism can have a first lateral face, a second lateral face, and a third lateral face, the second microprism has a first lateral face, a second lateral face, and a third lateral face, and there can be a continuous surface transition between the second lateral face of the first microprism and the third lateral face of the second microprism.

In some embodiments, the transparent sheet can include a second side opposite the first side, the second side having a substantially smooth and planar second surface. In any such embodiments, the thickness of the transparent sheet from the apex of the microprisms on the structured surface to the opposite surface can have a value in the range from about 50 microns to about 1000 microns. In some embodiments, the microprisms can be reduced inactive area microprisms. In any such embodiments, the microprisms of adjacent pairs can be arranged as symmetrically opposite matched pairs of microprisms. In any such embodiments, the first microprism can be a mirror image of the second microprism.

In some embodiments, each of the lateral faces of each microprism can be angularly aligned relative to the second surface. The inclination angle ε for each of the lateral faces can be a value in a range from about 5° to about 50°.

In some embodiments, the continuous surface transition can include a curved surface. In some such embodiments, the curved surface can have a radius in a range from about 1 micron to about 50 microns, a range from 1 micron to about 25 microns, or a range from about 1 micron to about 10 microns.

In some embodiments, the microprisms can be configured as one of backwards-tilted, forward-tilted, or equilateral microprisms. In some embodiments, the microprisms can be configured as sideways-tilted.

In some embodiments, the surface of area of each second lateral face and the surface area of each third lateral face can be about equal to each other.

In some embodiments, two adjacent pairs of microprisms can form a quaternary set of symmetrically opposite microprisms. The quaternary set can include the first microprism, the second microprism, a third microprism, and a fourth microprism. The third microprism has a first lateral face, a second lateral face, and a third lateral face, and the fourth microprism has a first lateral face, a second lateral face, and a third lateral face, and there can be a continuous surface transition between the second lateral face of the third microprism and the third lateral face of the fourth microprism. In some such embodiments, the surface area of the second lateral face of the third microprism and the surface area of the third lateral face of the fourth microprism can be about equal to each other, and the surface area of the second lateral face of the third microprism and the surface area of the third lateral face of the third microprism cannot be equal to each other. In some such embodiments, the first microprism can be a mirror image of the third microprism, and the third microprism can be a mirror image of the fourth microprism.

Another embodiment is another article including a substrate having a structured surface. The structured surface can include an array of microprisms thereon, the microprisms being part of the microprism array on the structured surface. The microprism array can include a first microprism subarray and a second microprism subarray. The first microprism subarray can include a first microprism and a second microprism, the first microprism having a first lateral face, a second lateral face, and a third lateral face and the second microprism having a first lateral face, a second lateral face, and a third lateral face. There can be a continuous surface transition between the second lateral face of the first microprism and the third lateral face of the second microprism. The second microprism subarray includes a third microprism and a fourth microprism, the third microprism having a first lateral face, a second lateral face, and a third lateral face, the fourth microprism having a first lateral face, a second lateral face, and a third lateral face. There can be a continuous surface transition between the second lateral face of the third microprism and the third lateral face of the fourth microprism 410D. An inclination angle $\varepsilon_{1A}$ of the first lateral face of the first microprism can be greater than an inclination angle $\varepsilon_{1C}$ of the first lateral face of the third microprism.

In some embodiments, the first microprism can be a mirror image of the second microprism and the third microprism can be a mirror image of the fourth microprism. In some embodiments, the microprisms can be reduced inactive area microprisms.

In some embodiments, the inclination angle $\varepsilon_{1A}$ of the first lateral face of the first microprism and the inclination angle $\varepsilon_{1C}$ of the first lateral face of the third microprism can both have a value in a range from about 5° to about 50°, in a range from about 5° to about 35°, or in a range from about 18° to about 32°. In some such embodiments, the inclination angle $\varepsilon_{1A}$ of the first lateral face of the first microprism can be at least 2° greater than the inclination angle $\varepsilon_{1C}$ of the first lateral face of the third microprism. In some such embodiments, the inclination angle $\varepsilon_{1A}$ of the first lateral face of the first microprism can be at least 5° greater than the inclination angle $\varepsilon_{1C}$ of the first lateral face of the third microprism.

In some embodiments, each of the first microprism subarrays can consist of the first microprism and the second microprism. Each of the second microprism subarrays can consist of the third microprism and the fourth microprism. In any such embodiments, the first subarray and second subarray can be arranged in an alternating pattern across the structured surface. In any such embodiments, each first subarray can include a first row of pairs of the first microprisms and second microprisms that are mirror images of each other, and each second subarray can include a second row of pairs of the third microprisms and fourth microprisms that are mirror images of each other.

In any such embodiments, the microprisms can be configured as one of backwards-tilted, forward-tilted, or equilateral microprisms. In some such embodiments, each of first and second microprisms of the first subarrays can be arranged as adjacent pairs of symmetrically opposite matched pairs of microprisms, and each of third and fourth microprisms of the second subarrays can be arranged as adjacent pairs of symmetrically opposite matched pairs of microprisms.

In any such embodiments, the continuous surface transition can include a curved surface. In some such embodiments, the curved surface can have a radius in a range from about 1 micron to about 50 microns, a range from 1 micron to about 25 microns, or a range from about 1 micron to about 10 microns.

In some embodiments, a height $h_A$ of the first microprism can be different than the height $h_C$ of the third microprism. In any such embodiments, the difference between the height $h_A$ and the height $h_C$ can be greater than about 25 microns. In some embodiments, the maximum depth $Z_{FA}$ of the microprisms of the first subarray can be different than the maximum depth $Z_{FB}$ of the microprisms of the second subarray. In any such embodiments, the difference between the maximum depth $Z_{FA}$ and the maximum depth $Z_{FB}$ can be greater than about 25 microns.

In some embodiments, the substrate can be a monolithic block substrate. In some such embodiments, the article can be configured as a master mold. In some embodiments, the substrate can be a polymeric film. In any such embodiments, the article can be configured as a retroreflective sheeting.

Another embodiment is still another article including a substrate having a surface with a groove pattern including slightly non-orthogonal microprisms thereon. The groove pattern can include a first set of first grooves intersecting with a second set of second grooves. The first grooves can be parallel to each other along a same first direction across the groove pattern, and each of the first grooves can include a set of variable depth zones. Each of the variable depth zones can include: a dive section having a first minimum depth $Z_{D1}$, a first maximum depth $Z_{D2}$, and a first horizontal distance $X_D$, a rise section having a second minimum depth $Z_{R1}$, a second maximum depth $Z_{R2}$, and a second horizontal distance $X_R$, and a transition section having a transition entrance, a transition exit, and a third maximum depth $Z_F$, where the third maximum depth $Z_F$ can be greater than both the first minimum depth $Z_{D1}$ and the second minimum depth $Z_{R1}$. The second grooves can be parallel to each other along a same second direction across the surface. The first direction being substantially perpendicular to the first direction.

In some embodiments, the first horizontal distance $X_D$ can be less than the second horizontal distance $X_R$. In some such embodiments, a difference between the first horizontal distance $X_D$ and the second horizontal distance $X_R$ can be a value between about 1 micron and 15 microns. In some embodiments, the dive section has a dive angle $\alpha$, the rise section has a rise angle $\beta$, and the dive angle $\alpha$ can differ from the rise angle $\beta$ by about 0.25° to about 1.0°. In any such embodiments, the rise angle $\alpha$ can have a value in a range from about 5° to about 50°. In some embodiments, the dive section can have a dive angle $\alpha$ which is less than a corresponding angle of orthogonality by about 0.25° to about 1.0°, and the rise section can have a rise angle $\beta$ which is greater than a corresponding angle of orthogonality by about 0.25° to about 1.0°.

In some embodiments, the set of variable depth zones can include two or more subsets of variable depth zones, including a first subset and a second subset. The variable depth zones of the first subset can include a first dive section, a first rise section, and a first transition section located between the first dive section and the first rise section, and the first dive angle $\alpha_A$ can be about equal to the first rise angle $\beta_A$. The variable depth zones of the second subset can include a second dive section, a second rise section, and a second transition section located between the second dive section and the second rise section, and the second dive angle $\alpha_B$ differs from the second rise angle $\beta_B$ by about 0.25° to about 1.0°. In some such embodiments, the variable depth zones of the first subset and the variable depth zones of the second subset can be arranged in an alternating pattern along the first direction of the first grooves.

In some embodiments, the first grooves can have a constant vertical included angle $\theta$ that differs from a corresponding angle of orthogonality by about 0.25° to about 1.0°. In some embodiments, the first grooves can have a constant vertical included angle $\theta$ that is non-symmetrical relative to the groove base of the first grooves. In any such embodiments, the first grooves can have a constant vertical included angle $\theta$ between about 65° to about 90°.

In some embodiments, the first grooves can have a constant vertical included angle $\theta$ consisting of two half angles $\delta 1$ and $\delta 2$. The first half angle $\delta 1$ can be greater than the second half angle $\delta 2$ by about 0.25° to about 1.0°. In some such embodiments, the first grooves can have a constant vertical included angle $\theta$ consisting of two half angles $\delta 1$ and $\delta 2$. The first half angle $\delta 1$ can be less than a corresponding angle of orthogonality by about 0.25° to about 1.0°, and the second half angle $\delta 2$ can be greater than a corresponding angle of orthogonality by about 0.25° to about 1.0°.

In some embodiments, the first set of first grooves can include two or more subsets, including a first subset of the first grooves having a first constant vertical included angle $\theta_A$ and a second subset of the first grooves having a second constant vertical included angle $\theta_B$. The first constant vertical included angle $\theta_A$ can be symmetrical about a groove base of the first grooves of the first subset, and the second constant vertical included angle $\theta_A$ can be non-symmetrical about a groove base of the first grooves of the second subset by about 0.25° to about 1.0°. In any such embodiments, the first grooves of the first subset and the first grooves of the second subset can be arranged in an alternating pattern across the groove pattern.

In some embodiments, the first set of first grooves can include two or more subsets, including a first subset of the first grooves having a first constant vertical included angle $\theta_A$ consisting of two half angles $\delta_{A1}$ and $\delta_{A2}$ and a second subset of the first grooves having a second constant vertical included angle $\theta_B$ consisting of two half angles $\delta_{B1}$ and $\delta_{B2}$. The first half angle $\delta_{A1}$ of the first constant vertical included angle $\theta_A$ can be less than a corresponding angle of orthogonality by about 0.25° to about 1.0°, and the second half angle $\delta_{A2}$ of the first constant vertical included angle $\theta_A$ can be greater than a corresponding angle of orthogonality by about 0.25° to about 1.0°. The first half angle $\delta_{B1}$ of the second constant vertical included angle $\theta_B$ can be greater than a corresponding angle of orthogonality by about 0.25° to about 1.0°, and the second half angle $\delta_{B2}$ of the second constant vertical included angle $\theta_B$ can be less than a corresponding angle of orthogonality by about 0.25° to about 1.0°. In any such embodiments, the first grooves of the first subset and the first grooves of the second subset can be arranged in an alternating pattern across the groove pattern. In any such embodiments, the first set of first grooves can include a third subset of first grooves having a third constant vertical included angle $\theta_C$. The third constant vertical included angle $\theta_C$ can be symmetrical about a groove base of the first grooves of the third subset. In any such embodiments, the third constant vertical included angle $\theta_C$ can be about equal to a corresponding angle of orthogonality. In any such embodiments, the first grooves of the first subset, the first grooves of the second subset, and the first grooves of the third subset can be arranged in an repeating pattern across the groove pattern.

In some embodiments, the second grooves can have a constant vertical included angle $\phi$ that is non-symmetrical relative to a groove base of the second grooves. In some such embodiments, the second grooves can have a constant vertical included angle $\phi$ between about 10° and about 100°. In any such embodiments, the second grooves can have a constant vertical included angle $\phi$ that differs from a corresponding angle of orthogonality by about 0.25° to about 1.0°.

In some embodiments, the second grooves can have a constant vertical included angle $\phi$ consisting of two half angles $\rho 1$ and $\rho 2$. The first half angle $\rho 1$ can be greater than the second half angle $\rho 2$ by about 0.25° to about 1.0°.

In some embodiments, the second grooves can have a constant vertical included angle $\phi$ consisting of two half angles $\rho 1$ and $\rho 2$. The first half angle $\rho 1$ can be greater than a corresponding angle of orthogonality by about 0.25° to about 1.0°, and the second half angle $\rho 2$ can be less than a corresponding angle of orthogonality by about 0.25° to about 1.0°.

In some embodiments, the second set of second grooves can include a first subset of second grooves having a first constant vertical included angle $\phi_A$ consisting of two half angles $\rho 1_A$ and $\rho 2_A$ and a second subset of second grooves having a second constant vertical included angle $\phi_B$ consisting of two half angles $\rho 1_B$ and $\rho 2_B$. The first half angle $\rho 1_A$ of the first constant vertical included angle $\phi_A$ can be less than a corresponding angle of orthogonality by about 0.25° to about 1.0°, and the second half angle $\rho 2_A$ of the first constant vertical included angle $\phi_A$ can be greater than a corresponding angle of orthogonality by about 0.25° to about 1.0°. The first half angle $\rho 1_B$ of the second constant vertical included angle $\phi_B$ can be greater than a corresponding angle of orthogonality by about 0.25° to about 1.0°, and the second half angle $\rho 2_B$ of the second constant vertical included angle $\phi_B$ can be less than a corresponding angle of orthogonality by about 0.25° to about 1.0°. In some such embodiments, second grooves of the first subset and the second grooves of the second subset can be arranged in an alternating pattern across the groove pattern. In some such embodiments, the second set of second grooves can include a third subset of second grooves having a third constant vertical included angle $\phi_C$ that can be symmetrical about a groove base of the second grooves of the third subset. In any such embodiments, the third constant vertical included angle $\phi_C$ can be about equal to a corresponding angle of orthogonality. In any such embodiments, the second grooves of the first subset, the second grooves of the second subset, and the second grooves of the third subset can be arranged in a repeating pattern across the groove pattern.

In some embodiments, the second set of second grooves can include a first subset of second grooves having a first constant vertical included angle $\phi_A$ and a second subset of second grooves having a second constant vertical included angle $\phi_B$. The first constant vertical included angle $\phi_A$ can be symmetrical about the groove base of the second grooves of the first subset, and the second constant vertical included angle $\phi_B$ can be non-symmetrical about the groove base of the second grooves of the second subset by about 0.25° to about 1.0°. In any such embodiments, the second grooves of the first subset and the second grooves of the second subset can be arranged in an alternating pattern across the groove pattern.

In some embodiments, the transition section can include a continuous surface transition between the dive sections and the rise sections. In any such embodiments, the transition section can include a curved surface along a groove base of the first grooves. In some such embodiments, the curved surface can have a radius in a range from about 1 micron to about 50 microns, a range from 1 micron to about 25 microns, or a range from about 1 micron to about 10 microns.

In some embodiments, the substrate can be a monolithic block substrate. In some such embodiments, the article can be configured as a master mold. In some embodiments, the substrate can be a polymeric film. In any such embodiments, the article can be configured as a retroreflective sheeting.

Another embodiment is yet another article including a substrate having a structured surface, with slightly non-orthogonal microprisms thereon. The structured surface can include a first set of first grooves about aligned along a first direction and intersecting with a second set of second grooves about aligned along a second direction. Each of the first grooves can include a set of variable depth zones. Each variable depth zone can include: a dive section having a first minimum depth $Z_{D1}$ and a first maximum depth $Z_{D2}$, a rise section having a second minimum depth $Z_{R1}$ and a second maximum depth $Z_{R2}$, and a transition section located between the dive section and rise section. The transition section can include a continuous surface transition between the dive section and the rise section. The first direction is substantially perpendicular to the second direction. At least a portion of the first grooves can be aligned along a non-parallel skewed first direction as compared to the first direction. A skew angle ψ between the first direction and the skewed first direction is less than 2° or, at least a portion of the second grooves are aligned along a non-parallel skewed second direction as compared to the second direction where a skew angle τ between the second direction and the skewed second direction is less than 2°.

In some embodiments, the intersection between the at least portion of the first grooves and the at least portion of the second grooves can be non-perpendicular up to about 2°.

In some embodiments, the set of variable depth zones can include first and second subsets of variable depth zones and the skewed first direction can include first and second sub skewed first directions. The first grooves of the first subset can have a first groove base aligned in the first sub skewed first direction. The first grooves of the second subset can have a first groove base aligned in the second sub skewed first direction. The first sub skewed first direction and the second sub skewed first direction are non-parallel to each other. In some such embodiments, the first sub skewed first direction is non-perpendicular to the second direction by a skew angle $\chi_A$ equal to 90°±2° and skew angle $\chi_A$ is not equal to 90°±0.1°. In some such embodiments, second sub skewed first direction is perpendicular to the second direction by a non-skewed angle $\chi_B$ equal to 90°±0.1°.

In some such embodiments, the first sub skewed first direction can have a counterclockwise rotated non-perpendicular skew angle $\chi_A$ to the second direction, and the second sub skewed first direction can have a clockwise rotated non-perpendicular skew angle $\chi_B$ to the second direction. In any such embodiments, the magnitude of the skew angle $\psi_A$ between the first direction and the first sub skewed first direction can be about equal to a magnitude of the skew angle $\psi_B$ between the first direction and the second sub skewed first direction. In some such embodiments, first variable depth zones of the first subset and the second variable depth zones of the second subset can be arranged in an alternating pattern.

In some such embodiments, the set of variable depths zones can further include a third subset of third variable depth zones having a third groove base aligned in a third sub skewed first direction, the third sub skewed first direction being non-parallel to both the first sub skewed first direction and the second sub skewed first direction. In any such embodiments, the first sub skewed first direction can have a counterclockwise rotated non-perpendicular skew angle $\chi_A$ to the second direction, the second sub skewed first direction can have a clockwise rotated non-perpendicular skew angle $\chi_B$ to the second direction, and the third sub skewed first direction can have a perpendicular non-skewed angle $\chi_C$ to the second direction. In any such embodiments, the magnitude of the skew angle $\psi_A$ between the first direction and the first sub skewed first direction can be about equal to a magnitude of the skew angle $\psi_B$ between the first direction and the second sub skewed first direction. In any such embodiments, the first variable depth zones of the first subset, the second variable depth zones of the second subset, and the third variable depth zones of the third subset can be arranged in a repeating pattern.

In some embodiments, the at least the portion of the second grooves can be non-parallel to the second direction by a skew angle τ of up to 2°.

In some embodiments, the second set of second grooves can include two or more subsets of second grooves. The first subset of second grooves can be aligned in a first sub skewed second direction and the second subset of second grooves can be aligned in a second sub skewed second direction, where first sub skewed second direction is non-parallel to the second sub skewed second direction. In any such embodiments, first sub skewed second direction can be non-parallel to the second direction by a skew angle $\tau_A$ of up to 2°. In some such embodiments, second sub skewed second direction can be parallel to the second direction.

In some such embodiments, the alignment of the first sub skewed second direction can be rotated clockwise by a skew angle $\tau_A$ up to 2° from a parallel alignment with the second direction, and the alignment of the second sub skewed second direction can be rotated counterclockwise by a skew angle $\tau_B$ up to 2° from a parallel alignment with the second direction. In some such embodiments, a magnitude of the skew angle $\tau_A$ can be about equal to a magnitude of the skew angle $\tau_B$. In any such embodiments, the second grooves of the first subset and the second grooves of the second subset can be arranged in an alternating pattern.

In some such embodiments, the second set of second grooves can further include a third subset of second grooves aligned in a third sub skewed second direction, and the third sub skewed second direction can be non-parallel to both the first sub skewed second direction and the second sub skewed second direction. In some such embodiments, the alignment of the first sub skewed second direction can be rotated clockwise by a skew angle $\tau_A$ up to 2° from a parallel alignment with the second direction, the alignment of the second sub skewed second direction can be rotated counterclockwise by a skew angle $\tau_B$ up to 2° from a parallel alignment with the second direction, and the third sub skewed second direction can be substantially parallel to the second direction. In some such embodiments, a magnitude of the skew angle $\tau_A$ can be about equal to of the skew angle $\tau_B$. In any such embodiments, the second grooves of the first subset, the second grooves or the second subset, and the second grooves of the third subset can be arranged in a repeating pattern.

In some embodiments, the substrate can be a monolithic block substrate. In some such embodiments, the article can be configured as a master mold. In some embodiments, the substrate can be a polymeric film. In any such embodiments, the article can be configured as a retroreflective sheeting.

Another embodiment is yet another article including a substrate having a surface with an inverted groove pattern. The inverted groove pattern can contain inverted microprisms. The inverted groove pattern can be a mirror image of a groove pattern of a master mold article having a master mold substrate surface having a groove pattern including microprisms thereon. The groove pattern can include a first set of first grooves intersecting with a second set of second grooves. The first grooves can be parallel to each other along a same first direction across the groove pattern, and each of the first grooves can include a plurality of repeating variable depth zones. Each of the variable depth zones can include a dive section having a first maximum depth, $Z_{D2}$, a rise section having a second maximum depth, $Z_{R2}$, and transition section located between the dive section and the rise section. The second grooves can be parallel to each other along a same second direction across the surface, the second direction being substantially perpendicular to the first direction.

In some embodiments, the inverted microprisms can be inverted reduced inactive area microprisms. In some embodiments, adjacent pairs of inverted microprisms can be arranged as symmetrically opposite matched pairs of inverted microprisms corresponding to mirror images of adjacent pairs of microprisms of the master mold article arranged as symmetrically opposite matched pairs of microprisms.

In some embodiments, the inverted groove pattern can include an inverted transition section, corresponding to a mirror image of the transition section, the inverted transition section can include an inverted continuous surface transition corresponding to a mirror image of a continuous surface transition between the dive section and rise section of the groove pattern of the master mold article. In some embodiments, the inverted groove pattern can include an inverted transition section, corresponding to a mirror image of the transition section, the inverted transition section can include an inverted curved surface corresponding to a mirror image of a curved surface located along a groove base of the first groove of the master mold article. In some such embodiments, the inverted surface can have a radius in a range from about 1 micron to about 50 microns, in a range from about 1 micron to about 25 microns, or in a range from about 1 micron to about 10 microns.

In some embodiments, the inverted groove pattern can include an inverted dive section, corresponding to a mirror image of the dive section 268 of the master mold article, the inverted dive section having a dive angle α' value in a range from about 5° to about 50°, in a range from about 5.26° to about 35.25°, or in a range from about 18.26° to about 32.26°.

In some embodiments, the surface of the substrate can include a specularly reflective surface. In some such embodiments, the specularly reflective surface can consist of a metallic material. In any such embodiments, the metallic material can be selected from the group consisting of nickel, cobalt, aluminum, silver, gold, copper, brass, bronze or alloys thereof.

In some embodiments, the article is configured as a retroreflector. In some embodiments the substrate is a polymeric material. In some embodiments, the substrate is a metallic material.

DESCRIPTION OF THE DRAWINGS

Embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

DETAILED DESCRIPTION

Figure 1:
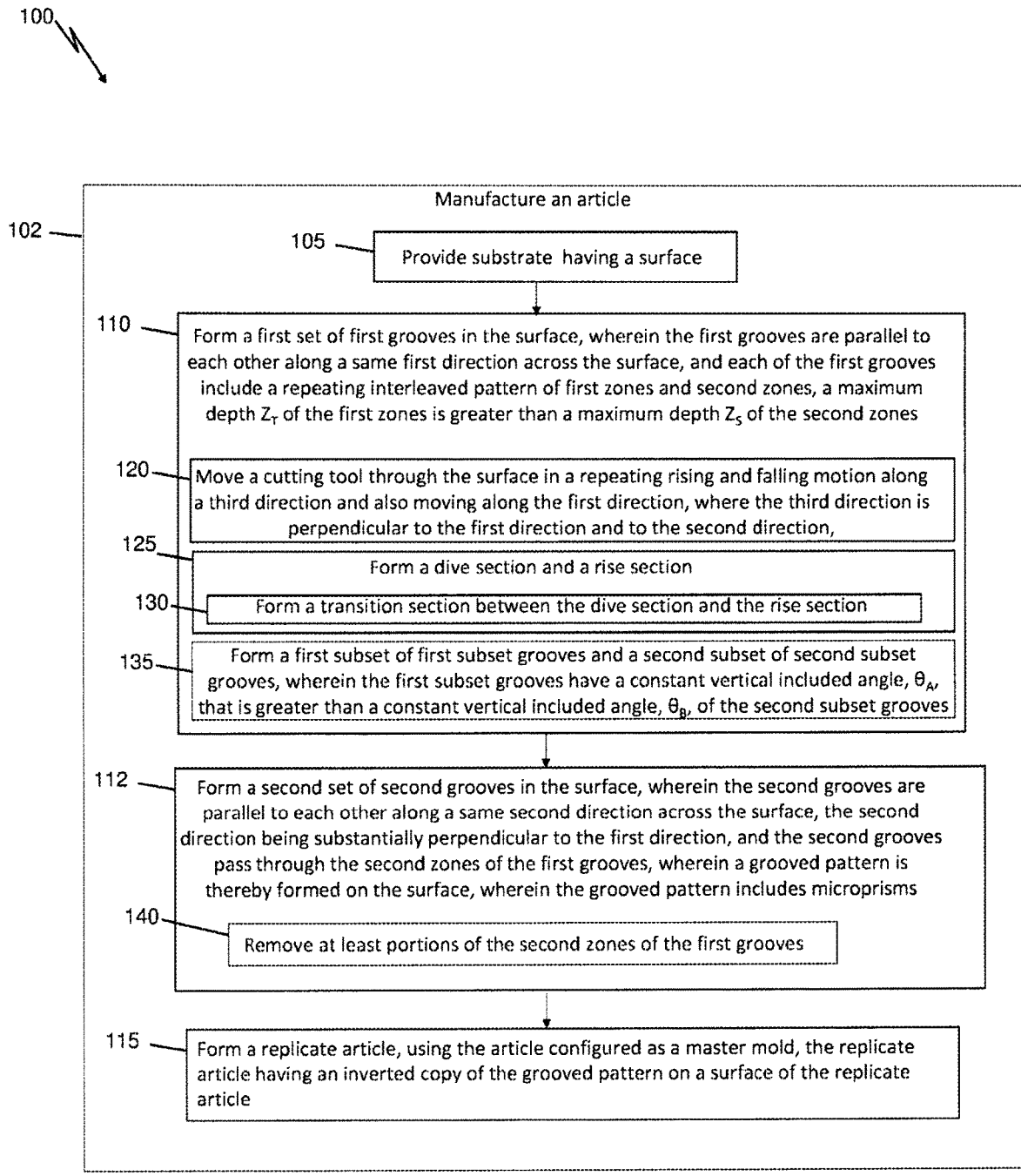
FIG. 1 presents a flow diagram of selected steps in an example embodiment of a method of in accordance with the disclosure.

The present disclosure describes the discovery and development of a method to directly machine master molds for use in the production of microprismatic retroreflective articles having reduced inactive area microprisms (RIA microprisms) that is simpler, more efficient, and less costly to implement. Additionally, the method can result in the production of articles with improved properties as compared to existing microprismatic sheetings.

Microprismatic cube corner retroreflective sheeting (also referred to herein as microprismatic retroreflective sheeting or microprismatic sheeting) can be characterized by the ability to reflect light incident on the material back towards the originating light source. Nonlimiting example applications for article embodiments include microprismatic sheeting, include traffic signs, vehicle number plates, contour marking tape for trucks and other heavy vehicles, reflective vehicle graphics, construction workzone barricades or delineators, safety vests, railroad crossings, and many other applications.

Microprismatic retroreflective sheeting often includes a thin transparent layer (typically made of one or more transparent polymeric materials) having a substantially planar and smooth front surface (or face) and a rear structured surface comprising a plurality of geometric structures, many of which are microscopic cube corner retroreflective elements (also known as either microprismatic retroreflective elements or microprisms). Microprismatic sheeting is typically supplied in roll form (such as a 48"×50 yards roll of sheeting) and manufactured in roll-to-roll production processes. As such, the microprismatic sheeting is typically sufficiently thin and flexible to be easily rolled, unwound, and rewound. This can necessitate that the microprisms within the sheeting be quite small, typically having dimensions of less than 1 mm.

The performance of retroreflective sheeting can be characterized by two retroreflective performance parameters: entrance angularity and observation angularity. The term entrance angle as used herein is defined as the angle at which light impinges on the front surface of the retroreflective sheeting. A zero degree entrance angle is perpendicular to the face of the sheeting. For some applications it is desirable for microprismatic sheeting to have high levels of retroreflectivity at relatively small entrance angles, such as less than 10 degrees. While it can also be desirable for microprismatic sheeting to have strong performance at larger entrance angles, such as 30 degrees or 40 degrees or more, if the sheeting only performs at very large entrance angles, it would be rendered useless for most applications.

The term observation angle as used herein is defined as the angle between the source light and the detector as light impinges upon the front surface of the retroreflective sheeting and is retroreflected back towards the source. For example, for a vehicle, the observation angle is the angle between the vehicle's headlight (the light source), the retroreflective object (such as a traffic sign), and the vehicle driver's eye (the detector). As a whole, observation angles are typically quite small, between 0.1 and 2.0 degrees. For example, when a retroreflective traffic sign is viewed from about 700 feet from a vehicle, an observation angle of about 0.2 degrees occurs. Generally, the closer the source light (such as a vehicle's headlight) is to the retroreflective object, the larger the observation angle. Similarly, larger observation angles will exist when a retroreflective object is viewed from a large vehicle (e.g., heavy truck) instead of a small vehicle (e.g., a small car) because the driver of the large vehicle is typically further elevated above the vehicle's headlights, and therefore, larger angles exist between the driver's eyes and the headlights. For the purposes of the present disclosure, small observation angles are defined as less than 0.5 degrees, and large observation angles are defined as 0.5 degrees or greater.

The manufacturing of microprismatic sheeting commonly occurs by first manufacturing a master mold having a structured surface, where the structured surface corresponds either to the desired structured surface containing the microprisms of the finished microprismatic sheeting or to a negative (inverted) copy thereof. The mold is then replicated using any suitable technique such as conventional nickel electroforming to produce tooling for forming microprismatic sheeting by processes such as embossing, extruding, or cast-and-curing. U.S. Pat. No. 5,156,863 (Pricone et al.) provides an illustrative overview of a process for forming tooling used in the manufacture of microprismatic sheeting. In such tooling fabrication processes, the manufacture of the master mold is a critical step, where, a high level of precision and accuracy faciliates properly forming the microprisms on the structured surface of the master mold.

Each microprism can be characterized as having a base and three mutually substantially perpendicular lateral faces. The three lateral faces intersect at a single point (or apex), which is opposite the base of the microprism. Optimal levels of retroreflection at small observation angles (such as 0.1 or 0.2 degrees) typically occur when the dihedral angles between each of the three lateral faces are substantially equal to 90° and the microprisms have an orthogonal shape. Slight deviations of the dihedral angles from 90° can cause light to be retroreflected back towards larger observation angles. In some instances, such slight non-orthogonality may be desirable, but if the dihedral angles deviate too greatly from 90° (such as deviations of greater than ±2°), the microprisms can be rendered useless for most practical applications. Similarly, each of the lateral faces should have an optically smooth planar surface to facilitate optimizing levels of retroreflection. If the surfaces of the lateral faces are either concave or convex or if the surfaces are not optically smooth, but rough instead, the levels of retroreflection can similarly decrease.

The present disclosure considers two categories of microprisms: trihedral-shaped microprisms and reduced inactive area microprisms (RIA microprisms). RIA microprisms are sometimes also referred to as full-cube microprisms or preferred geometry microprisms. Trihedral-shaped microprisms have a triangular pyramidal shape (i.e. a trihedral shape) and a triangular-shaped base. The manufacture of a master mold containing trihedral-shaped microprisms can be simpler than the manufacture of RIA microprisms. However, the overall levels of retroreflection of trihedral-shaped microprisms are typically not as high as RIA microprisms.

For trihedral-shaped microprisms, the simplest method to produce the master mold is through direct machining techniques. With direct machining, a series of intersecting V-shaped grooves are formed directly into a planar substrate (such as a metal plate) to define the shape (or inverse shape) of the desired microprisms. For direct machining of trihedral-shaped microprisms, three sets of parallel V-shaped grooves are formed in an intersecting pattern. The grooves are typically made through continuous motion of a cutting tool, typically a diamond-tipped cutting tool, through techniques known in the art such as fly-cutting or ruling. In a well-known example, an array of trihedral-shaped microprisms can be formed by directly machining three sets of parallel grooves intersecting at 60 degree angles to each other where the V-shaped grooves have an included angle of approximately 70.529 degrees.

A limitation with trihedral-shaped microprisms is that only a portion of the each individual microprism actually retroreflects light back toward the light source, which is why the overall levels of retroreflectivity are typically lower for trihedral-shaped microprisms than for RIA microprisms. Every trihedral-shaped microprism has both an active area and an inactive area. As used to herein, the terms "active area" or "effective aperture" are terms used to define the portion of a corner-cube element that retroreflects light incident on the base of that element. Light entering the microprism through its base in the active area will reflect off each of the three lateral faces of the microprism and be returned toward its source. However, light entering the base of the microprism in the inactive area, will not be retroreflected back toward its source. Example procedures for determining the effective aperture of a corner cube are presented in Eckhardt, Applied Optics, v. 10, n.7, July 1971, pp. 1559-1566 and in U.S. Pat. No. 835,648 (Straubel), both of which are incorporated by reference herein in their entirety.

For trihedral-shaped microprisms, the inactive area will account for a significant portion of the total area of each microprism, e.g., 30% or more of the total area. RIA microprisms, on the other hand, are typically designed such that the inactive areas are significantly minimized or eliminated, and the active area can account for 85% or more of the base of the microprism, which in turn allows the higher levels of retroreflection to be obtained. As such, it is highly desirable for applications such as traffic signing, vehicle number plates, safety signing, vehicle markings, delineators and similar applications to utilize microprismatic retroreflective sheeting incorporating RIA microprisms.

There have been many previous efforts to manufacture microprismatic sheeting incorporating only RIA microprisms and to create a master mold for use in the manufacturing process. These methods for manufacturing the master mold include pin bundling, plate shifting, and laminae assembly techniques. However, each of these methods has significant drawbacks and deficiencies.

Pin bundling techniques, where a plurality of pins, each having a geometric shape on end, are assembled together to form a structured surface containing cube-corner elements, offer the ability to manufacture a wide variety of cube corner geometries in a single mold because each pin is individually machined prior to being bundled together. However, such techniques have often been used only to create cube-corner retroreflective elements on a macroscopic level, such as for bicycle reflectors. For microscopic cube-corner retroreflective elements, where the total height of each microprism is less than 1 mm in height (and typically less than 500 microns or 250 microns), such pin bundling techniques are impractical because of the significantly large number of pins and the diminishing size thereof required to be precisely machined and then arranged together to form a master mold.

With plate shifting techniques, a series of thin plates (typically significantly less than 1 mm in thickness) are tightly assembled together and then precisely machined with a series of V-shaped grooves. These plates are then disassembled and must be precisely rearranged by shifting each individual plate to a new position to create a corner-cube mold. A difficulty with plate shifting techniques is that each individual plate typically must be precisely repositioned on a microscopic scale in both horizontal and vertical directions to create the desired microprism shape. Inaccuracies in the repositioning of individual plates can lead to losses in retroreflectivity levels or potential manufacturing issues. Further, the costs involved to precisely machine a large number of microscopic plates can be quite large.

With laminae techniques, as with plate shifting techniques, a series of thin plates are prepared with a row (or sometimes two rows) of microprismatic elements machined onto the top surface. To prepare the laminae, the thin plates must be precisely oriented in predetermined positions for a series of V-shaped grooves or knife-edge cuts to be machined into the top surface of each thin plate. In some instances, the plates may need to be precisely repositioned and reoriented multiple times on a microscopic scale in order to complete all of the machining steps. Then, after a substantial number of laminae have been prepared, the laminae are arranged together to form a master mold. As with plate shifting, inaccuracies in the repositioning of individual plates during any of the machining steps can lead to losses in retroreflectivity levels or potential manufacturing issues. Further, the costs involved to precisely machine a large number of microscopic laminae can also be quite large.

Another deficiency with each of the above approaches is the possibility for microscopic gaps to exist between individual pins, plates, or laminae when each is assembled (or reassembled) to create the master mold. Any such microscopic gaps (or seams) can create a manufacturing defect, which may ultimately impact the performance of the resulting microprismatic sheeting product. For example, when the master mold is replicated through techniques such as nickel electroforming, electroforming solution may penetrate into the small seams and gaps. This may potentially damage the mold or, as known in the art, allow a "fin" to form along the seam or within any gaps. Such "fins", if not carefully removed, may ultimately be molded or formed into the resulting microprismatic sheeting product, which could lead to product wrinkling or cracking during use in the field. Additionally, any microscopic gaps or seams within the final mold utilized to manufacture the microprismatic sheeting on a roll-to-roll basis may cause production issues. For example, such gaps or seams may allow polymeric materials to remain stuck in the mold leading to various aesthetic defects such as bubbles or smears in the final product. Also, if such sticking occurred, the useful life of the tooling could be considerably shortened.

Due to the inherent challenges, high costs, and deficiencies with previous approaches, it is desirable to have an alternative method to produce a master mold for use in the manufacture of microprismatic sheeting incorporating RIA microprisms as disclosed herein.

Embodiments of the present disclosure use a cutting tool, or multiple cutting tools, to directly machine a groove pattern in a single substrate (e.g. a monolithic block substrate) by cutting a first set of grooves in one direction across the substrate and by cutting a second set of grooves in another different direction across the substrate, such that a plurality of RIA microprisms are formed on the substrate as a result of the two groove sets intersecting each other. The individual grooves of each set can be cut continuously across the surface without the need to intermittently stop the cutting process to reposition the substrate. Each set of grooves can have a plethora of individual grooves formed across the substrate, allowing for substantially larger substrates to be directly machined. For example, for some embodiments of the present disclosure a practical limitation to the size of the substrate are the physical dimensional constraints of the machining equipment itself. This is in contrast to certain previous procedures where individual separate substrate pieces are individually cut in multiple directions with multiple cutting steps to form a single microprism (or one or two rows of microprisms) on the surface of each substrate piece. These separate substrate pieces would then be stacked or laminated together to form a multi-piece substrate with the microprisms thereon. Due to the microscopic size and scale of such separate substrate pieces, the process of stacking or laminating the pieces together can be quite onerous and difficult to achieve the high level of precision typically required. Consequently, embodiments of the novel procedure of the present disclosure are faster and less expensive to implement, and, articles resulting from this novel procedure can be more mechanically stable because they can be made on a single substrate instead of from a multi-piece substrate.

Figure 2A:
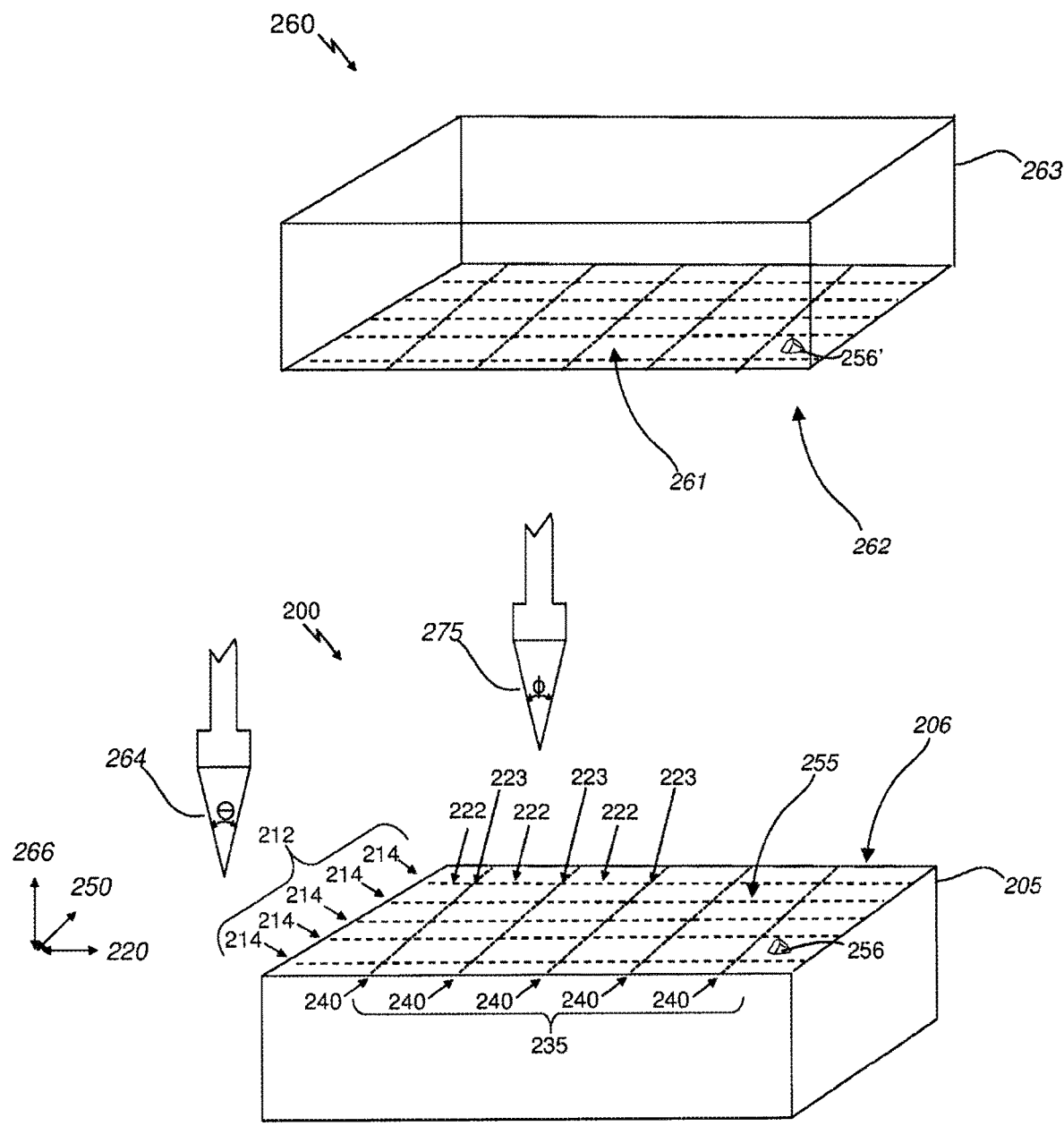
FIG. 2A presents a perspective view of an example article of the disclosure in the process of being manufactured according to a method embodiment of the disclosure.

One embodiment of the disclosure is a method that includes manufacturing an article. FIG. 1 presents a flow diagram of selected steps in an example embodiment of a method 100 in accordance with the disclosure, and, FIGS. 2A-2N present various views of an example article 200 of the disclosure in the process of being manufactured and after manufacture according to embodiments of the method 100.

Figure 2B:
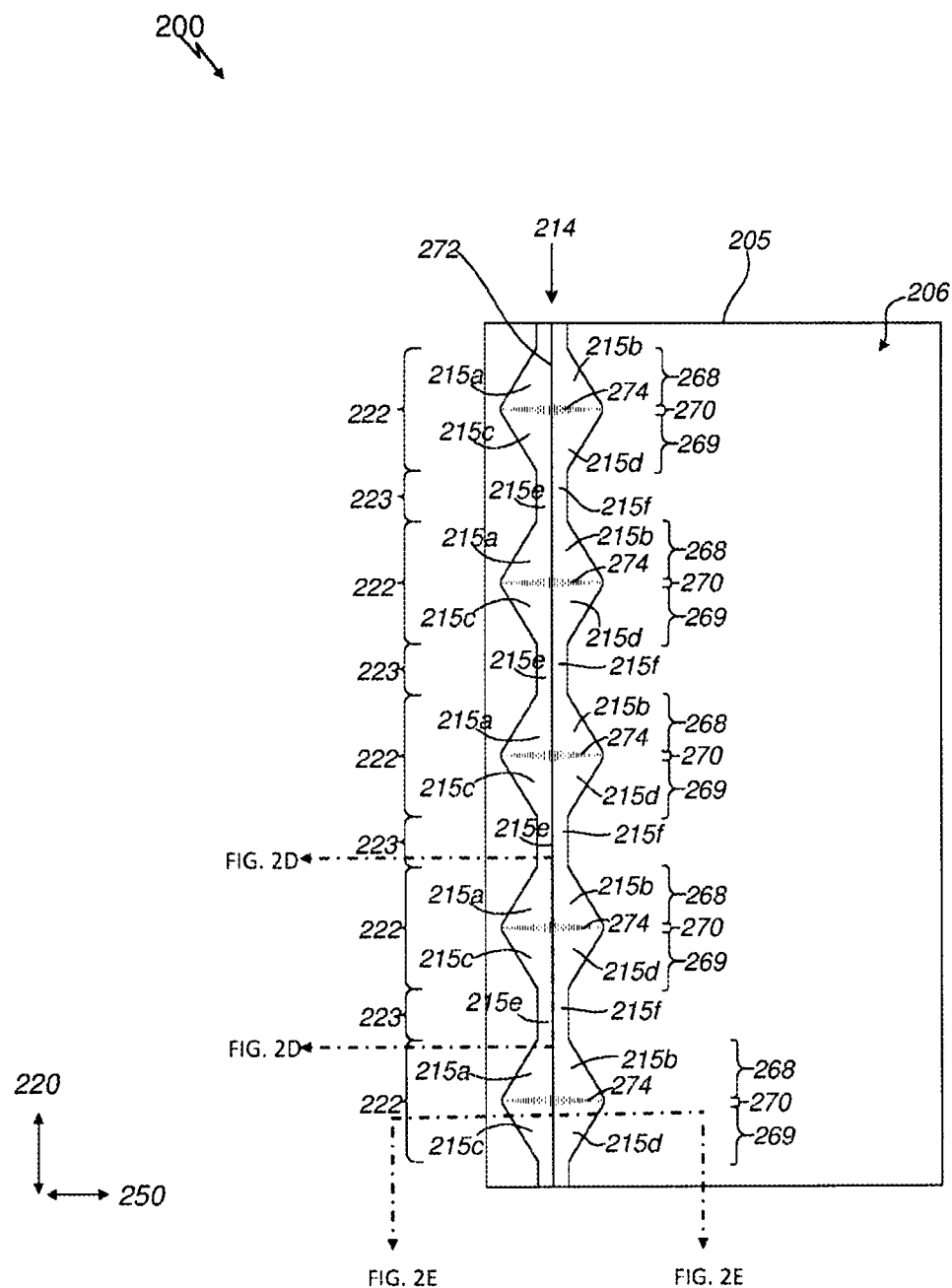
FIG. 2B presents a plan view of an example article of the disclosure at an intermediate stage of manufacture.
Figure 2C:
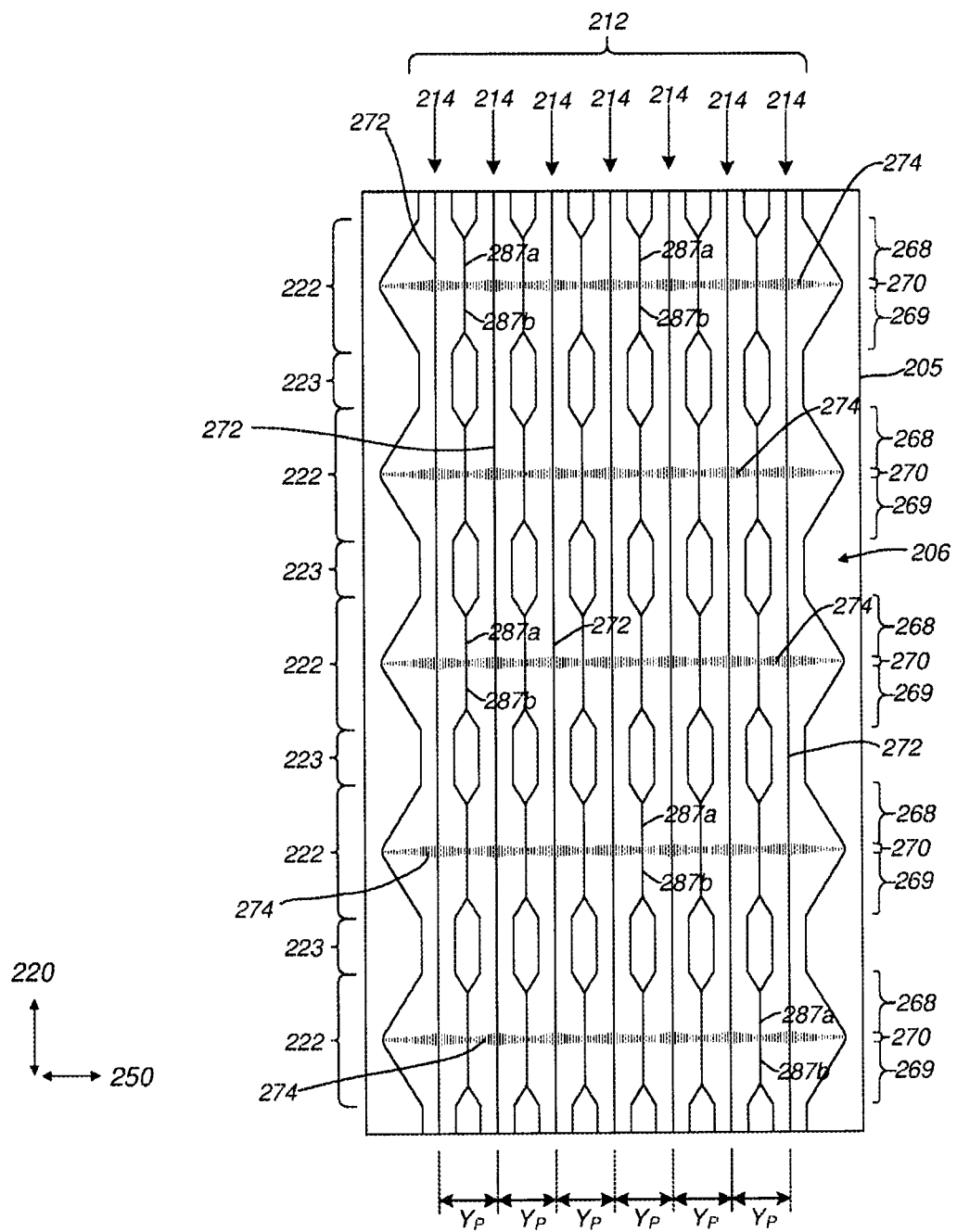
FIG. 2C presents a plan view, similar to that depicted in FIG. 2B, of the example article at an intermediate stage of manufacture.
Figure 2D:
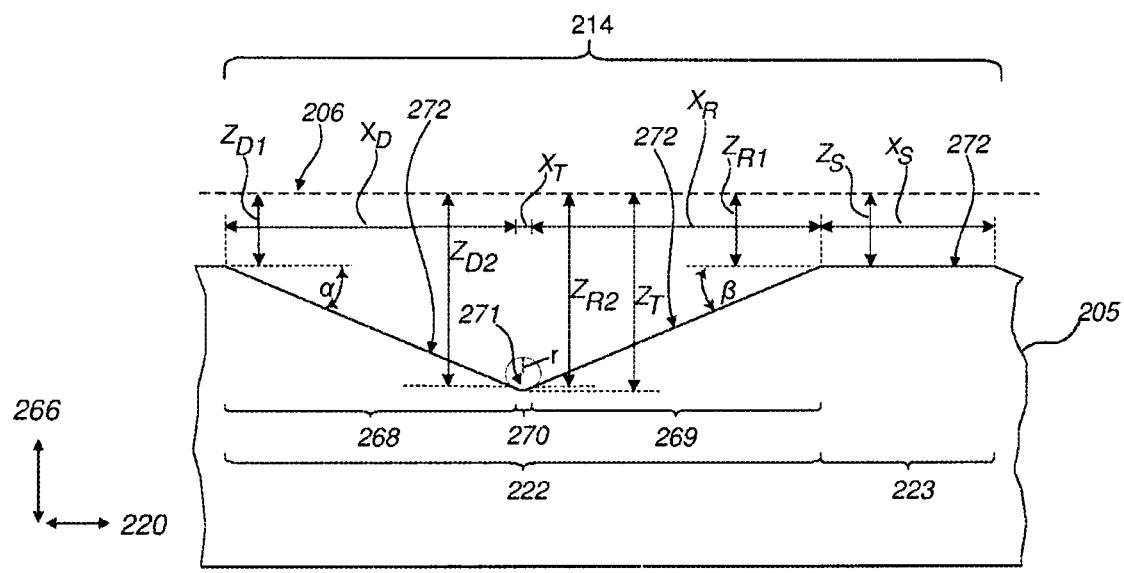
FIG. 2D presents a cross-sectional view of the example article from view line 2D-2D as shown in FIG. 2B.
Figure 2E:
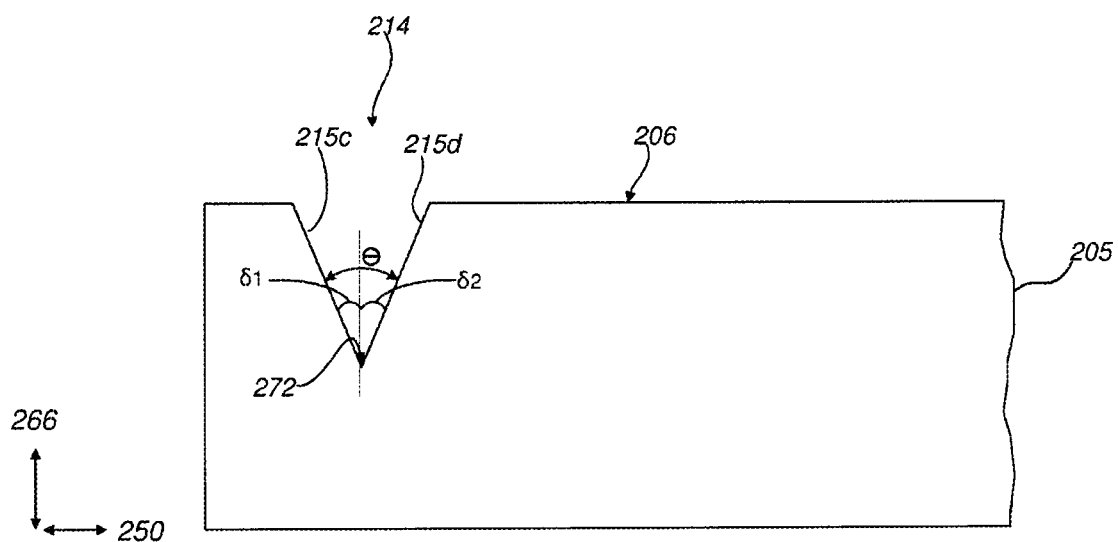
FIG. 2E presents a cross-sectional view of the example article from view line 2E-2E as shown in FIG. 2B.
Figure 2F:
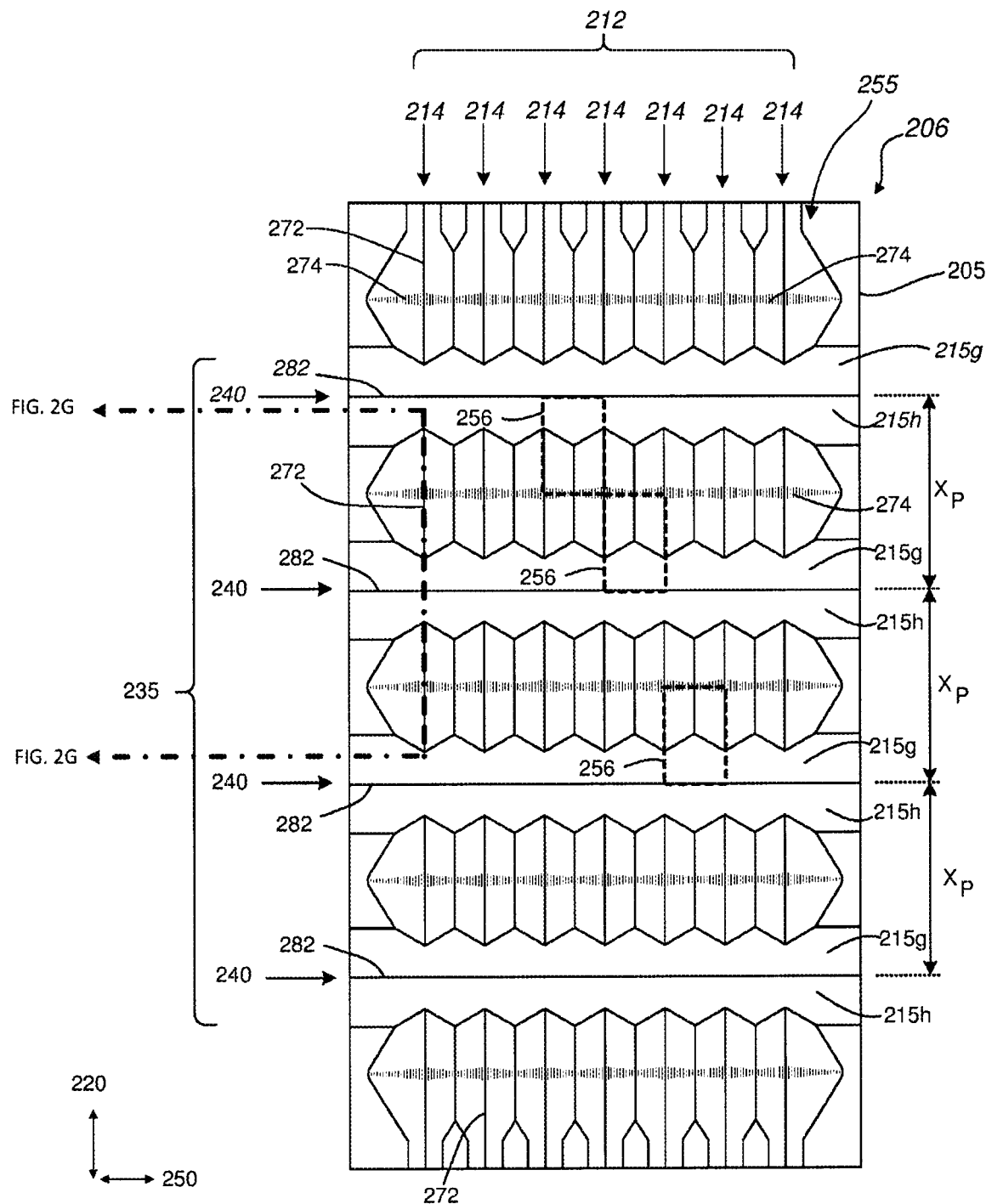
FIG. 2F presents a plan view, similar to that depicted in FIG. 2B, of the example article at an intermediate stage of manufacture.
Figure 2G:
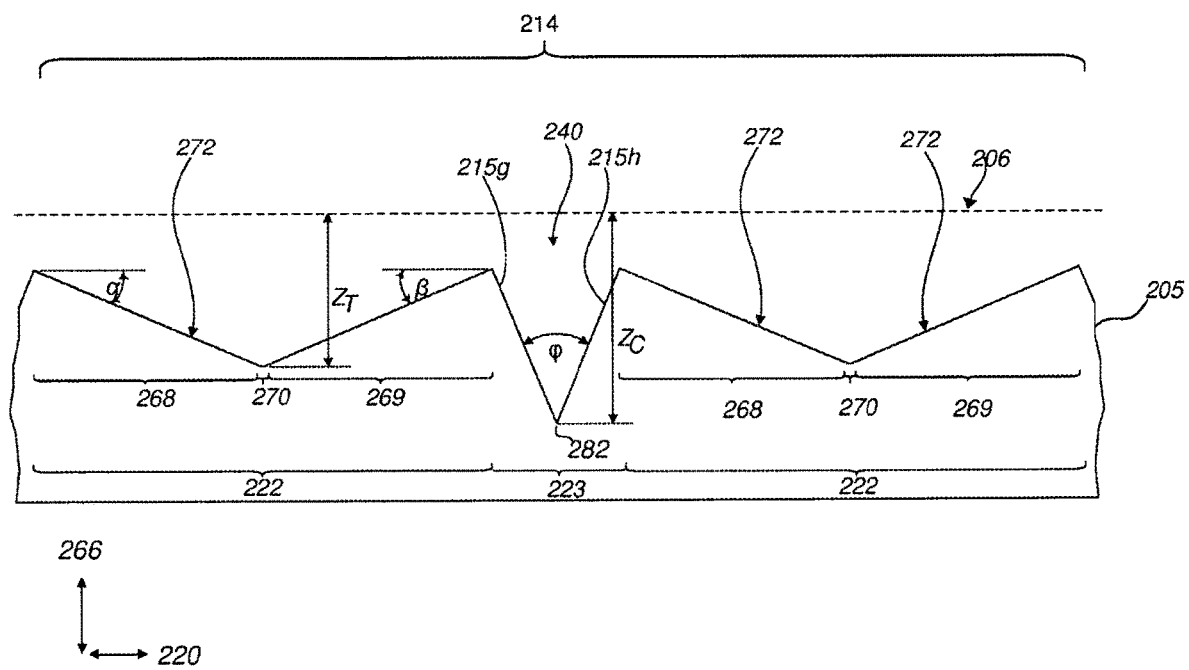
FIG. 2G presents a cross-sectional view of the example article from view line 2G-2G as shown in FIG. 2F.
Figure 2H:
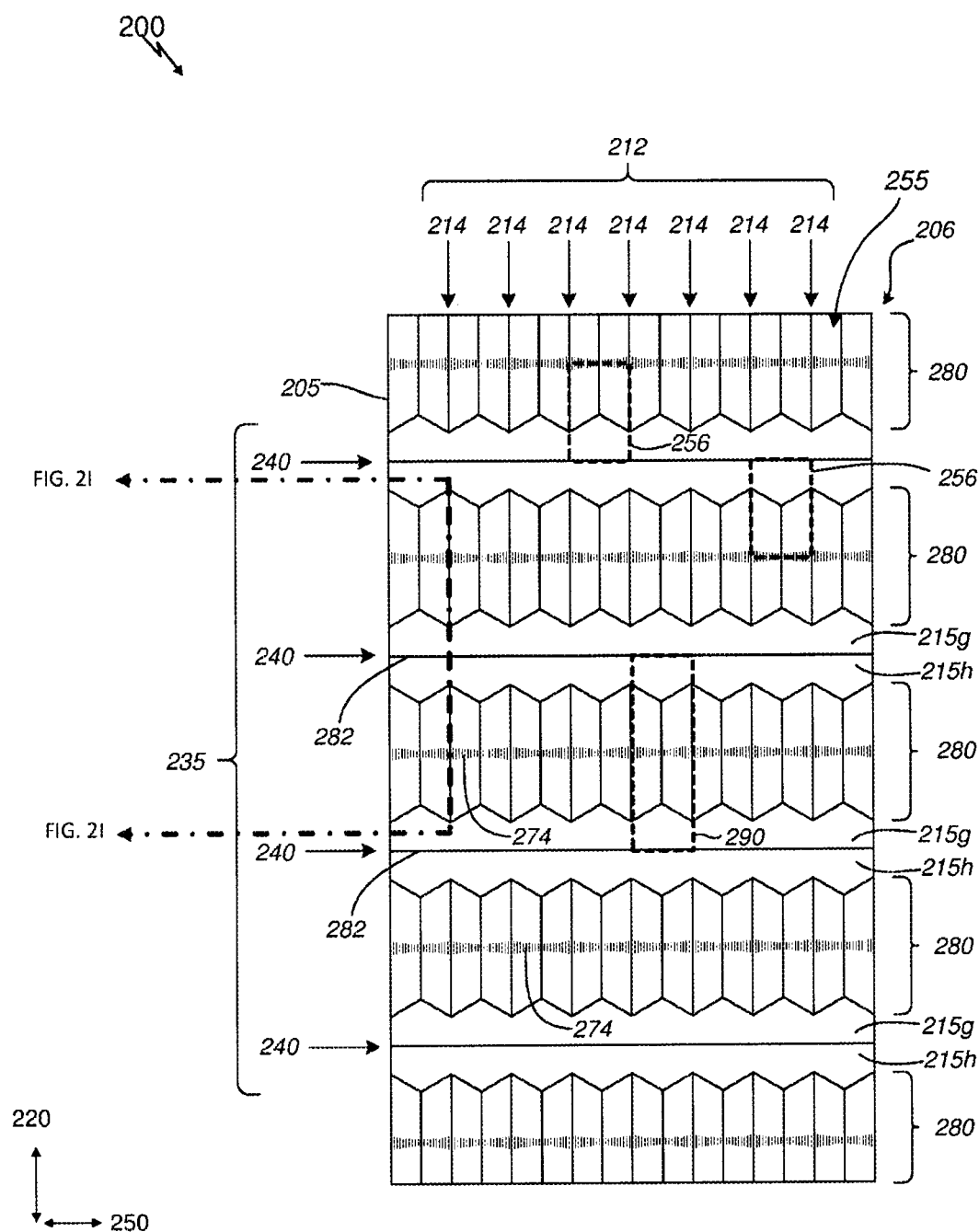
FIG. 2H presents a plan view, similar to that depicted in FIG. 2B, of the example article of after completion of the manufacturing steps discussed in the context of FIG. 1.
Figure 2I:
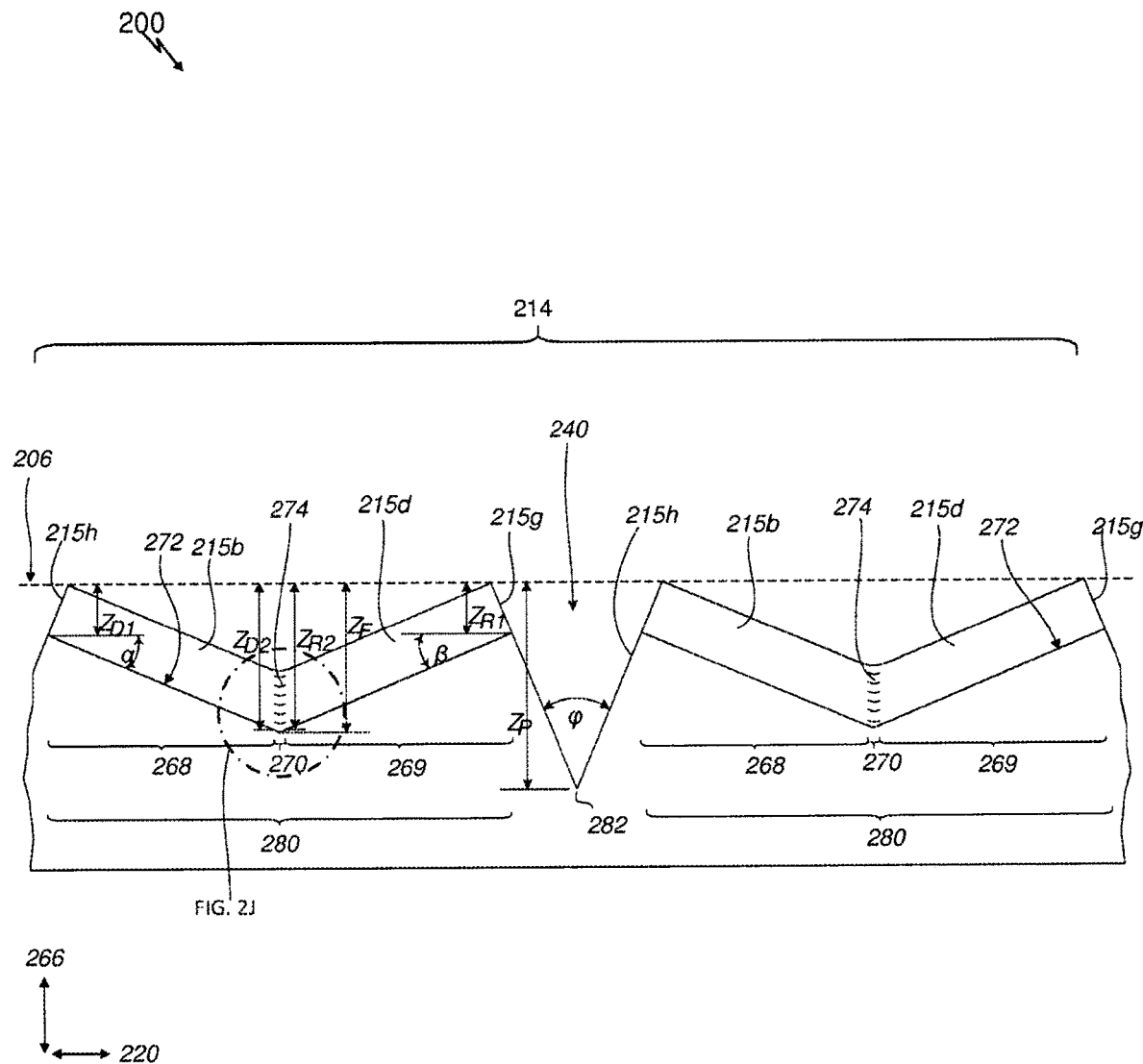
FIG. 2I presents a cross-sectional view of the example article from view line 2I-2I as shown in FIG. 2H.
Figure 2J:
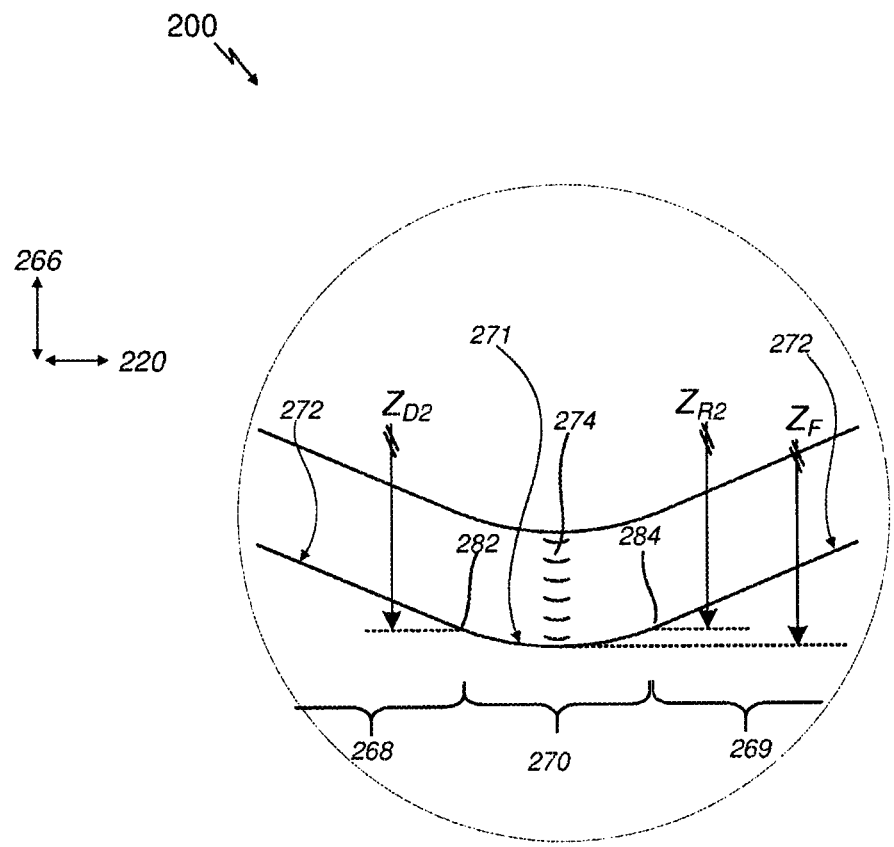
FIG. 2J presents a detailed cross-sectional view of the example article corresponding to the dashed region shown in FIG. 2I.
Figure 2K:
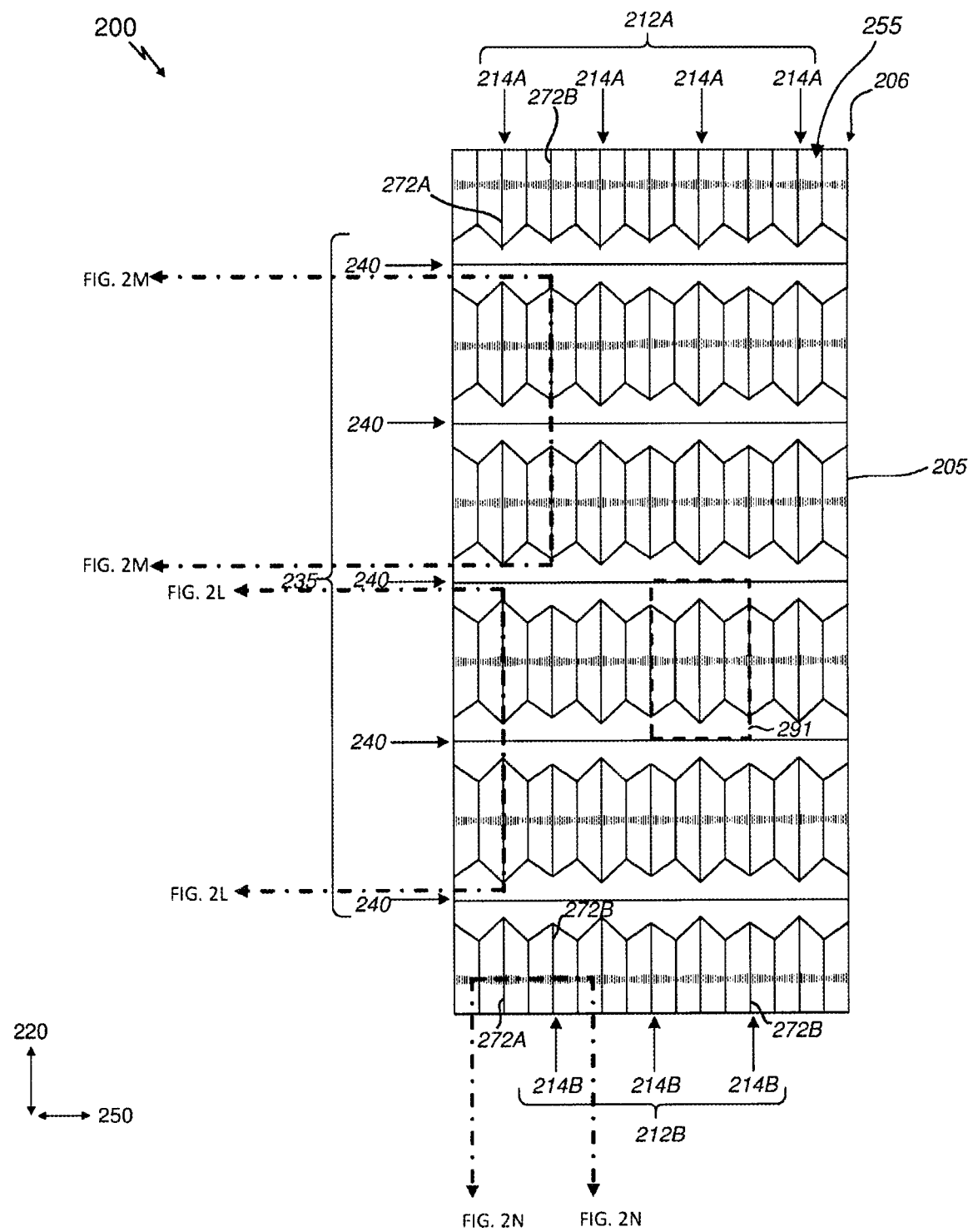
FIG. 2K presents a plan view, similar to that depicted in FIG. 2B, of another example article of the disclosure after completion of the manufacturing steps discussed in the context of FIG. 1.
Figure 2L:
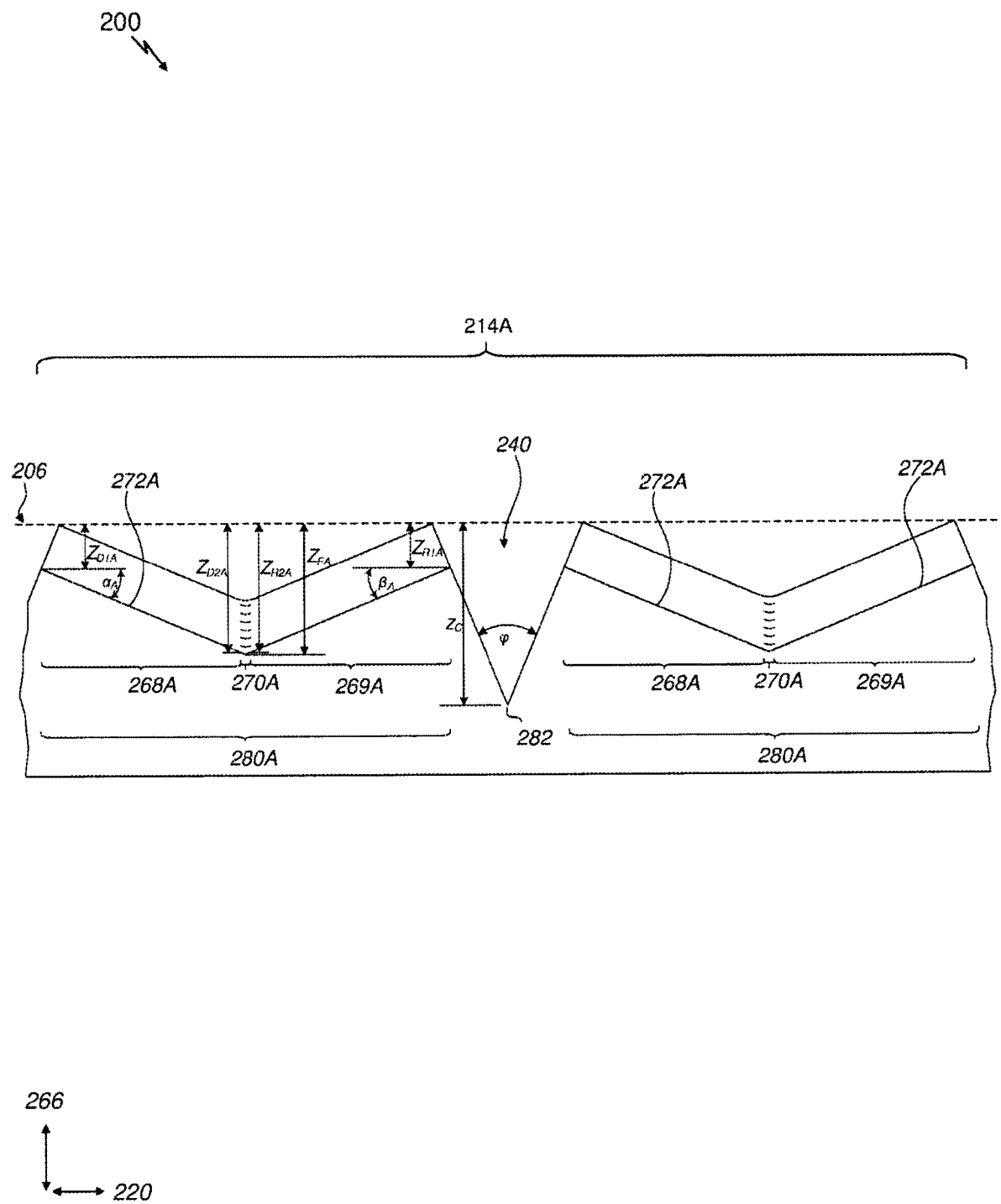
FIG. 2L presents a cross-sectional view of the example article from view line 2L-2L as shown in FIG. 2K.
Figure 2M:
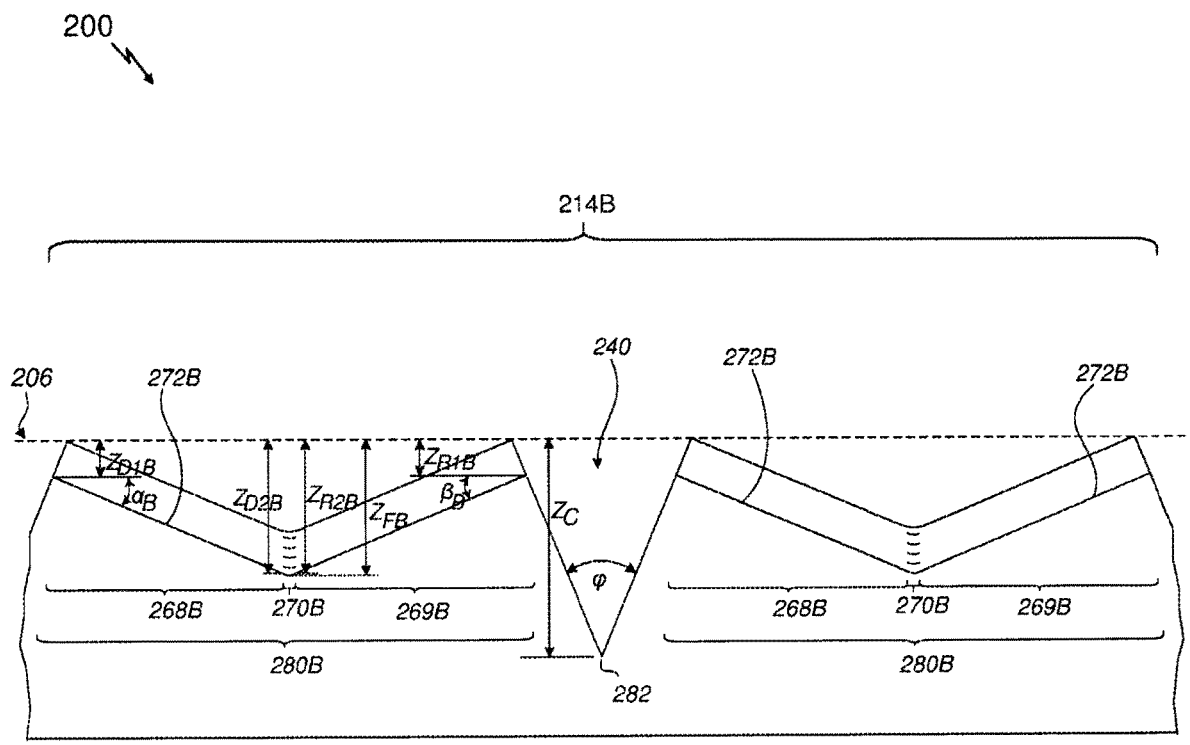
FIG. 2M presents a cross-sectional view of the example article from view line 2M-2M as shown in FIG. 2K.
Figure 2N:
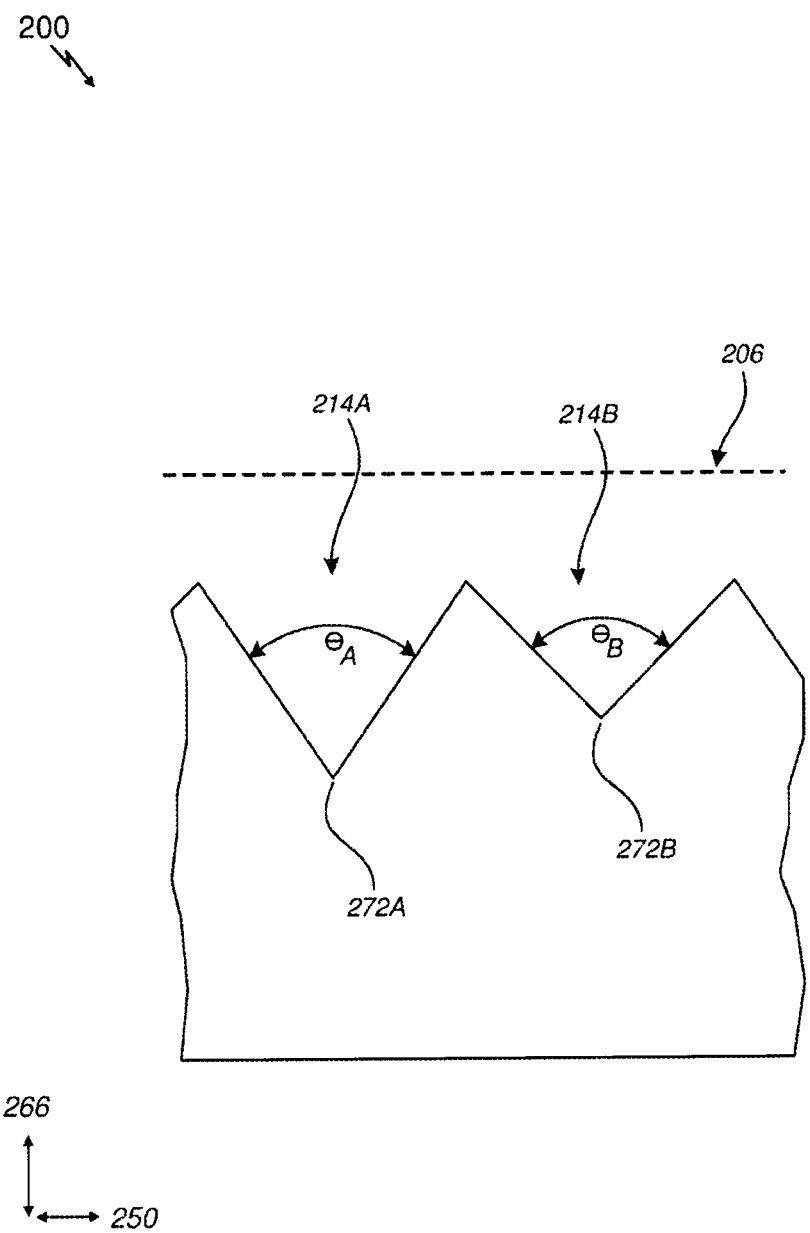
FIG. 2N presents a cross-sectional view of the example article from view line 2N-2N as shown in FIG. 2K.

With continuing reference to FIGS. 1-2N throughout, the method 100 includes a step 102 of manufacturing an article 200. Manufacturing the article (step 102) includes providing, in step 105, a substrate 205 having a surface 206, forming, in step 110, a first set 212 of first grooves 214 in the surface 206, and forming, in step 112, a second set 235 of second grooves 240 in the surface 206. The first grooves 214, formed as part of step 110, are parallel (e.g., adjacent grooves 214 have an angle of 0°±1°) to each other along a same first direction 220 across the surface 206, and, each of the first grooves 214 include a repeating interleaved pattern of first zones 222 and second zones 223, and a maximum depth $Z_T$ of the first zones 222 is greater than a maximum depth $Z_S$ of the second zones 223. FIG. 2D depicts a cross-sectional view of the first zones 222 and the second zones 223 of the first grooves 214 along the path of the groove base 272 of the first grooves 214. The second grooves 240, formed as part of step 112, are parallel (e.g., adjacent grooves 240 have an angle of 0°±1°) to each other along a same second direction 250 across the surface 206, the second direction 250 being substantially perpendicular (e.g., intersecting grooves 214, 240 have an angle of 90°±1°) to the first direction 220, and, the second grooves 240 pass through the second zones 223 of the first grooves 214, wherein a groove pattern 255 is thereby formed on the surface 206, the groove pattern 255 including microprisms 256.

In some embodiments, the microprisms 256 are reduced inactive area microprisms. The term reduced inactive area microprism as used herein refers to a truncated version of a microscopic trihedral-shaped corner cube retroreflector, wherein at least some portion of the cube corner retroreflector outside of its effective aperture (i.e. active area) has been eliminated from the design of the trihedral-shaped microprism. As such, a reduced inactive area microprism is a truncated version of a trihedral-shaped microprism where at least some portion of the inactive area has been removed. Thus, with reduced inactive area microprisms, the area of the active area will account for a higher percentage of the overall area of the microprism base. In some embodiments, the microprisms 256 will have an active area percentage of 70% or higher. In other embodiments, the microprisms 256 will have an active area percentage of 85% or higher. In still other embodiments, the microprisms 256 will have an active area percentage of 90% of higher. A method to characterize the active area percentage is provided below.

In various embodiments of the disclosure, the microprisms 256 can be any classification of known microprisms in the art, including equilateral microprisms, forward-tilted microprisms, backwards-tilted microprisms, and sideways-tilted microprisms. Each of these classifications is defined by the orientation of the optical axis of the microprism. With an equilateral microprism, the optical axis is perpendicular to the base of the microprism. For the other classifications, the optical axis is tilted from the perpendicular position of equilateral microprisms. The degree of tilting from the perpendicular position is known as the tilt angle of the optical axis. The direction of the tilting will define whether the microprism is a forward-tilted, backwards-tilted, or sideways-tilted microprism. A more detailed discussion on each of these microprism classifications is provided below.

In some embodiments of the method 100, the providing of the substrate 205 (step 105) includes providing a monolithic block substrate. The term monolithic block substrate as used herein means a single solid unbroken material piece having the microprisms 256 formed thereon. For example, the monolithic block substrate 205 contains no stacks of material, such as separate sheets, shims, or laminates assembled together where there are seams physically separating the sheets, shims, or laminates. Using a monolithic block substrate provides the advantages of being inexpensive and not being prone to delamination or distortion during the manufacture of the article 200. For example in some embodiments, the monolithic block substrate 205 is a solid piece of metal such as steel, aluminum, copper, nickel, brass, or various metal alloys. In other embodiments, the monolithic block may include two or more metal planar or non-planar layers, such as nickel layer plated onto a stainless steel layer. In still other embodiments, the monolithic block may be made from a polymeric material, such as acrylic, polycarbonate, or other plastics familiar to those skilled in the pertinent art.

In some embodiments, the article 200 can be configured as a master mold, e.g., to serve as a template to produce other articles having an inverted copy of the grooved pattern 255 thereon. For example, the article 200 can be a mold master for use in the production of microprismatic retroreflective articles.

For example, some embodiments of the method 100 further include, in step 115, forming a replicate article 260, using the article 200 configured as a master mold. The replicate article 260 can have an inverted copy groove pattern 261 of the grooved pattern 255 on a surface 262 of a replica substrate 263 of the replicate article 260, the inverted groove pattern 261 include inverted microprisms 256'. The replication of the article 200 can be achieved using any suitable technique, such as conventional nickel electroforming as familiar to those skilled in the pertinent art. Then, by following the same replication techniques, additional replications of replicate article 260 can be made and then assembled together through a multi-step process to create cylindrical tooling for use in production processes to form microprismatic retroreflective articles, such as microprismatic retroreflective sheeting, by processes such as embossing, extruding, or cast-and-curing. U.S. Pat. No. 5,156,863 (Pricone et al.), incorporated by reference herein it its entirety, provides an illustrative process of this production tooling assembly process and is incorporated herein by reference. In some embodiments, the cylindrical tooling contains the same groove pattern 255 as the master mold. In other embodiments, the cylindrical tooling contains the same inverted groove pattern 261 and inverted microprisms 256' as the replicate article 260.

In some embodiments, forming the first grooves 214, as part of step 110, includes moving a first cutting tool 264 (e.g., a V-shaped or cone-shaped cutting tool in some embodiments) through the surface 206. The first cutting tool 264 has a cutting angle equal to the desired vertical included angle, θ, of each first groove 214 in the first set 212. In some embodiments, as part of step 110, the forming of the first zones 222 of the first grooves 214 includes, in step 120, moving the first cutting tool 264 through the surface 206 in a repeating rising and diving motion along a third direction 266 while also moving along the first direction 220, where third direction 266 is perpendicular to the first direction 220 and to the second direction 250. In some embodiments, e.g., as part of step 120, the first cutting tool 264 can be moved continuously along an entire length of the substrate surface 206 in direction 220 while at the same time rising and diving in direction 266 to form a single first groove 214. To form each additional first groove 214 of first set 212, the first cutting tool 264 is indexed a first groove index distance $Y_P$ in the second direction 250 and the same continuous movement of the first cutting tool 264 along an entire length of the substrate surface 206 in direction 220 while at the same time rising and diving in direction 266 is repeated to form each additional first groove 214 of the first set 212. This is a salient feature of the disclosure which allows larger articles to be machined without having to intermittently stop the machining process to reposition the substrate to machine a single groove or a single groove set and without having to assemble together many separate pieces to create a master mold. With prior art, because the cutting occurred in only single direction, only small lamina, shims, thin plates, or pins could be machined through a multi-step process, which then needed to be assembled together. Moreover, with prior art, only a single microprism or one or two rows of microprisms could be machined onto the surface each small lamina, shim, thin plate, or pin. In some embodiments, a first groove index distance $Y_P$ has a value in the range of about 10 microns to about 1000 microns. In other embodiments, the first groove index distance $Y_P$ has a value in the range of about 15 microns to about 500 microns. In still other embodiments, the first groove index distance $Y_P$ has a value in the range of about 25 microns to about 250 microns.

The first grooves 214 have a groove base 272, which represents the bottom of the groove. In some embodiments, the groove base 272 will be a sharp point at the vertex of a V-shaped or cone-shaped groove (FIG. 2E). In other embodiments, the groove base 272 may be slightly rounded.

When moving a first cutting tool 264 through the surface 206 to form each of the first zones 222 and second zones 223 of the first grooves 214, the cutting tool 264 is maintained in a vertical position to ensure that the vertical included angle at any location along the first groove 214 is constant and approximately equal to the angle θ. With reference to FIG. 2E, the vertical included angle is the included angle θ of the groove measured in a plane comprising both the second direction 250 and the third direction 266. When forming the first grooves 214, at any location along the first grooves 214, regardless of whether the cutting tool 264 is solely moving in direction 220 or rising and falling along direction 266 while also moving in direction 220, the vertical included angle does not change. As such, the vertical included angle θ of the first grooves 214 is a constant vertical included angle θ.

In some embodiments, as part of step 110, the forming of the first zones 222 of the first grooves 214 includes, in step 125, forming a dive section 268 and a rise section 269 (FIG. 2D). For example, the diving motions in step 120 can form the dive sections 268 and the rising motions in step 120 can form the rise sections 269. In some such embodiments, the dive section 268 is formed at a dive angle, α, having a value in a range from about 5° to about 50° and the rise section 269 is formed at a rise angle, β, having a value in a range from about 5° to about 50°. Such a range is conducive to forming microprisms having an optical axis tilt from about a 30° backward tilt to about a 15° forward tilt. In some such embodiments, the dive angle, α, is about equal to the rise angle, β (e.g., within about ±0.25°), and in some embodiments, the dive angle, α, is within 1° of the rise angle, β. In some embodiments, the dive section 268 is formed at a dive angle, α, in a range from about 5.26° to about 35.25° and the rise section 269 is formed at a rise angle, β, in a range from about 5.26° to about 35.25°, where these ranges for the dive angle, α, and rise angle, β are conducive to forming backward-tilted microprisms with an optical axis tilt up to about 30°. In still other embodiments, the dive angle, α, and rise angle, β, can have a value in a range from about 18.26° to about 32.26°. Such a range is conducive to forming backward-tilted microprisms having an optical axis tilt from about 3° to about 17° where the dive section and rise section have a shallower slope for easier direct machining, but where the resulting microprisms will still have strong performance at smaller entrance angles.

Each dive section 268 will have a first minimum depth $Z_{D1}$ and a first maximum depth $Z_{D2}$. The first minimum depth $Z_{D1}$ is measured from the top surface 206 to the groove base 272 at the shallowest position of the groove base 272 within dive section 268. In some embodiments, the first minimum depth $Z_{D1}$ will have a value in the range of about 0 microns to about 350 microns. In other embodiments, the first minimum depth $Z_{D1}$ will have a value in the range of about 10 microns to about 200 microns. The first maximum depth $Z_{D2}$ is measured from the top surface 206 to the groove base 272 at the deepest position of the groove base 272 within dive section 268. In some embodiments, the first maximum depth $Z_{D2}$ will have a value in the range of about 10 microns to about 1000 microns. In other embodiments, the first maximum depth $Z_{D2}$ will have a value in the range of about 15 microns to about 500 microns. In still other embodiments, the first maximum depth $Z_{D2}$ will have a value in the range of about 20 microns to about 250 microns. Further, each dive section 268 will have a dive section length $X_D$ in the first direction 220 as measured from the first minimum depth $Z_{D1}$ to the first maximum depth $Z_{D2}$. In some embodiments, the dive section length $X_D$ will have a value in the range of about 10 microns to about 1000 microns. In other embodiments, the dive section length $X_D$ will have a value in the range of about 15 microns to about 500 microns. In still other embodiments, the dive section length $X_D$ will have a value in the range of about 20 microns to about 250 microns.

Each rise section 269 will have a second minimum depth $Z_{R1}$ and a second maximum depth $Z_{R2}$. The second minimum depth $Z_{R1}$ is measured from the top surface 206 to the groove base 272 at the shallowest position of the groove base 272 within rise section 269. In some embodiments, the second minimum depth $Z_{R1}$ will have a value in the range of about 0 microns to about 350 microns. In other embodiments, the second minimum depth $Z_{R1}$ will have a value in the range of about 10 microns to about 200 microns. The second maximum depth $Z_{R2}$ is measured from the top surface 206 to the groove base 272 at the deepest position of the groove base 272 within rise section 269. In some embodiments, the second maximum depth $Z_{R2}$ will have a value in the range of about 10 microns to about 1000 microns. In other embodiments, the second maximum depth $Z_{R2}$ will have a value in the range of about 15 microns to about 500 microns. In still other embodiments, the second maximum depth $Z_{R2}$ will have a value in the range of about 20 microns to about 250 microns. Further, each rise section 269 will have a rise section length $X_R$ in the first direction 220 as measured from the second minimum depth $Z_{R1}$ to the second maximum depth $Z_{R2}$. In some embodiments, the rise section length $X_R$ will have a value in the range of about 10 microns to about 1000 microns. In other embodiments, the rise section length $X_R$ will have a value in the range of about 15 microns to about 500 microns. In still other embodiments, the rise section length $X_R$ will have a value in the range of about 20 microns to about 250 microns.

In some embodiments, as part of step 110, the forming of the first zones 222 of the first grooves 214 includes, in step 130, forming a transition section 270 located between the dive section 268 and the rise section 269. The transition section includes a continuous surface transition 274 between the dive sections 268 and rise sections 269 of the first zones 222 to maintain surface continuity between the dive sections and rise sections 268, 269 without the presence of a seam, ridge, gap or tooling line or other loss of surface continuity. The transition section 270 entrance 282 occurs at the first maximum depth $Z_{D2}$ of the dive section 268 and the exit 284 occurs at the second maximum depth $Z_{R2}$ of the rise section 269. In some such embodiments, for instance, the transition section 270 includes a curved surface 271 located along a groove base surface 272 of the first groove 214. In some embodiments, the curved surface 271 can have a radius, r, in a range from about 1 micron to about 50 microns, and in some embodiments, a radius value in a range from 1 micron to about 25 microns, and in some embodiments, a radius value in a range from about 1 micron to about 10 microns. The transition section 270 has a transition section length $X_T$ in the first direction 220 as measured from the transition section entrance 282 to transition section exit 282. In some embodiments, the transition section length $X_T$ will have a value in the range of about 1 micron to about 50 microns. In other embodiments, the transition section length $X_T$ will have a value in the range of about 1 micron to about 25 microns. In still other embodiments, the transition section length $X_T$ will have a value in the range of about 1 micron to about 10 microns. Maintaining a small radius, r, and small transition section length $X_T$ minimizes any curvature of the lateral faces of the resulting microprisms, which may negatively impact levels of retroreflection in resulting articles, especially at smaller observation angles.

In some embodiments, as part of step 110, the first grooves 214 have a V-shape with a constant vertical included angle, θ. In some such embodiments, the constant vertical included angle, θ, is a value in a range from about 65° to about 90°, which is conducive to forming microprisms having an optical axis tilt from about a 30° backward tilt to about a 15° forward tilt. In some embodiments, the constant vertical included angle, θ can have a value in a range from about 78.47° to about 90°, which is conducive to forming backward-tilted microprisms with an optical axis tilt up to about 30°. In some embodiments, the constant vertical included angle, θ can have a value in a range from about 80° to about 87° which is conducive to forming backward-tilted microprisms having an optical axis tilt from about 3° to about 17°, where the dive section and rise section have a shallower slope for easier direct machining, but where the resulting microprisms will still have strong performance at smaller entrance angles.

In some embodiments, as part of step 110, maximum depth $Z_T$ of the first zones 222 is a value in a range from about 10 microns to about 1000 microns. In other embodiments, the maximum depth $Z_T$ of the first zones 222 is in a range from about 15 microns to about 500 microns. In still other embodiments, the maximum depth $Z_T$ of the first zones 222 is in a range from about 20 microns to about 250 microns. One additional benefit of this disclosure is that smaller microprisms, as indicated by the maximum depth $Z_T$, can be more easily achieved. With prior art, due to the necessities of handling and precisely positioning multiple microscopic pins, lamina, shims, or thin plates, master molds containing smaller microprisms can be exceedingly difficult to prepare. Small microprisms have the benefit of making the resulting microprismatic sheeting thinner and therefore more flexible.

The second zones 223 of the first grooves 214 have a maximum depth $Z_S$. The maximum depth $Z_S$ of the second zones 223 is measured from the top surface 206 to the groove base 272 at the deepest position of the groove base 272 within the second zone 223. In some embodiments, the maximum depth $Z_S$ of the second zones 223 will have a value in the range of about 0 microns to about 750 microns. In other embodiments, the maximum depth $Z_S$ of the second zones 223 will have a value in the range of about 5 microns to about 475 microns. In still other embodiments, the maximum depth $Z_S$ of the second zones 223 will have a value in the range of about 10 microns to about 225 microns. Further, although FIG. 2D depicts the second zone 223 as having a substantially constant depth along a straight line path of the groove base 272 in first direction 220, this is not always necessary. Because at least some portion of the second zone 223 will be removed when the second grooves 240 are form, the path of the groove base 272 within the second zone 223 can have any convenient shape which simplifies the direct machining process. For example, the path of groove base 272 within the second zone could be a curve with differing depths below surface 206. Further, in some instances, the second zones 223 may include the top surface 206 of the substrate, which indicates that the first cutting tool 264 may have temporarily exited the surface of the ruling block. In such instances, the possibility exists for the maximum depth $Z_S$ of the second zones 223 to be about 0 microns. The second zones 223 have a second zone length $X_S$ in the first direction 220 as measured in the first direction 220 between the second minimum depth $Z_{R1}$ and first minimum depth $Z_{D1}$ but exclusive of the dive section 268 and the rise section 269. In some embodiments, the second zone length $X_S$ will have a value in the range of about 10 microns to about 1000 microns. In other embodiments, the second zone length $X_S$ will have a value in the range of about 15 microns to about 500 microns. In still other embodiments, the second zone length $X_S$ will have a value in the range of about 20 microns to about 250 microns.

FIG. 2B depicts a plan view of article 200 after a single first groove 214 has been formed in first direction 220 across top surface 206 to partially complete step 110 and includes the formation of dive section 268, rise section 269, and transition section 270. As can be seen in FIG. 2B with additional reference to FIG. 2D, due to the variable depth of cutting within the first zones 222, the width of the first grooves 214 in the second direction 250 will change with depth of the cutting in the third direction 266. As the cutting reaches its maximum depth $Z_T$ within the transition section 270 of the first zones 222, the width of the first grooves 214 will be at a maximum.

FIG. 2C depicts a plan view of article 200 during an intermediate stage of being manufactured after all first grooves 214 of the first set 212 have been formed. The first set 212 will contain a multitude of first grooves 214. In some embodiments, the first set 212 will contain between 2 to 10,000 first grooves 214. In other embodiments, the first set 212 will contain between 25 to 5,000 first grooves 214. In still other embodiments, the first set 212 will contain between 100 to 2,500 first grooves 214.

In some embodiments, as depicted in FIG. 2C, adjacent first grooves 214 will overlap with each other to form ridge lines 287a and 287b between adjacent first grooves 214. After subsequent manufacturing steps to complete the direct machining of article 200, ridge lines 287a and 287b will become dihedral edges between certain lateral faces of the resulting microprisms.

As shown in FIG. 2B and FIG. 2C, groove sidewalls 215a, 215b, 215c, 215d, 215e, 215f are formed as the first cutting tool 264 moves through top surface 206 to form first grooves 214. Groove sidewalls 215a and 215b are formed within dive section 268 of the first zones 222. Groove sidewalls 215c and 215d are formed within rise section 269 of the first zones 222. Groove sidewalls 215e and 215f are formed with second zones 223. After the direct machining process is complete, portions of groove sidewalls 215a, 215b, 215c, and 215d will function as lateral faces of the resulting microprisms 256.

In some embodiments, as part of step 110, the forming of the first set 212 of the first grooves 214 includes using a first cutting tool 264 having a first cutting angle θ, and, as part of step 112, the forming of the second set 235 of the second grooves 240 includes using a second cutting tool 275 having a second cutting angle φ. In some embodiments, the value of the first cutting angle θ is different than the value of the second cutting angle φ.

In some embodiments, as part of step 112, the forming of the second set 235 of the second grooves 240 includes, in step 140, removing at least portions of the second zones 223 of the first grooves 214. For instance, as a cutting tool (e.g., second cutting tool 275) passes through the first grooves 214 along the second direction 250, portions of the substrate 205 corresponding to the second zones 223, previously formed as part of step 110, are removed. In some embodiments, the entire second zones 223 can be removed. As with the forming of the first grooves 214, forming second grooves 240 includes moving a cutting tool (e.g. second cutting tool 275) in a continuous motion along the entire length of the substrate surface 206 in direction 250 as the second grooves 240 pass through the second zones 223 of the first grooves 214.

To form each additional second groove 240 of second set 235, the cutting tool (e.g. second cutting tool 275) is indexed a second groove index distance $X_P$ in the first direction 220 and the same continuous movement of the cutting tool along an entire length of the substrate surface 206 in direction 250 is repeated to form each additional second groove 240 of the second set 235. In some embodiments, the second groove index distance $X_P$ is a value in the range of about 20 microns to about 1000 microns. In other embodiments, the second groove index distance $X_P$ is a value in the range of about 25 microns to about 600 microns. In still other embodiments, the second groove index distance $X_P$ is a value in the range of about 40 microns to about 500 microns. FIG. 2F depicts a plan view of article 200 after the second set 235 of second grooves 240 has been completed. In some embodiments, the second set 235 will contain between 2 to 10,000 second grooves 240. In other embodiments, the second set 235 will contain between 25 to 5,000 second grooves 240. In still other embodiments, the first set 235 will contain between 100 to 2,500 second grooves 240.

The second grooves 240 have a groove base 282, which represents the bottom of the groove. In some embodiments, the groove base 282 will be a sharp point at the vertex of a V-shaped or cone-shaped groove (FIG. 2G). In other embodiments, the groove base 282 may be slightly rounded.

In some embodiments the second grooves 240 can have a V-shape with a constant vertical included angle, $\varphi$ (FIG. 2G). For the second grooves 240, the vertical included angle $\varphi$ is measured in a plane comprising both the first direction 220 and the third direction 266. In some such embodiments, the constant vertical included angle, $\varphi$, has a value in a range from about 10° to about 100°, and in some embodiments, a value in a range from about 10.53° to about 70.52°. This latter range is conducive for forming backwards-tilted microprisms. In still other embodiments, the constant vertical included angle, $\varphi$, has a value in a range from about 35° to about 65°. This range of values for the constant vertical included angle, $\varphi$, is conducive to forming backward-tilted microprisms having an optical axis tilt from about 3° to about 17°, which allows the dive section and rise section have a shallower slope for easier direct machining, but where the resulting microprisms will still have strong performance at smaller entrance angles.

In some embodiments the maximum depth, $Z_C$, of each of the second grooves 240 can have substantially a same depth as each other (e.g., a same $Z_C$ value ±5%). In some embodiments, the maximum depth, $Z_C$, has a value in a range from about 10 microns to about 1000 microns. In other embodiments, the maximum depth, $Z_C$, has a value in a range from about 15 microns to about 500 microns. In still other embodiments, the maximum depth, $Z_C$, has a value in a range from about 20 microns to about 250 microns. In some embodiments, the maximum depth $Z_C$ the second grooves 240 can be greater than the maximum depth $Z_T$ of the first zones 222 of the first grooves 214. In some embodiments, the maximum depth, $Z_C$, of the second grooves 240 can be less than the maximum depth $Z_T$ of the first zones 222 of the first grooves 214.

Figure 7A:
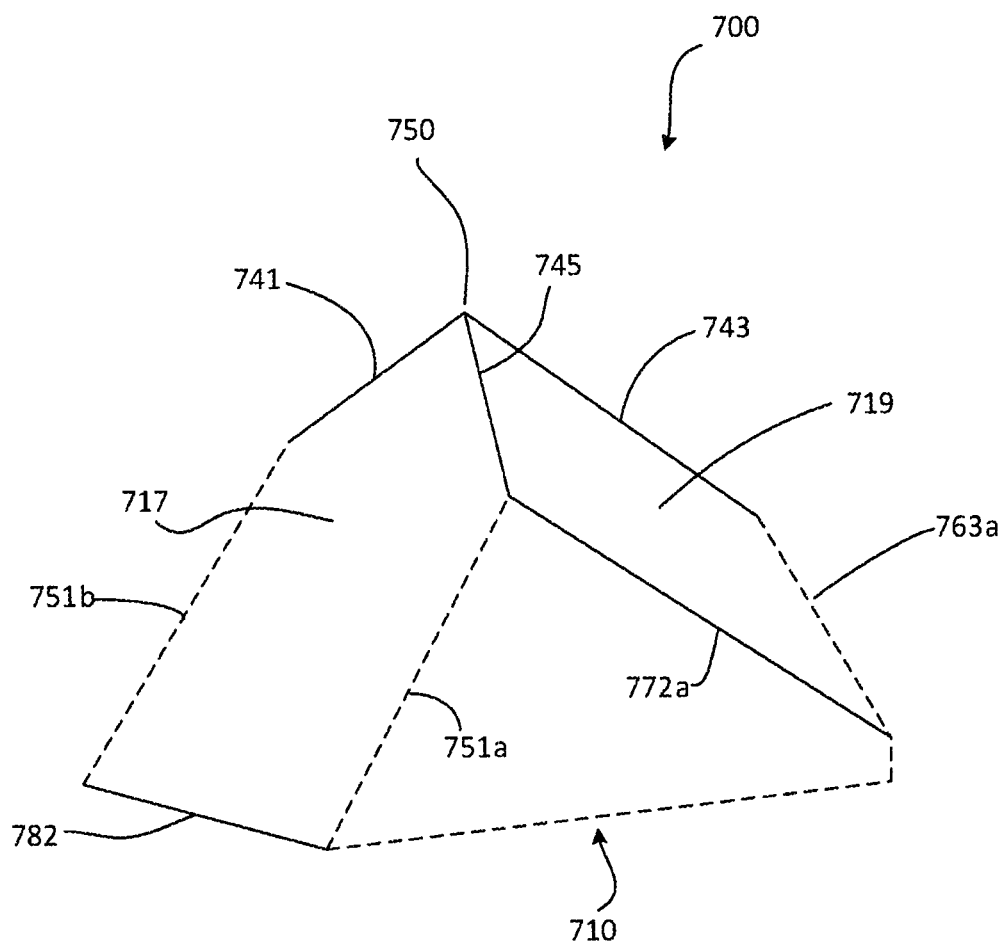
FIG. 7A presents a perspective view of a single example microprism from an example article embodiment of the disclosure.
Figure 7B:
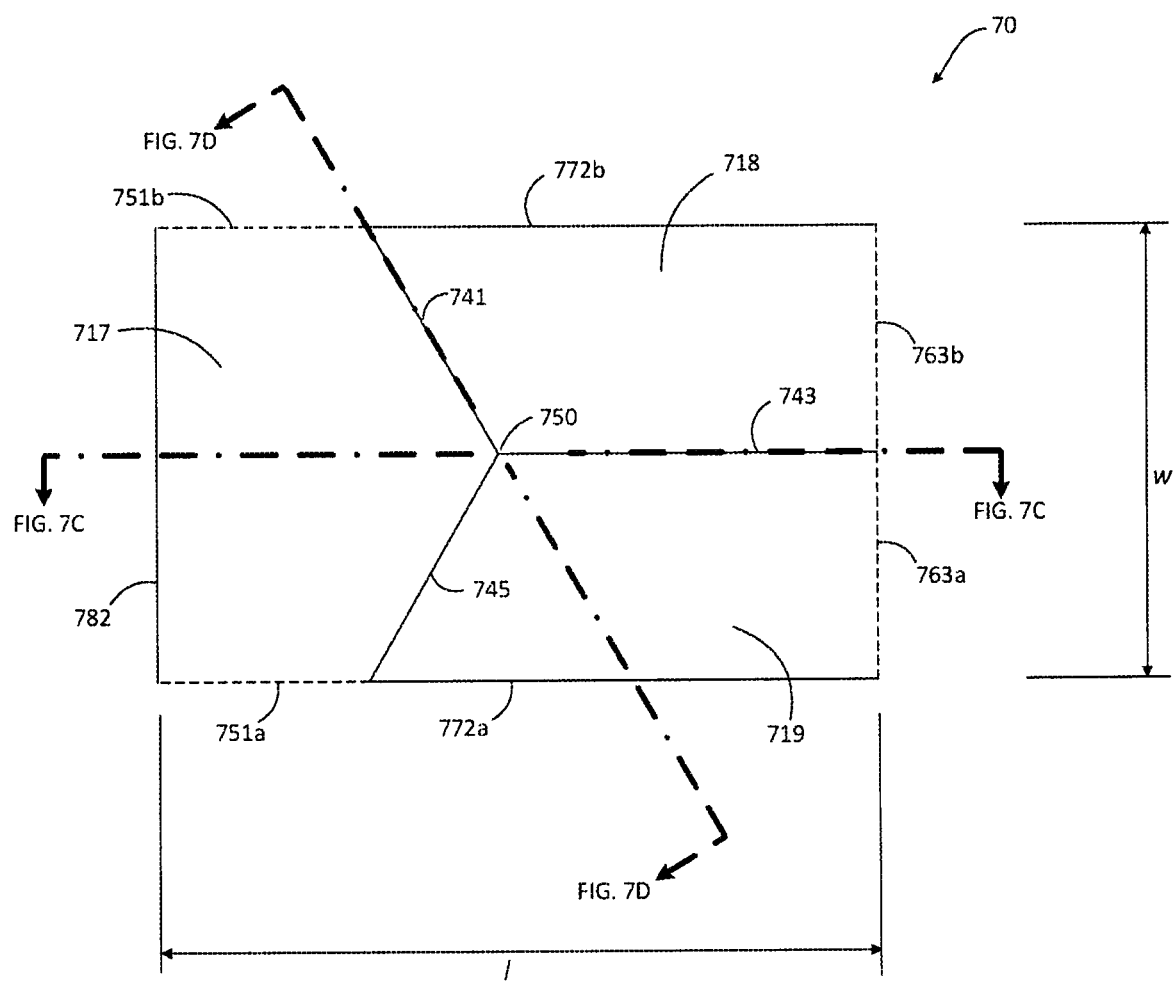
FIG. 7B presents a top down plan view of the single example microprism shown in FIG. 7A.

FIG. 7A-7D illustrate various features of the RIA microprisms of various embodiments of the disclosure. FIG. 7A shows a three-dimensional representation of a single microprism 700 of various embodiments. FIG. 7B shows a top-view. Each microprism 700 has an apex 750 and three lateral faces 717, 718, and 719. The base 710 of the microprism 700 is located opposite of the apex 750. Light entering into the microprism 700 through the base 710 will be reflected off each of the lateral faces 717, 718, and 719 to be returned towards the source of the light.

In each of the FIG. 7A-7D, the boundaries and edges of microprism 700 are defined either by a solid line or a dashed line. A solid line represents an edge of microprism 700 that can visibly be found in articles of the present disclosure. On the other hand, a dashed line represents a boundary or edge of the microprism that is not visible within articles of the present disclosure, but is shown in FIG. 7A-7D for illustrative purposes to assist in describing the various features of the microprisms. For example, bottom edge 782 of the first lateral face 717 can visibly be identified within articles of the present disclosure. However, side edges 751a and 751b of the first lateral face 717 are not visible in articles of the present disclosure. This is because first lateral face 717 is formed by the movement of a cutting tool (e.g. cutting tool 275) through the surface 206 to form second grooves 240. As the cutting tool moves through the top surface 206, it forms groove side walls 215g and 216h and second groove base 272 as each of the second grooves 240 are formed. In the resulting articles of this disclosure, groove side walls 215g and 215h function as a series of first lateral faces 717 and second groove base 272 functions as a series of bottom edges 782. Because the cutting tooling moves continuously through surface 206 and does not stop each time an additional first lateral face 717 is formed as a result of this movement, there is not a visible boundary or edge between adjacent first lateral faces 717 to demark side edges 751a and 751b. On the other hand, since second groove base 282 is visible within articles of the disclosure, bottom edge 782 can also be visibly identified within articles of the disclosure.

Since bottom edge 782 is formed as part of the second grooves 240, bottom edge 782 is substantially parallel to the second direction 250. As neither the second lateral face 718 nor the third lateral face 719 have a boundary edge substantially parallel to the second direction 250, for the purposes of this disclosure, the first lateral face 717 will be defined as the lateral face of microprism 700 having a bottom edge 782 that is substantially parallel to the second direction 250. Then, with respect to FIG. 7B, as defined herein, the second lateral face 718 will be positioned immediately clockwise to first lateral face 717, and the third lateral face 719 will be positioned immediately clockwise to the second lateral face 718.

In some embodiments, base 710 of microprism 700 will lie in a plane substantially parallel (±1°) to the top surface 206 of articles of this disclosure. In some embodiments, base 710 of microprism 700 has a quadrilateral shape. In some embodiments, base 710 of microprism 700 has a square shape. In other embodiments, base 710 of microprism 700 has a rectangular shape. The width, w, of microprism 700 is the distance in the second direction 250 of the base 710. In some embodiments, the width, w, has a value in the range of about 10 microns to about 1000 microns. In other embodiments, the width, w, has a value in the range of about 15 microns to about 500 microns. In still other embodiments, the width, w, has a value in the range of about 25 microns to about 250 microns. The length, l, of microprism 700 is the distance in the first direction 220 of the base 710. In some embodiments, the length, l, has a value in the range of about 10 microns to about 1000 microns. In other embodiments, the length, l, has a value in the range of about 15 microns to 500 microns. In still other embodiments, the length, l, has a value in the range of about 25 microns to 250 microns.

Dihedral edges 741, 743, and 745 are formed by the intersection of the lateral faces. The first dihedral edge 741 is formed by the intersection of the first lateral face 717 and the second lateral face 718. The second dihedral edge 743 is formed by the intersection of the second lateral face 718 and the third lateral face 719. The third dihedral edge is formed by the intersection of the first lateral face 717 and the third lateral face 719.

The angles between each of the lateral faces are known as the dihedral angles. The first dihedral angle is the angle between the first lateral face 717 and the second lateral face 718 and is positioned along first dihedral edge 741. The second dihedral angle is the angle between the second lateral face 718 and the third lateral face 719 and is positioned along second dihedral edge 743. The third dihedral angle is the angle between the first lateral face 717 and the third lateral face 719 and is positioned along third dihedral edge 745.

Figure 7C:
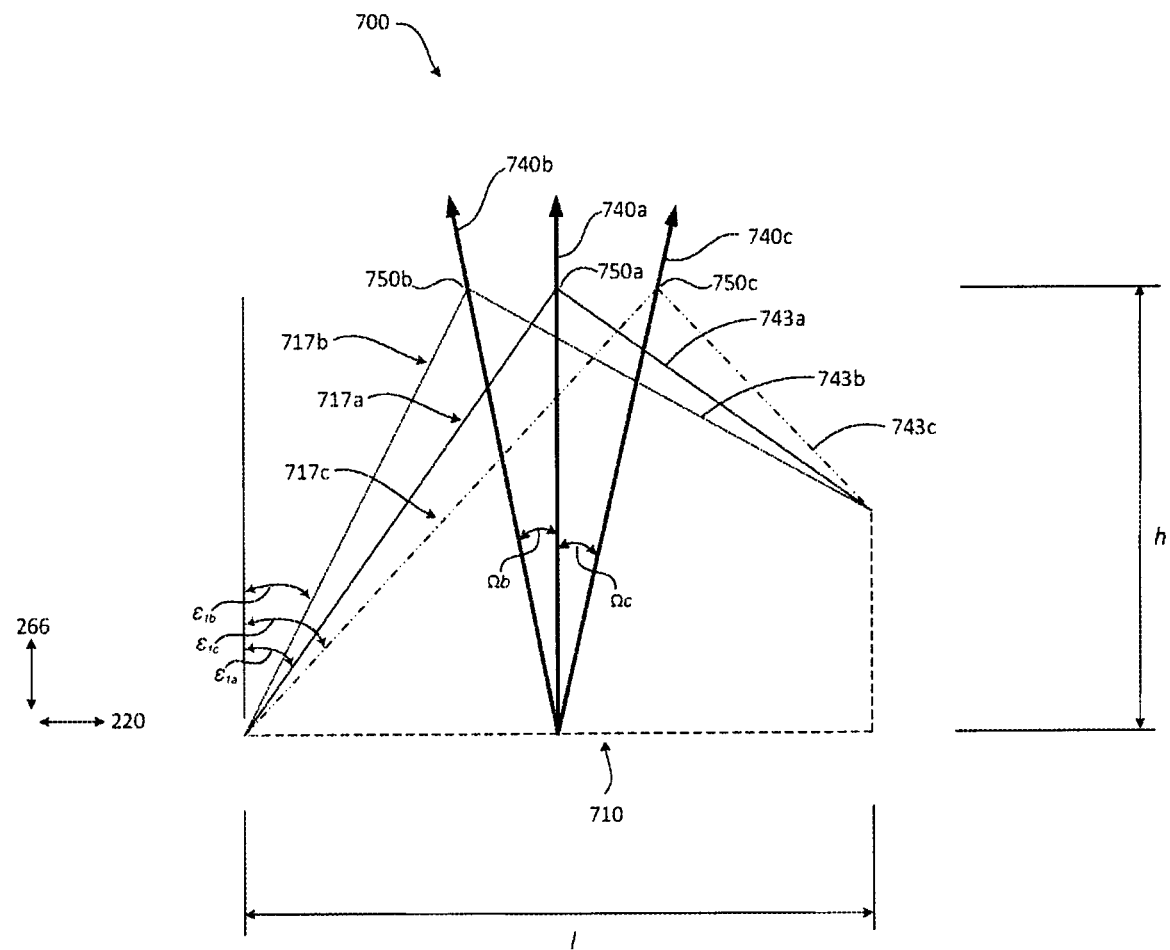
FIG. 7C presents a cross-sectional view of the single example microprism from view line 7C-7C as shown in FIG. 7B.

FIG. 7C shows a cross-sectional view of microprism 700 along view line 7C-7C. FIG. 7C shows three different variations of microprisms of the present disclosure: equilateral microprisms, forward-tilted microprisms, and backward-tilted microprisms, by showing the alignment of the optical axis 740 for each. FIG. 7C also depicts how the inclination angle $\varepsilon_1$ of the first lateral face 717 changes with each of these three classifications. The inclination angle $\varepsilon$ of each lateral face is a measure of the degree of inclination of the lateral face from the vertical position of the third direction 266 when the measurement is made in an alignment with the dihedral edge opposite the lateral face. For example, to measure the third inclination angle $\varepsilon_3$, the measurement is aligned with the first dihedral edge 741, which is opposite of the third lateral face 719. (See FIG. 7D.)

The optical axis 740 of the microprism 700 is a vector extending from the base 710 through the apex 750 that trisects the internal area of the microprism and forms an equal angle with all three lateral faces 717, 718, 719. For an equilateral microprism, the optical axis 740a is perpendicular to base 710 and the inclination angle $\varepsilon_{1a}$ of the first lateral face 717a is approximately equal to 35.26°. For a backward-tilted microprism, the optical axis 740b is tilted from the perpendicular alignment of an equilateral microprism directly towards the first lateral face 717, and the tilting occurs in a plane (i.e plane of tilting) substantially aligned in both the first direction 220 and the third direction 266 in which the second dihedral edge 743 is located. For a forward-tilted microprism, the optical axis 740c is tilted from the perpendicular alignment of an equilateral microprism directly away from the first lateral face 717, and plane of tilting is again substantially aligned in both the first direction 220 and the third direction 266 in which the second dihedral edge 743 is located. It should be noted that the plane of tilting of the optical axis 740 is the same for both forward-tilted and backwards-tilted microprisms, but the direction of the tilting is different.

The degree of tilting of the optical axis 740 from the perpendicular position associated with an equilateral microprism is the tilt angle $\Omega$. Thus, the tilt angle $\Omega$ for an equilateral microprism is 0°.

For the fourth category of microprisms, sideways-tilted microprisms (which are not shown in FIG. 7C), the optical axis 740 is tilted such that its plane of tilting does not align with any of the three dihedral edges 741, 743, 745 of the microprism. For example, for a sideways-tilted microprism, the plane of tilting of the optical axis may be substantially aligned with both the second direction 250 and the third direction 266. Additionally, a sideways-tilted microprism may also have either a forward-tilting or backwards-tilting component such that plane of optical axis tilting is not substantially aligned with either first direction 220 or second direction 250.

Each microprism of the present disclosure also has a microprism height, h, which is the distance in the third direction 266 between the base 710 and the apex 750. In some embodiments, the microprism height, h, has a value in the range of about 10 microns to about 1000 microns. In other embodiments, the microprism height, h, has a value in the range of about 15 microns to about 500 microns. In still other embodiments, the microprism height, h, has a value in the range of about 25 microns to about 250 microns. As previously discussed, one advantage of the present invention is that smaller RIA microprisms can more easily be formed. In still other embodiments, the microprism height, h, has a value in the range of about 15 microns to about 100 microns. In still other embodiments, the microprism height, h, has a value in the range of about 15 microns to about 50 microns.

Figure 7D:
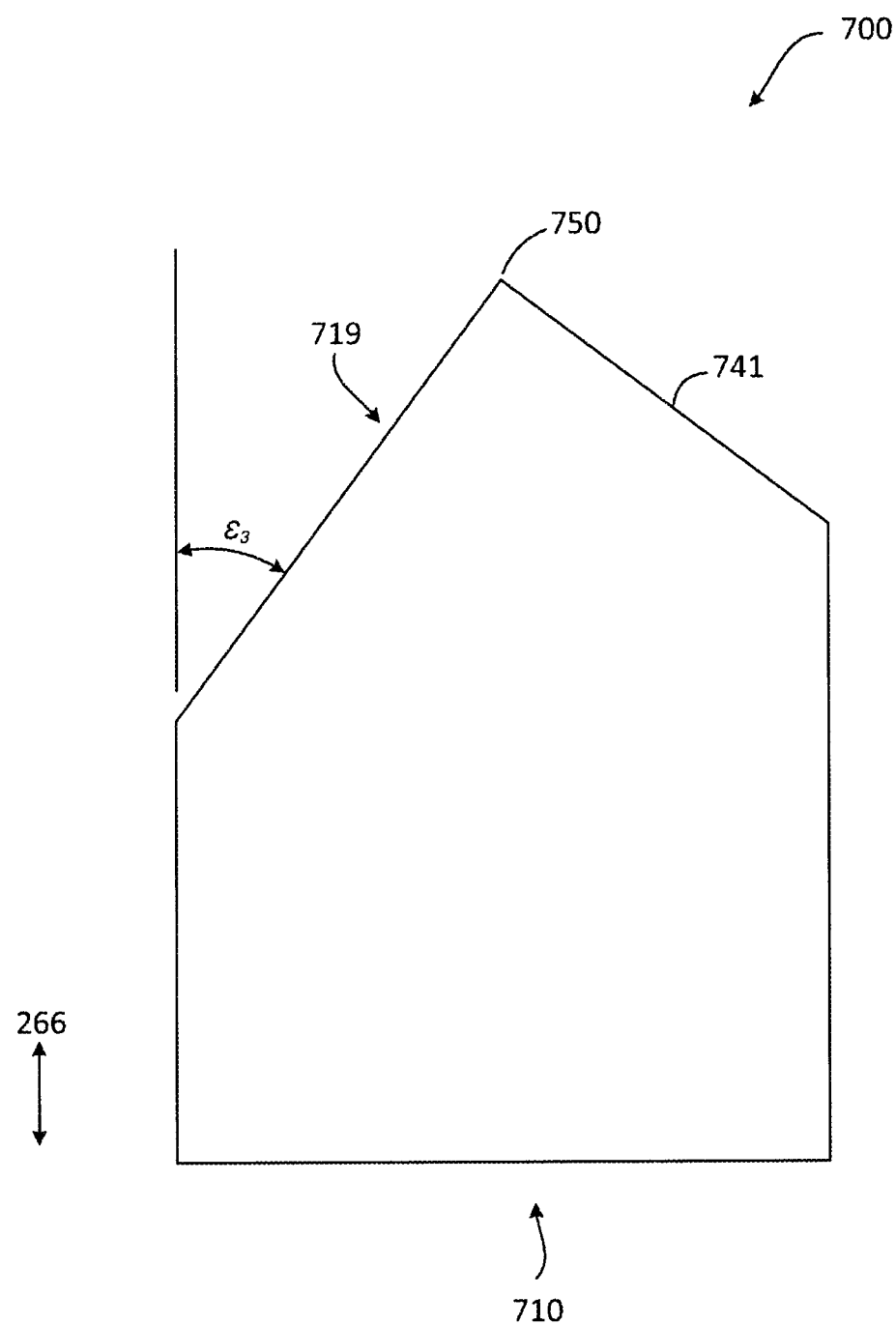
FIG. 7D presents a cross-sectional view of the single example microprism from view line 7D-7D as shown in FIG. 7B.

FIG. 7D shows a cross-sectional view of microprism 700 along view line 7D-7D. FIG. 7D depicts the inclination angle $\varepsilon_3$ of the third lateral face 719. As those in the art will recognize, the inclination angle $\varepsilon_2$ of the second lateral face 718 and the inclination angle $\varepsilon_3$ of the third lateral face 719 will also vary with the tilting of the optical axis. In some embodiments, each of the lateral faces 717, 718, and 719 are angularly aligned such that none of the lateral faces are substantially perpendicular to the top surface of an article of this disclosure and each inclination angle of the each lateral face has a value in the range from about 5° to about 50°. The benefit of having all lateral faces 717, 718, 719 angularly aligned is that levels of retroreflection will be stronger at smaller entrance angles. In some embodiments, the inclination angle $\varepsilon$ for each of the lateral faces 717, 718, 719 will have a value in the range from about 5° to about 50°. In other embodiments, the inclination angle $\varepsilon$ for each of the lateral faces 717, 718, 719 will have a value in the range from about 15° to about 45°.

Each of the lateral faces 717, 718, 719 have a surface area. In some embodiments, the surface area of the second lateral face 718 will be approximately equal to the surface area of the third lateral face 719 (e.g. within ±5%), such as many embodiments where the microprisms are equilateral microprisms, forward-tilted microprisms, or backward-tilted microprisms. In other embodiments, the surface area of the second lateral face 718 will not be approximately equal to the surface area of the third lateral face 719, such as many embodiments where the microprisms are sideways-tilted microprisms. In some embodiments, the lateral faces 717, 718, 719 will have a surface area with a value in the range of about 1,000 square-microns to about 100,000 square-microns. In some embodiments, the lateral faces 717, 718, 719 will have a surface area with a value in the range of about 2,000 square-microns to about 50,000 square-microns.

Returning now to the discussion of the method of the present disclosure, in some embodiments, as part of step 110, the forming of the first set 212 of the first grooves 214 includes, in step 135, forming at least a first subset 212A of first subset grooves 214A and a second subset 212B of second subset grooves 214B, wherein the first subset grooves 214A have a constant vertical included angle, $\theta_A$, that is greater than a constant vertical included angle, $\theta_B$, of the second subset grooves 214B. Such embodiments are conducive to forming sideways-tilted microprisms. In some such embodiments, the first subset grooves 214A alternate with the second subset grooves 214B across the top surface 206 in the second direction 250; e.g., in an, A,B,A,B, A,B . . . or B,A,B,A,B,A . . . pattern, where 'A' equals one of the first subset grooves 214A and 'B' equals one of the second subset grooves 214B. In some such embodiments, the first subset grooves 214A and the second subset grooves 214B can be formed using two different cutting tools 264a, 264b (not shown), where each cutting tool has a different cutting angle $\theta_A$, $\theta_B$.

Another embodiment of the disclosure is an article. Embodiments of the article can include any of the features of the article manufactured by embodiments of the method 100, as discussed in the context of FIGS. 1 and 2A-2G. FIGS. 2H-2N illustrate aspects of an article 200 after completion of the manufacturing steps discussed in the context of FIG. 1. Additionally, any of the articles disclosed in the context of FIGS. 3-6 can also be manufactured by embodiments of the method 100.

With continuing reference to FIGS. 1-2N throughout, the article 200 includes a substrate 205 having a surface 206 with a groove pattern 255 including microprisms 256 thereon (FIG. 2H). The groove pattern 255 includes a first set 212 of first grooves 214 intersecting with a second set 235 of second grooves 240. The first grooves 214 are parallel to each other along a same first direction 220 across the groove pattern 255. Each of the first grooves 214 include a plurality of repeating variable depth zones 280 (FIG. 2I). Each of the variable depth zones 280 include a dive section 268 having a first maximum depth, $Z_{D2}$, and a rise section 269 having a second maximum depth, $Z_{R2}$. The second grooves 240 are parallel to each other along a same second direction 250 across the surface, the second direction 250 being substantially perpendicular to the first direction 220

In some embodiments the first grooves 214 can be V-shaped grooves and the second grooves 240 can be V-shaped grooves. The term V-shaped as used herein refers to first and second side walls of the groove (e.g., sidewalls 215c and 215d, FIG. 2E) intersecting with each other to form a shape similar in shape to the letter 'V'. The groove base of the grooves is formed where the two sidewalls intersect at the bottom of the groove. In some embodiments, the groove base surface 272 or 282 can come to, or be, a sharp point. However, in other embodiments, the groove base can be slightly rounded. Each V-shaped groove (e.g. 214, 240) of the present disclosure has a vertical included angle (e.g. $\theta$, $\varphi$). In some embodiments, the vertical included angle is constant along each groove. In some embodiments, the vertical included angle can be the sum of two half-angles (e.g., $\delta_1$, $\delta_2$, FIG. 2E). In some embodiments, the two half angles can be equal to each other, while in other embodiments the two half angles cannot be equal to each other. In some embodiments, the first and second grooves 214, 240 having a V-shape can be symmetrical (e.g., equal half angles), while in other embodiments, the first and second grooves 214, 240 having a V-shaped groove can be non-symmetrical. (e.g., non-equal half angles).

In some embodiments, the substrate 205 is a monolithic block substrate. In some embodiments, the microprisms 256 are reduced inactive area microprisms. In some embodiments, the article is a configured as master mold. In still other embodiments, the article is configured as a cylindrical tooling.

In some embodiments, each of the variable depth zones 280 further includes a transition section 270 located between the dive section 268 and the rise section 269 (e.g., FIGS. 2I-2J). The transition section 270, can include a transition entrance 282, a transition exit 284, and a third maximum depth $Z_F$ there-between. In some such embodiments, the transition entrance 282 can be adjacent to the dive section 268 at the location of the first maximum depth $Z_{D2}$ and the transition exit 284 can be adjacent to the rise section 269 at the location of the second maximum depth $Z_{R2}$. In some embodiments, the transition section 270 includes a continuous surface transition 274 between the dive section 268 and the rise section 269. In some such embodiments, the transition section 270 includes the curved surface 271 located along the groove base surface 272 of the first groove 214 (FIG. 2D). In some such embodiments, the curved surface 271 can have a radius (e.g., r, FIG. 2D) in a range from about 1 micron to about 50 microns, a range from 1 micron to about 25 microns, or a range from about 1 micron to about 10 microns.

In some embodiments, adjacent pairs 290 (FIG. 2H) of the microprisms 256 are arranged as symmetrically opposite matched pairs of microprisms. Symmetrically opposite matched pairs of microprisms means that adjacent pairs are arranged as mirror images of each other along a shared common feature (such as the continuous surface transition 274).

As illustrated in FIGS. 2K-2N, in some embodiments, the first set 212 of first grooves 214 include at least a first subset 212A of first subset grooves 214A and a second subset 212B of second subset grooves 214B. The first subset grooves 214A and the second subset grooves 214B each include the transition section 270A, 270B located between the dive section 268A, 268B and the rise section 269A, 269B, respectively. Each transition section 270A, 270B include a transition entrance 282A, 282B, a transition exit 284A, 284B, and the third maximum depths $Z_{FA}$ and $Z_{FB}$, respectively. In some embodiments, the third maximum depth $Z_{FA}$ of the first subset grooves 214A can be greater than the third maximum depth $Z_{FB}$ of the second subset grooves 214B. In some embodiments, the first subset grooves 214A can alternate with the second subset grooves 214B across top surface 206 along the second direction 250.

In some such embodiments, a quaternary set 291 of the microprisms 256 are arranged as a quaternary set of symmetrically opposite matched microprisms. A quaternary set of symmetrically opposite matched microprisms is a set of four microprisms, wherein each microprism is a mirror image of the two adjacent microprisms within the set along a shared common feature (such as a transition surface transition or a groove base) with the adjacent microprism.

In some embodiments, each of the second grooves 240 can have a same maximum depth $Z_C$. In some embodiments, the maximum depth $Z_C$ of each of the second V-shaped grooves 240 can be greater than the third maximum depth $Z_F$ of the transition section 270. In some embodiments, the maximum depth $Z_C$ of each of the second V-shaped grooves 240 can be less than the third maximum depth $Z_F$ of the transition section 270.

In some embodiments, the substrate 205 can be or include a polymeric film. Many different polymeric materials can comprise the polymeric film, including acrylic polymers, polycarbonate polymers, polyvinyl chloride polymers, polyurethane polymers, and copolymers or blends thereof.

In some embodiments, the article 200 can be configured as a retroreflective sheeting. In this embodiment, as well as any other embodiments of this disclosure, as known in the art, the retroreflective sheeting may also include a backing film to create an encapsulated cellular network of microprisms within the retroreflective sheeting. Such a construction is disclosed in U.S. Pat. No. 4,025,159 (McGrath), which is incorporated herein by reference. Further, as known in the art, such a construction allows the microprisms to retroreflect light through the principles of total internal reflection. Alternatively, a reflective coating, such as a metallic coating (e.g. vacuum-coated aluminum), may be deposited on the microprisms to create a retroreflective sheeting wherein the microprisms function to retroreflect light towards its source through the principles of specular reflection. Additionally, any embodiment of retroreflective sheeting of the present disclosure may be coated with an adhesive (e.g. a pressure-sensitive adhesive) to allow the retroreflective sheeting to be bonded to another surface, such as a traffic sign substrate or the side of a vehicle.

Another embodiment of an article of the disclosure is presented in FIGS. 3A-3F. With continuing reference to FIGS. 3A-3F throughout, the article 300 includes a transparent sheet 302 having a first side 304 with a structured surface 306. The structured surface 306 includes microprisms 310 thereon, the microprisms 310 being part of a microprism array 312 on the structured surface 306. Each one of the microprisms 310 are part of adjacent pairs 314 of the microprisms 310A, 310B, such that for each one of the adjacent pairs 314: the first microprism 310A has a first lateral face 317A, a second lateral face 318A, and a third lateral face 319A; the second microprism 310B has a first lateral face 317B, a second lateral face 318B, and a third lateral face 319B; and, there is a continuous surface transition 320 between the second lateral face 318A of the first microprism 310A and the third lateral face 319B of the second microprism 310B.

Based on the present disclosure one would appreciate how the features of the article 300 (e.g., the transparent sheet 302, the structured surface 306, microprisms 310, continuous surface transition 320) can be replicated copies of analogous features of the article 200 (e.g., the substrate 205, surface 206 with the groove pattern 255, microprisms 256, continuous surface transition 274, respectively).

The term continuous surface transition 320 refers to transition area (i.e. a transition zone) where there is a maintenance of surface continuity between adjacent lateral faces of adjacent microprisms (e.g., between the second lateral face 318A of the first microprism 310A and the third lateral face 319B of the second microprism 310B). The maintenance of surface continuity occurs without the presence of a seam, ridge, gap or tooling line or other loss of continuity between the adjacent lateral faces.

Figure 3A:
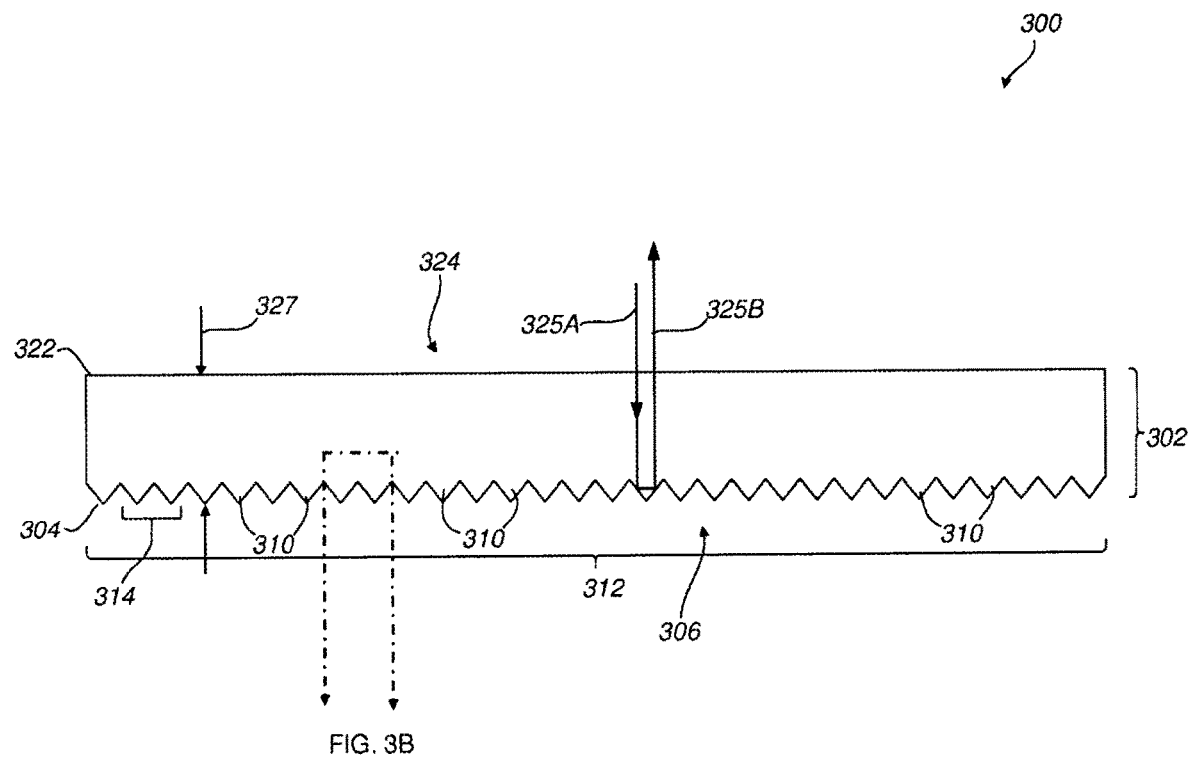
FIG. 3A presents a cross-sectional view of an another example article embodiment of the disclosure.
Figure 3B:
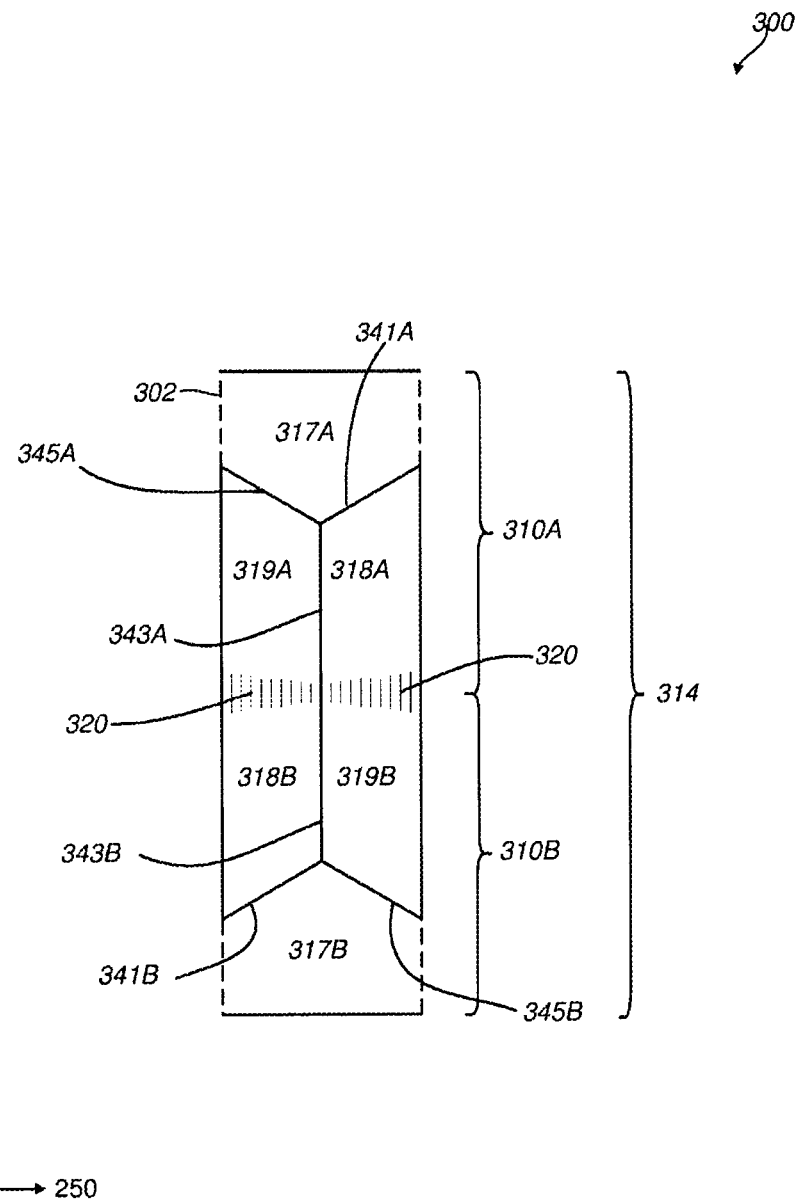
FIG. 3B presents a plan view of a portion of the article shown in FIG. 3A, along view line 3B-3B as shown in FIG. 3A.
Figure 3C:
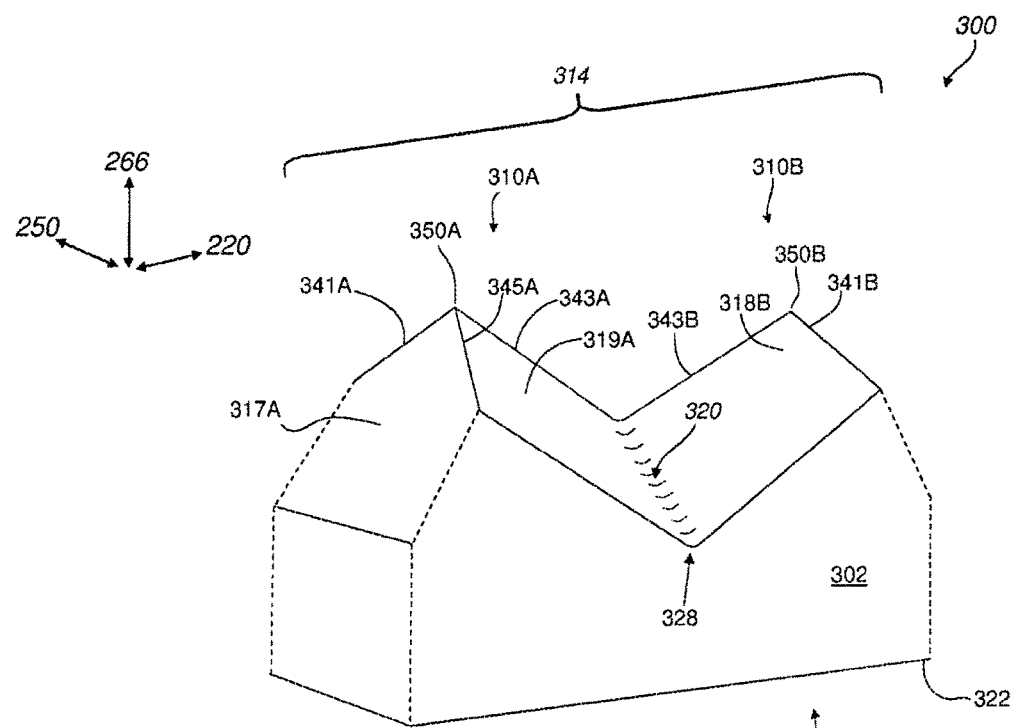
FIG. 3C presents a perspective view of the same portion of the article shown in FIG. 3B.
Figure 3D:
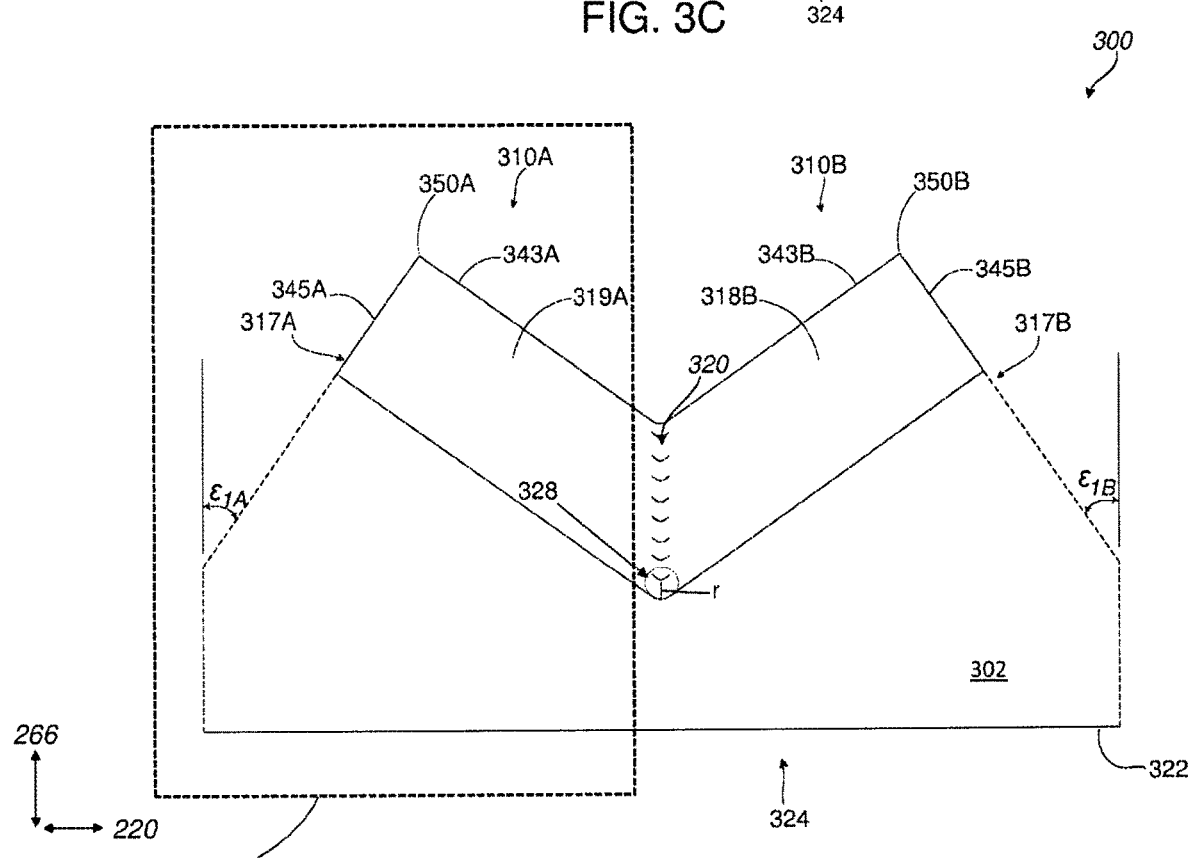
FIG. 3D presents another perspective view of the same portion of the article shown in FIG. 3B.
Figure 3E:
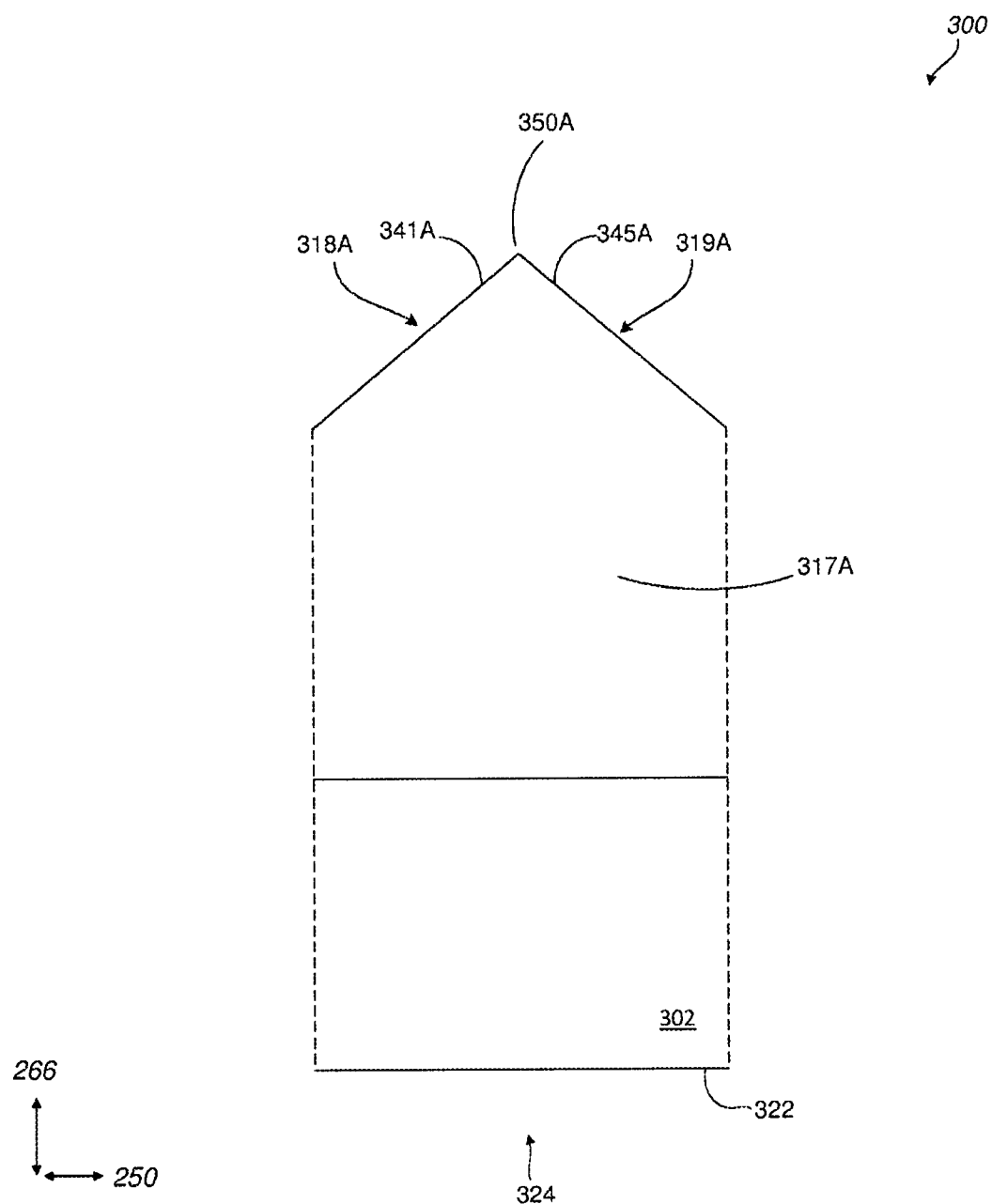
FIG. 3E presents a cross-sectional detailed view of the article corresponding to the dashed region shown in FIG. 3D.

In some embodiments the microprisms 310A, 310B of the adjacent pairs 314 are arranged as symmetrically opposite matched pairs of microprisms (FIG. 3C). In some embodiments, the first microprism 310A is a mirror image of the second microprism 310B. Still further, in some embodiments, the microprisms 310 are reduced inactive area microprisms.

Embodiments of the transparent sheet 302 can include a second side 322 opposite the first side 304, the second side 322 having a substantially smooth and planar second surface 324. As illustrated in FIG. 3A, an incoming light 325A, after passing through the second surface 324 and through the transparent sheet 302, will be reflected off each of the lateral faces 317, 318, 319 of the microprisms 310 to be reflected (e.g., as retroreflected light 325B) back through the transparent sheet 302 and out through the second surface 324 towards its source. In some such embodiments, the surface 324 of second side 322 can be configured as an external surface of the article configured as a retroreflective article, such as retroreflective sheeting. Those familiar with the art will understand that FIG. 3A, since it only depicts the incoming light 325A being reflected from two lateral faces of the microprisms, is only a simplified two-dimensional representation of how the retroreflective article functions. It will be understood, as discussed above, that the incoming light will actually be reflected from all three lateral faces of the microprisms.

The term, transparent sheet as used herein, refers to sheet materials having a luminous transmission of least 90% as measured using test method ASTM D1003. Similarly, the transmission haze of the transparent sheet will be less than 5% as measured using test method ASTM D1003. In other embodiments, the transmission haze will be less than 2.5%. Maintaining a low level of transmission haze and a high level of luminous transmission allows the retroreflective properties to be maximized.

In some embodiments, the transparent sheet 302 can be a thin sheet to allow the article 300 to be sufficiently flexible to be utilized as retroreflective sheeting. For example, in some embodiments, a thickness 327 of the transparent sheet 302 as measured from the apex 350 of the microprisms 310 on structured surface 306 to the opposite surface 324 can be a value in a range from about 50 microns to 1000 microns. In other embodiments, a thickness 327 can be a value in the range from about 75 microns to 500 microns.

In some embodiments, the transparent sheet 302 comprises polymeric materials. As stated above, many different polymeric materials can be utilized to form the transparent sheet 302, including acrylic polymers, polycarbonate polymers, polyvinyl chloride polymers, polyurethane polymers, and copolymers or blends thereof. Moreover, as known in the art, although FIG. 3A depicts transparent sheet 302 as a single layer of material, two or more layers of materials can be combined to comprise the transparent sheet 302. In some embodiments, as shown in FIG. 3G, the transparent sheet 302 may consist of a microprism layer 332 and a body layer 334, wherein the microprism layer 332 consists of a first material and the body layer 334 consists of a second material. In some such embodiments, the first side 304 of the transparent sheet 302 containing the structured surface 306 is part of the microprism layer 332. Further, the second side 322 containing the substantially smooth and planar surface 324 is part of the body layer 334. In some embodiments, both the microprism layer 332 and the body layer 334 comprise polymeric materials. For example, U.S. Pat. No. 5,450,235, incorporated herein by reference, describes a flexible retroreflective article comprising at least two different polymeric layers. In another well known example in the art, the microprism layer 332 comprises a polycarbonate polymeric material and the body layer 334 comprises an acrylic polymeric material. This combination of materials provides a quite durable and weatherable retroreflective article because the polycarbonate materials are quite strong and heat resistant while the acrylic materials are quite weatherable and can function as a protective outer surface to the article.

In some embodiments, each of the lateral faces (317, 318, 319) of each microprism 310 are angularly aligned relative to the second surface 324 such that an inclination angle ε for each of the lateral faces (317, 318, 319) is equal to a value in a range from about 5° to about 50°. Since none of the lateral faces are substantially perpendicular to the second surface 324, the resulting levels of retroreflectivity will be higher at smaller entrance angles, which (as discussed above) makes the retroreflective article suitable for use in a broader range of applications.

In some embodiments, the continuous surface transition 320 includes having a curved surface 328. For example, in some embodiments, the curved surface 328 has a radius value, r, (FIG. 3D) in a range from about 1 micron to about 50 microns, or from about 1 micron to about 25 microns, or from about 1 micron to about 10 microns.

In some embodiments, each of the microprisms 310 can be configured as one of backward-tilted, forward-tilted, or equilateral microprisms. However, in other embodiments, the microprisms 310 can be configured as two or more of backward-tilted, forward-tilted, or equilateral microprisms. In other embodiments, at least some of the microprisms 310 are configured as sideways-tilted microprisms.

In some embodiment, a surface area of each second lateral face 318 and a surface area of each third lateral face 319 are about equal to each other (e.g., within ±5%).

Figure 3F:
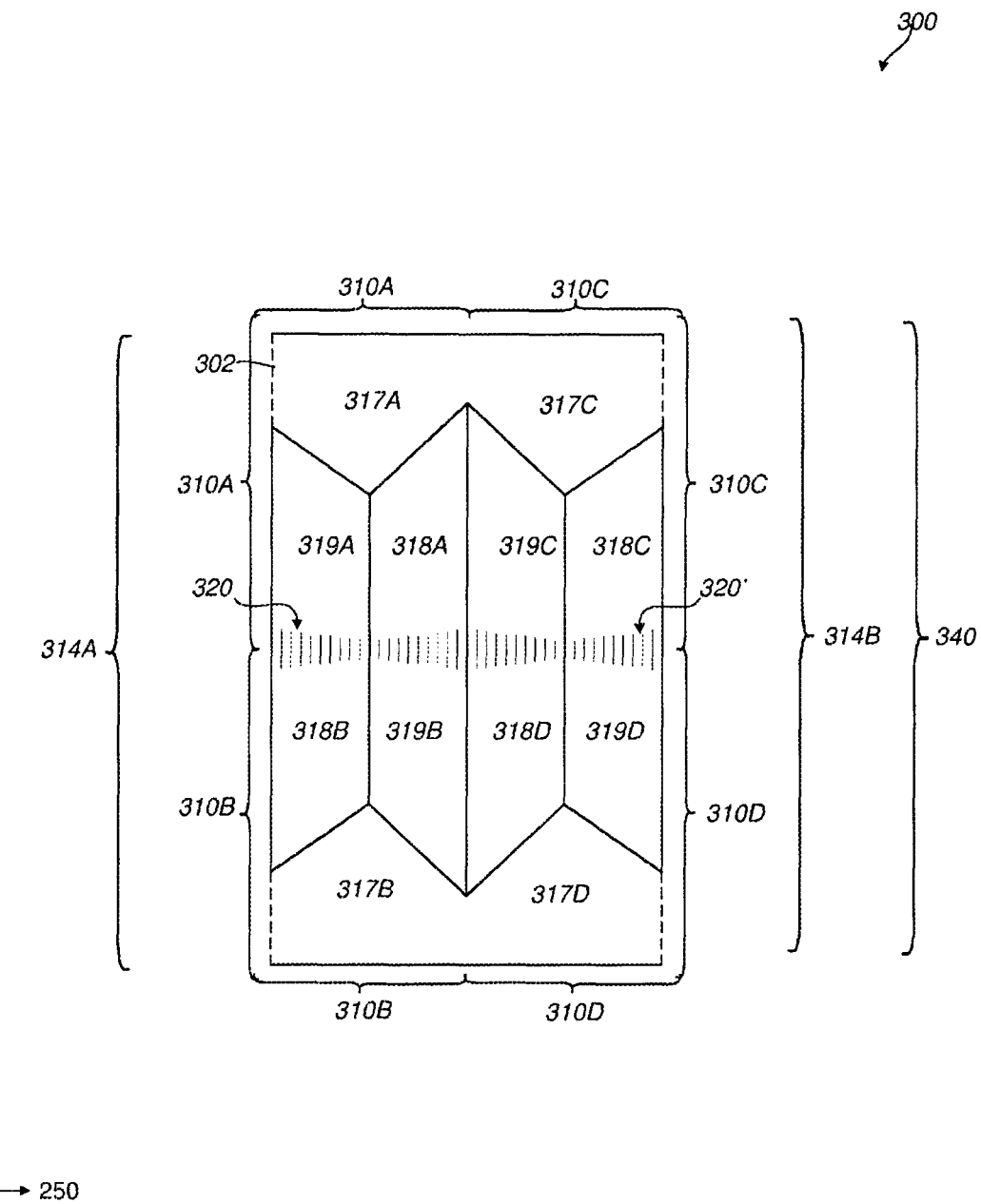
FIG. 3F presents a plan view of a portion of the article shown in FIG. 3A, along view line 3B-3B as shown in FIG. 3A.
Figure 3G:
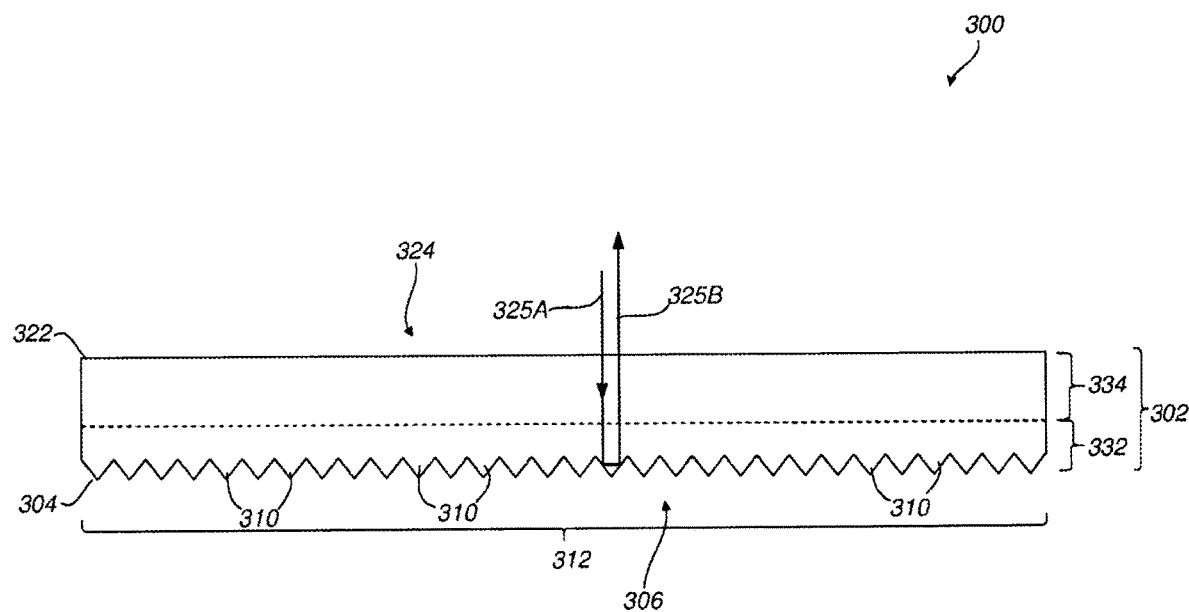
FIG. 3G presents a cross-sectional view of an another example article embodiment of the disclosure.

In some embodiments, two adjacent pairs 314A, 314B of microprisms 310 form a quaternary set 340 of symmetrically opposite matched microprisms, wherein the quaternary set 340 includes the first microprism 310A, the second microprism 310B, a third microprism 310C, and a fourth microprism 310D (FIG. 3F). The third microprism 310C has a first lateral face 317C, a second lateral face 318C, and a third lateral face 319C. The fourth RIA microprism 310D has a first lateral face 319D, a second lateral face 318D, and a third lateral face 319D. There is a continuous surface transition 320' between the second lateral face 318C of the third microprism 310C and the third lateral face 319D of the fourth microprism 310D.

In some such embodiments, a surface area of the second lateral face 318C of the third microprism 310C and a surface area of the third lateral face 319D of the fourth microprism 310D are about equal to each other (e.g., within ±5%).

In some such embodiments, a surface area of the second lateral face 318C of the third microprism 310C and a surface area of the third lateral face 319C of the third microprism 310C are not equal to each other (e.g., a greater than ±5% difference).

In some such embodiment, the first microprism 310A can be a mirror image of the third microprism 310C and the third microprism 310C can be a mirror image of the fourth microprism 310D.

Also depicted are dihedral edges 341, 343, 345 located between the faces 317, 318, 319 and microprism apexes 350 (FIGS. 3B-3F).

Still another embodiment of an article of the disclosure is presented in FIGS. 4A-4D. With continuing reference to FIGS. 4A-4D throughout, the article 400 includes a substrate 405 having a structured surface 407. The structured surface 407 includes an array 408 of microprisms 410 thereon, the microprisms 410 being part of the microprism array 408 on the structured surface 407 and the microprism array 408 including a first microprism subarray 408A and a second microprism subarray 408B.

The first subarray 408A includes a first microprism 410A and a second microprism 410B, the first microprism 410A having a first lateral face 417A, a second lateral face 418A, and a third lateral face 419A, the second microprism 410B having a first lateral face 417B, a second lateral face 418B, and a third lateral face 419B. There is a continuous surface transition 420 between the second lateral face 418A of the first microprism 410A and the third lateral face 419B of the second microprism 410B.

The second subarray 408B includes a third microprism 410C and a fourth microprism 410D, the third microprism 410C having a first lateral face 417C, a second lateral face 418C, and a third lateral face 419C, the fourth microprism 410D having a first lateral face 417D, a second lateral face 418D, and a third lateral face 419D. There is a continuous surface transition 420' between the second lateral face 418C of the third microprism 410C and the third lateral face 419D of the fourth microprism 410D. An inclination angle $\varepsilon_{1A}$ of the first lateral face 417A of the first microprism 410A is greater than an inclination angle $\varepsilon_{1C}$ of the first lateral face 417C of the third microprism 410C.

As will be understood within the art and discussed above with respect to FIG. 7C, the inclination angle $\varepsilon_1$ of the first lateral face 417 of a microprism is determined by the degree of tilting and/or the direction of tilting (i.e. alignment) of the optical axis of the microprism. If two different microprisms (e.g. 410A, 410C) have different inclination angles (e.g. $\varepsilon_{1A}$, $\varepsilon_{1C}$) of the first lateral face (e.g. 417A, 417C), then the optical axis of each microprism (e.g., 410A, 410C) will be tilted to different degrees and/or tilted (i.e. aligned) in different directions. As such, different classifications of microprisms (e.g. forward-tilted, equilateral, backwards-tilted, sideways-tilted) can be simultaneously included within the array 408 of microprisms on the structured surface 407. Because the tilting and alignment of the optical axis alters the retroreflective performance of the microprisms, a great deal of design freedom is allowed to tailor the retroreflective performance of articles of this disclosure for specific applications. For example, the first microprisms 410A and the second microprisms 410B of the first subarrays 408A can both be backward-tilted microprisms with a relatively large optical axis tilt (such as an optical axis tilt of about 12°) while the third microprisms 410C and the fourth microprisms 410D of the second subarrays 408B can both be backward-tilted microprisms with a relatively small optical axis tilt (such as an optical axis tilt of about 1°). As another example, the first microprisms 410A and the second microprisms 410B of the first subarrays 408A can both be equilateral microprisms where the optical axis is not tilted while the third microprisms 410C and the fourth microprisms 410D of the second subarrays 408B can both be backward-tilted microprisms with a moderate degree of optical axis tilt (such as an optical axis tilt of about 7°). Further, by incorporating additional subarrays into the array 408 of microprisms, additional classifications of microprisms can simultaneously be included in the array. For example, if three different subarrays (e.g. 408A, 408B, 408C) are included, then three different microprisms can also be included in the array 408 of microprisms on structured surface 407.

In some embodiments, the inclination angle $\varepsilon_{1A}$ of the first lateral face 417A of the first microprism 410A and the inclination angle $\varepsilon_{1C}$ of the first lateral face 417C of the third microprism 410C can both have values in a range from about 5° to about 50°, or from about 5° to about 35°, or from about 18° to about 32°.

In some embodiments, the inclination angle $\varepsilon_{1A}$ of the first lateral face 417A of the first microprism 410A can be at least 2° greater, or 5° greater, or 10° greater or 15° greater, than the inclination angle $\varepsilon_{1C}$ of the first lateral face 417C of the third microprism 410C.

In some embodiments of the article 400, the microprisms 410 are reduced inactive area microprisms. In still other embodiments, first microprism 410A is a mirror image of the second microprism 410B and the third microprism 410C can be a mirror image of the fourth microprism 410D.

In some embodiments, the first microprism 410A and a second microprism 410B, and, the third microprism 410C and a fourth microprism 410D, are arranged as adjacent pairs (460A, 460B). In some such embodiments, the first microprism 410A and a second microprism 410B, and, the third microprism 410C and a fourth microprism 410D, of the adjacent pairs (460A, 460B) are arranged as symmetrically opposite matched pairs of microprisms. This is analogous to the microprisms (310A, 310B) of the adjacent pairs 314 being arranged as symmetrically opposite matched pairs of microprisms as discussed in the context of FIG. 3C. In some such embodiments, the inclination angle $\varepsilon_{1A}$ of the first lateral face 417A of the first microprism 410A will be substantially equal (e.g., within about ±1°) to the inclination angle $\varepsilon_{1B}$ of the first lateral face 417B of the second microprism 410B, and the inclination angle $\varepsilon_{1C}$ of the first lateral face 417C of the third microprism 410C will be substantially equal (e.g., within about ±1°) to the inclination angle $\varepsilon_{1D}$ of the first lateral face 417D of the fourth microprism 410D.

As illustrated, the article 400 can include a first set 412 of first grooves 414 analogous to that described for any of the first sets 212 (or first subsets 212A, 212B) of first grooves 214 disclosed in the context of FIGS. 2A-2N. However, a key difference between the article 200 disclosed in the context of FIGS. 2A-2N and the article 400 disclosed in FIGS. 4A-4D is that each of the first grooves 414 of the first set 412 include at least two different variable depth zones (e.g. 480A, 480B). For each subarray (e.g. 408A, 408B) of the array 408 of microprism 410, the first grooves 414 will include a different variable depth zone (e.g. 480A, 480B).

In some embodiments, the first grooves 414 include a first variable depth zone 480A and second variable depth zone 480B. Each of the variable depth zones (e.g. 480A, 480B) include a dive section (e.g. 468A, 468B), a rise section (e.g. 469A, 469B), and a transition section (e.g. 470A, 470B) located between the dive section and rise section, which are analogous to the dive section 268, rise section 269, and transition section 270 discussed in the context of FIGS. 2A-2N.

Figure 4A:
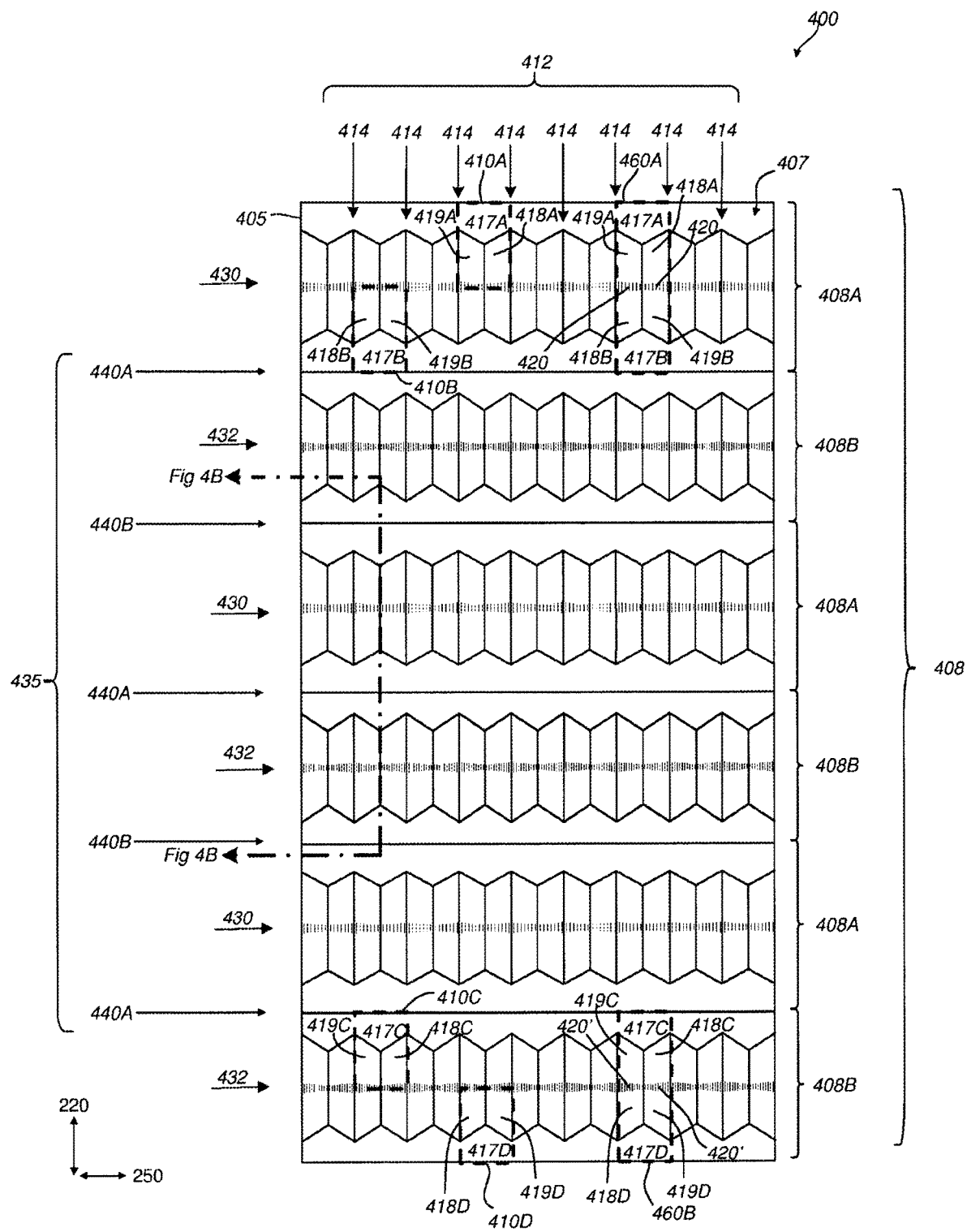
FIG. 4A presents a plan view of an another example article embodiment of the disclosure similar to the plan view shown in FIG. 2K.
Figure 4B:
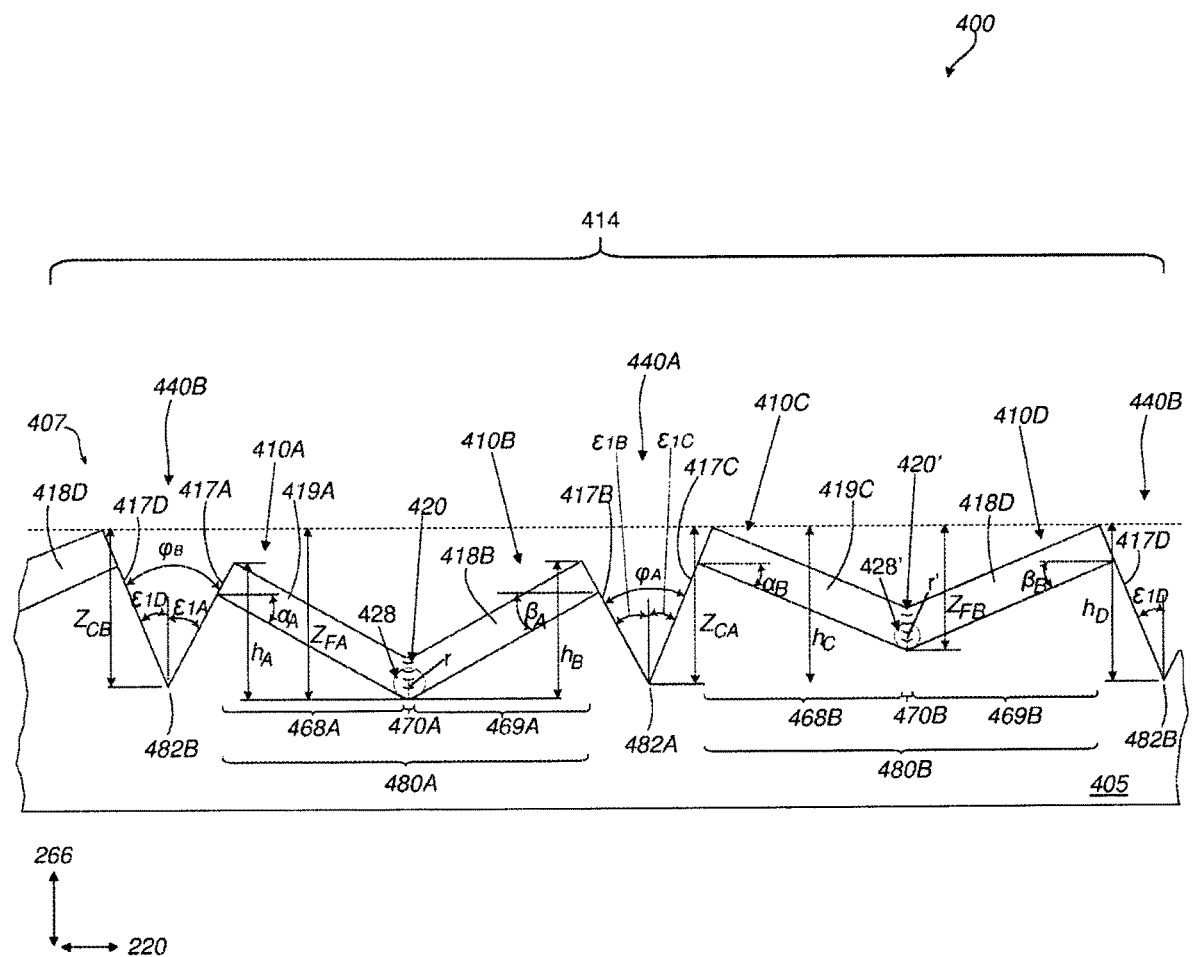
FIG. 4B presents a perspective view of the article embodiment shown in FIG. 4A from view line 4B-4B as shown in FIG. 4A.

In some embodiments, the continuous surface transition 420 (or continuous surface transition 420') can include a curved surface 428 (or 428'). In some such embodiments, the curved surface 428 (or 428') can have a radius r (or r') value in a range from about 1 micron to about 50 microns, or from about 1 micron to about 25 microns, or from about 1 micron to about 10 microns. As depicted in FIG. 4B, the continuous surface transition (e.g. 420, 420') is located within the transition section (e.g. 470A, 470B).

As illustrated, the article 400 can also include second set 435 of second grooves 440A, 440B analogous to that described for any of the second sets 235 of second grooves 240 disclosed in the context of FIGS. 2A-2N. However, a key difference is that the second grooves 440A, 440B of are not symmetrical about the groove base 482A, 482B. Given that the groove sidewalls of the second grooves 440A, 440B form the first lateral faces (e.g. 417B, 417C for second groove 440A) of two different microprisms (e.g. 410B, 410C) and given that the two different microprisms (e.g. 410B, 410C) have different inclination angles (e.g. $\varepsilon_{1B}$, $\varepsilon_{1C}$) of the first lateral faces (e.g. 417B, 417C), the included half-angles of the second grooves (which are equal to the inclination angles $\varepsilon_1$ of the first lateral faces) will be different.

In some embodiments, article 400 will include a second set 435 of two or more different second grooves 440, including a first second groove 440A and a second second groove 440B. Each second groove 440 will have a groove base 282 and a maximum depth $Z_C$. In some embodiments, the maximum depth $Z_{CA}$ of the first second groove 440A will be substantially the same as the maximum depth $Z_{CB}$ of the second second groove 440B. In some embodiments, the first second groove 440A is a mirror image of the second second groove 440B. In some such embodiments, the vertical included angle, $\varphi_A$, of the first second groove 440A will be about equal to the vertical included angle, $\varphi_B$, of the second second groove 440B. In still other embodiments, the vertical included angle, $\varphi_A$, of the first second groove 440A and the vertical included angle, $\varphi_B$, of the second second groove 440B are not symmetrical about the groove base 482A, 482B.

Figure 4C:
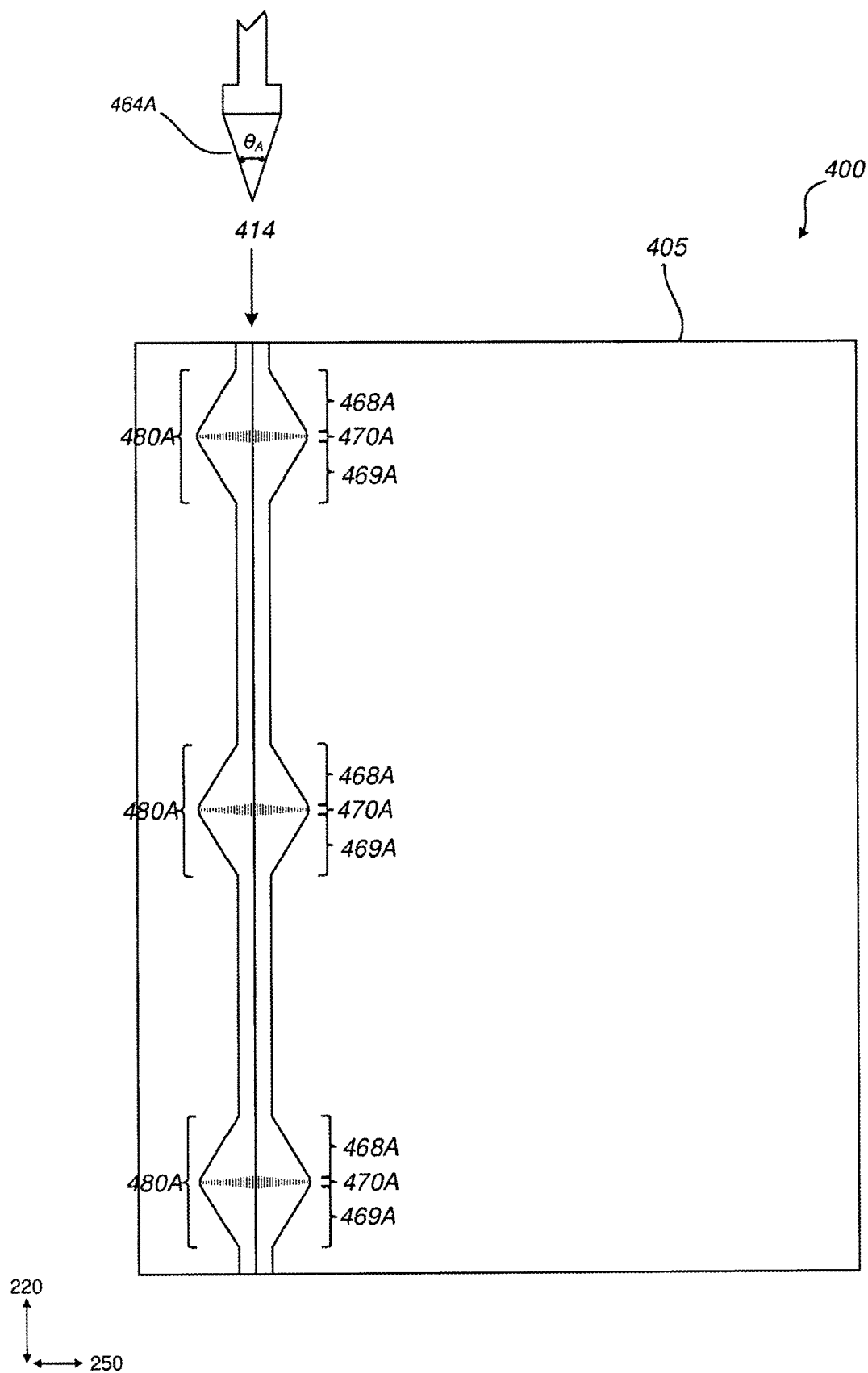
FIG. 4C presents a plan view of the article embodiment shown in FIG. 4A at an intermediate stage of manufacture.
Figure 4D:
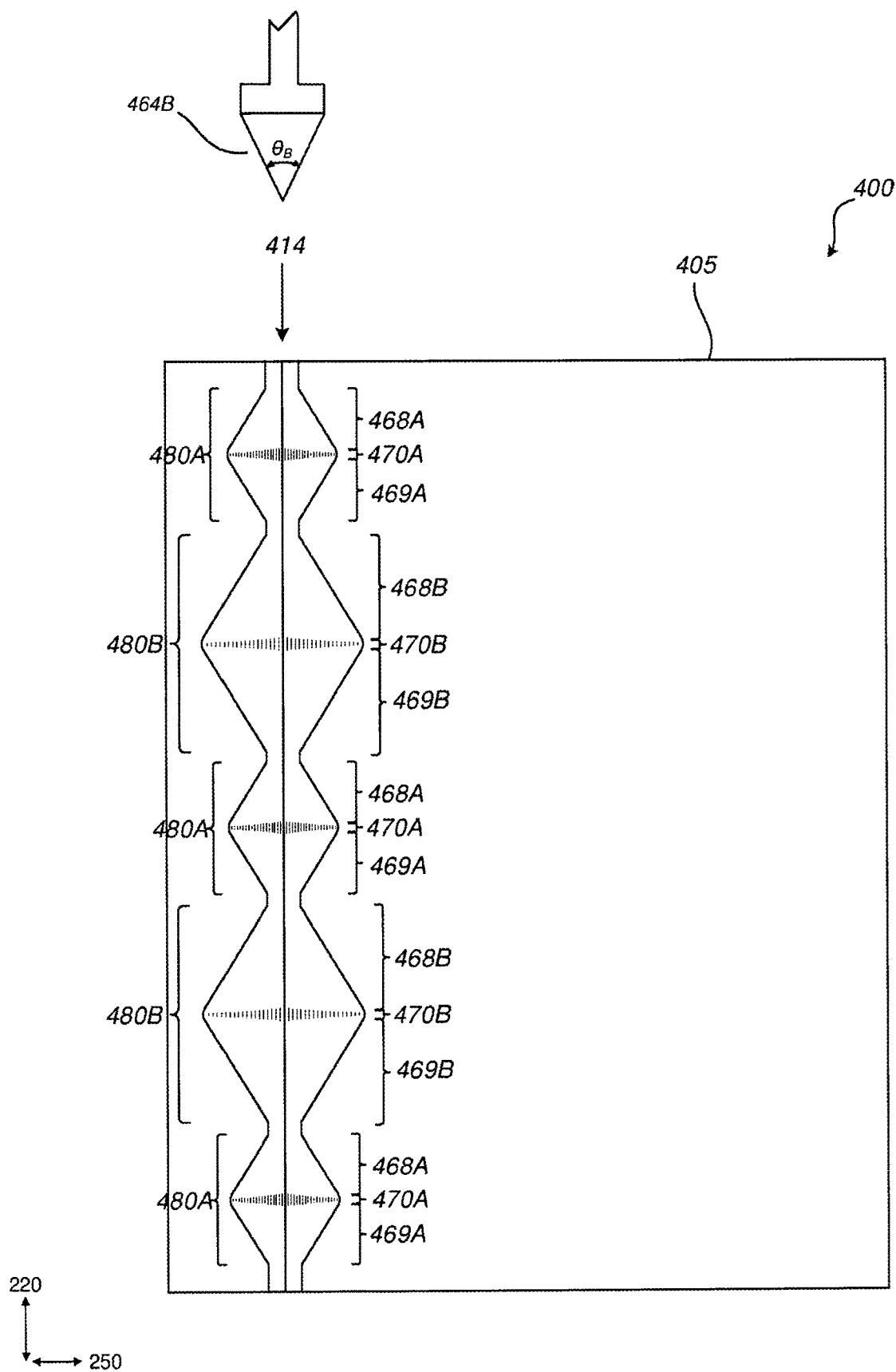
FIG. 4D presents a plan view of the article embodiment shown in FIG. 4A at an intermediate stage of manufacture.

The direct machining process to form the article 400 is analogous to the method 100 disclosed in the context of FIGS. 2A-2N. However, to form the first set 412 of first grooves 414, some embodiments will utilize two or more different cutting tools to form the first grooves 414. In some embodiments, forming the first grooves 414 involves moving a first cutting tool 464A through the surface of the substrate 405 in a repeating rising and diving motion along a third direction 266 while also moving along the first direction 220 to form the first variable depth zones 480A and then moving a second cutting tool 464B through the surface of the substrate 405 in a repeating rising and diving motion along a third direction 266 while also moving along the first direction 220 to form the second variable depth zones 480B. In some embodiments, the first cutting tool 464A is moved continuously along an entire length of the substrate 405 in the first direction 220 while at the same time rising and diving in direction 266 to partially form a single first groove 414. Then, the second cutting tool 464B is intermittently moved through the surface of substrate 405 in the first direction 220 while at the same time rising and diving in direction 266 to complete the formation of each single first groove 414. In some embodiments, the first cutting tool 464A has a first cutting angle $\theta_A$ and the second cutting tool 464B has a second cutting angle $\theta_B$. FIG. 4C depicts the substrate 405 after a single first groove 414 has been partially formed through only the continuous movement of the first cutting tool 464A across the surface of substrate 405. FIG. 4D depicts the substrate 405 after a single first groove 414 has been fully formed after both the first cutting tool 464A and the second cutting tool 464B have been moved through the surface of substrate 405.

In some embodiments, each of the first microprism subarrays 408A of the microprism array 408 consists of the first microprism 410A and the second microprism 410B, and, each of the second microprism subarrays 408B of the microprism array 408 consists of the third microprism 410C and the fourth microprism 410D. That is, first microprism subarrays 408A only have the first microprism 410A and the second microprism 410B and the second microprism subarrays 408B only have the third microprism 410C and the fourth microprism 410D.

In any such embodiments, the microprisms 410 can be configured as one of backward-tilted, forward-tilted, or equilateral microprisms. However, in other embodiments, the microprisms 410A, 410B, 410C, 410D can be configured as two or more of backward-tilted, forward-tilted, or equilateral microprisms.

In some embodiments, the first subarray 408A and the second subarray 408B can be arranged in an alternating pattern across structured surface 405. For example, the first and second subarrays 408A, 408B can be arranged in an alternating A,B,A,B,A,B or B,A,B,A,B,A pattern across the structured surface 407 (e.g. along first direction 220) where 'A' equals the first subarray 408A and 'B' equals the second subarray.

In some embodiments, each of the first subarrays 408A include a first row 430 of pairs of the first microprisms 410A and the second microprisms 410B that are mirror images of each other (e.g., a row 430 of the pairs of the first and second microprisms 410A, 410B), and, each of the second subarrays 408B include a second row 432 of pairs of the third microprisms 410C and the fourth microprisms 410D that are mirror images of each other (e.g., a second row 432 of the pairs of the third and fourth microprisms 410C, 401D). In some such embodiments as illustrated in FIG. 4A, the rows 430, 432 can alternate with each other across the structured surface 407 (e.g., along first direction 220).

In some embodiments, a height $h_A$ of the first microprism 410A is different than the height hc of the third microprism 410C. For instance, in some such embodiments, a difference between the height $h_A$ and the height $h_C$ can be greater than about 25 microns, or in other embodiments, at least about 5, 25, 50, 75 or 100 microns.

In some embodiments, the maximum depth $Z_{FA}$ of the microprisms 410A, 410B of the first subarray 408A can different than the maximum depth $Z_{FB}$ of the microprisms 410C, 410D of the second subarray 408B. For instance, in some such embodiments, a difference between the depth $Z_{FA}$ and the depth $Z_{FB}$ can be greater than about 25 microns, or in other embodiments, at least about 5, 25, 50, 75 or 100 microns.

In some embodiments, the substrate 405 is a monolithic block substrate analogous to the monolithic block substrate embodiment discussed in the context of FIGS. 2A-2N.

In some embodiments, the substrate 405 can be or include a polymeric film.

In some embodiments, the article 400 can be configured as a master mold to make replica article copies of the article, analogous to that discussed in the context of FIGS. 2A-2N.

In some embodiments, the article 400 can be configured as a retroreflective sheeting, analogous to that discussed in context of FIGS. 2A-2N.

For many embodiments of this disclosure, the microprisms are substantially orthogonal microprisms, where each of the dihedral angles between the lateral faces of the microprisms will be approximately equal to 90°. For the purpose of this disclosure, substantially orthogonal shall mean within +/−0.25° of 90°. Substantially orthogonal microprisms generally allow the highest levels of retroreflection to occur at small observation angles, such as 0.1° or 0.2°. As will be understood by those knowledgeable in the art, to directly machine substantially orthogonal microprisms, each of the direct machining parameters (such as the cutting angle of the cutting tools or the dive angle α or rise angle β) must be approximately equal to the corresponding angles of orthogonality. In other words, if each machining parameter is maintained at the corresponding angle of orthogonality, the resulting microprisms will be substantially orthogonal. However, if one or more of the parameters deviate too greatly from the corresponding angles of orthogonality, the resulting microprism will not be substantially orthogonal.

Each different type of microprism (e.g. forward-tilted, backward-tilted, etc.) with a different degree or direction of the optical axis tilting will have a unique set of corresponding angles of orthogonality for certain design parameters. Table 1 summarizes the angles of orthogonality for important machine and design parameters for a variety of different microprisms contemplated by this disclosure. However, it should be noted that Table 1 does not provide a complete list of all possible microprisms contemplated by this disclosure.

TABLE 1

| Type of Microprism | Tilt Angle of Optical Axis | Dive Angle α | Rise Angle β | Constant Vertical Included Angle θ | Half Angle of First Grooves δ | Constant Vertical Included Angle φ | Inclination Angle of First Lateral Face $\varepsilon_1$ |
|---|---|---|---|---|---|---|---|
| Backwards-Tilted | 30° | 5.26° | 5.26° | 89.76° | 44.88° | 10.53° | 5.26° |
| Backwards-Tilted | 29° | 6.26° | 6.26° | 89.66° | 44.83° | 12.53° | 6.26° |
| Backwards-Tilted | 28° | 7.26° | 7.26° | 89.54° | 44.77° | 14.53° | 7.26° |
| Backwards-Tilted | 27° | 8.26° | 8.26° | 89.40° | 44.70° | 16.53° | 8.26° |
| Backwards-Tilted | 26° | 9.26° | 9.26° | 89.25° | 44.63° | 18.53° | 9.26° |
| Backwards-Tilted | 25° | 10.26° | 10.26° | 89.08° | 44.54° | 20.53° | 10.26° |
| Backwards-Tilted | 24° | 11.26° | 11.26° | 88.89° | 44.45° | 22.53° | 11.26° |
| Backwards-Tilted | 23° | 12.26° | 12.26° | 88.68° | 44.34° | 24.53° | 12.26° |
| Backwards-Tilted | 22° | 13.26° | 13.26° | 88.45° | 44.23° | 26.53° | 13.26° |
| Backwards-Tilted | 21° | 14.26° | 14.26° | 88.21° | 44.11° | 28.53° | 14.26° |
| Backwards-Tilted | 20° | 15.26° | 15.26° | 87.93° | 43.97° | 30.53° | 15.26° |
| Backwards-Tilted | 19° | 16.26° | 16.26° | 87.66° | 43.83° | 32.53° | 16.26° |
| Backwards-Tilted | 18° | 17.26° | 17.26° | 87.30° | 43.65° | 34.53° | 17.26° |
| Backwards-Tilted | 17° | 18.26° | 18.26° | 87.04° | 43.52° | 36.53° | 18.26° |
| Backwards-Tilted | 16° | 19.26° | 19.26° | 86.70° | 43.35° | 38.53° | 19.26° |

TABLE 1-continued

| Type of Microprism | Tilt Angle of Optical Axis | Dive Angle α | Rise Angle β | Constant Vertical Included Angle θ | Half Angle of First Grooves δ | Constant Vertical Included Angle φ | Inclination Angle of First Lateral Face ε₁ |
|---|---|---|---|---|---|---|---|
| Backwards-Tilted | 15° | 20.26° | 20.26° | 86.34° | 43.17° | 40.53° | 20.26° |
| Backwards-Tilted | 14° | 21.26° | 21.26° | 85.96° | 42.98° | 42.53° | 21.26° |
| Backwards-Tilted | 13° | 22.26° | 22.26° | 85.56° | 42.78° | 44.53° | 22.26° |
| Backwards-Tilted | 12° | 23.26° | 23.26° | 85.15° | 42.58° | 46.53° | 23.26° |
| Backwards-Tilted | 11° | 24.26° | 24.26° | 84.71° | 42.35° | 48.53° | 24.26° |
| Backwards-Tilted | 10° | 25.26° | 25.26° | 84.25° | 42.13° | 50.53° | 25.26° |
| Backwards-Tilted | 9° | 26.26° | 26.26° | 83.77° | 41.89° | 52.53° | 26.26° |
| Backwards-Tilted | 8° | 27.26° | 27.26° | 83.27° | 41.64° | 54.53° | 27.26° |
| Backwards-Tilted | 7° | 28.26° | 28.26° | 82.75° | 41.38° | 56.53° | 28.26° |
| Backwards-Tilted | 6° | 29.26° | 29.26° | 82.20° | 41.10° | 58.53° | 29.26° |
| Backwards-Tilted | 5° | 30.26° | 30.26° | 81.64° | 40.82° | 60.53° | 30.26° |
| Backwards-Tilted | 4° | 31.26° | 31.26° | 81.05° | 40.53° | 62.53° | 31.26° |
| Backwards-Tilted | 3° | 32.26° | 32.26° | 80.44° | 44.22° | 64.53° | 32.26° |
| Backwards-Tilted | 2° | 33.26° | 33.26° | 79.80° | 39.90° | 66.53° | 33.26° |
| Backwards-Tilted | 1° | 34.26° | 34.26° | 79.14° | 39.57° | 68.53° | 34.26° |
| Equilateral | 0° | 35.26° | 35.26° | 78.46° | 39.23° | 70.53° | 35.26° |
| Forward-Tilted | 1° | 36.26° | 36.26° | 77.76° | 38.88° | 72.53° | 36.26° |
| Forward-Tilted | 2° | 37.26° | 37.26° | 77.03° | 38.52° | 74.53° | 37.26° |
| Forward-Tilted | 3° | 38.26° | 38.26° | 76.28° | 38.14° | 76.53° | 38.26° |
| Forward-Tilted | 4° | 39.26° | 39.26° | 75.50° | 37.75° | 78.53° | 39.26° |
| Forward-Tilted | 5° | 40.26° | 40.26° | 74.69° | 37.35° | 80.53° | 40.26° |
| Forward-Tilted | 6° | 41.26° | 41.26° | 73.86° | 36.93° | 82.53° | 41.26° |
| Forward-Tilted | 7° | 42.26° | 42.26° | 73.01° | 36.51° | 84.53° | 42.26° |
| Forward-Tilted | 8° | 43.26° | 43.26° | 72.12° | 36.06° | 86.53° | 43.26° |
| Forward-Tilted | 9° | 44.26° | 44.26° | 71.22° | 35.61° | 88.53° | 44.26° |
| Forward-Tilted | 10° | 45.26° | 45.26° | 70.28° | 35.14° | 90.53° | 45.26° |
| Forward-Tilted | 11° | 46.26° | 46.26° | 69.32° | 34.66° | 92.53° | 46.26° |
| Forward-Tilted | 12° | 47.26° | 47.26° | 68.32° | 34.16° | 94.53° | 47.26° |

Still another embodiment of an article of the disclosure is presented in FIGS. 5A-5I. With continuing reference to FIGS. 5A-5I throughout, the article 500 includes a substrate 505 having a surface 507 with a groove pattern 555 including slightly non-orthogonal microprisms (e.g., RIA microprisms analogous to the microprisms 410 discuss in the context of FIG. 4A-4B but slightly non-orthogonal) thereon. The groove pattern 555 includes a first set 512 of first grooves 514 (e.g., V-shaped grooves) intersecting with a second set 535 of second grooves 540 (e.g., V-shaped grooves). The first grooves 514 are parallel to each other (e.g. adjacent first grooves 514 have an angle between each other of 0°±1°) along a same first direction 220 across the groove pattern 555, and each of the first grooves 514 include a set 518 of variable depth zones 580.

Each of the variable depth zone 580 includes, and in some embodiments consists of: a dive section 568, a rise section 569, and a transition section 570. The dive section 568 has a first minimum depth $Z_{D1}$, a first maximum depth $Z_{D2}$, and a first horizontal distance $X_D$, the rise section 569 has a second minimum depth $Z_{R1}$, a second maximum depth $Z_{R2}$, and a second horizontal distance $X_R$, and the transition section 570 having a transition entrance 584, a transition exit 585, and a third maximum depth $Z_F$. The third maximum depth $Z_F$ is greater than both the first minimum depth $Z_{D1}$ and the second minimum depth $Z_{R1}$.

The second grooves 540 are parallel to each other (e.g. adjacent second grooves 540 have an angle between each other of 0°±1°) along a same second direction 250 across the surface being substantially perpendicular to the first direction 220.

The term slightly non-orthogonal microprisms as used herein refers to microprisms in which one or more of the dihedral angles between the lateral faces of the microprism deviate between about +/−0.25° to about +/−2.0° from being substantially orthogonal. Such slight non-orthogonality of the dihedral angles is an intentionally introduced dihedral angle error. That is, an intentional dihedral angle error is greater than the error expected to occur due to variations in machine tolerances used in the manufacture of the article 500 (e.g. inaccuracies of the cutting angle of the cutting tools). The presence of intentional dihedral angle errors can advantageously alter the retroreflectivity of the article 500 configured as a retroreflective sheeting due to the improvement of retroreflective properties at larger observation angles such as 0.5° or 1.0°. The retroreflective performance at such larger observation angles can be particularly important when the retroreflective sheeting is viewed at shorter viewing distances.

This disclosure contemplates several methods to intentionally create the dihedral angle errors. In one embodiment, intentional errors are introduced to the cutting angles of the cutting tools, which results in deviations from the corresponding angles of orthogonality for the vertical included angles ($\theta$, $\varphi$) of the first grooves 514 and second grooves 540 respectively. In another embodiment, the vertical included angles ($\theta$, $\varphi$) of the first grooves 514 and second grooves 540 respectively are non-symmetrical about the groove base (581, 582) such that intentional errors are created within the groove half-angles (e.g. $\delta_1$ and $\delta_2$) to create deviations from the corresponding angles of orthogonality. In still other embodiments, all or a portion of the either the first grooves 514 and/or the second grooves 540 are slightly misaligned (i.e. skewed) from being perpendicular to each other. In still other embodiments, the dive section 568 and/or the rise section 569 are formed using either a dive angle $\alpha$ and/or a rise angle $\beta$ that deviate from the corresponding angles of orthogonality. Those skilled in the art will recognized that other methods are possible to create slightly non-orthogonal microprisms.

In some embodiments, the transition section 570 includes a continuous surface transition 520 between the dive sections 568 and rise sections 569. (e.g., analogous to the continuous surface transition 274 disclosed in the context of FIGS. 2H-2J).

In some embodiments, the transition section 570 includes a curved surface 571 located along a groove base surface 581 of the first grooves 514. In some embodiments, the curved surface 571 can have a radius, r, in a range from about 1 micron to about 50 microns, and in some embodiments, a radius value in a range from 1 micron to about 25 microns, and in some embodiments, a radius value in a range from about 1 micron to about 10 microns.

In some embodiments, the first horizontal distance $X_D$ is less than the second horizontal distance $X_R$. In some such embodiments, a difference between the first horizontal distance $X_D$ and the second horizontal distance $X_R$ is a value between about 1 micron and about 15 microns. In other such embodiments, a difference between the first horizontal distance $X_D$ and the second horizontal distance $X_R$ is a value between about 1 micron and about 10 microns.

In some embodiments, the dive section 568 has a dive angle $\alpha$, the rise section 569 has a rise angle $\beta$, and the dive angle $\alpha$ differs from the rise angle $\beta$ by about 0.25° to about 1.0°. In some such embodiments, the dive angle $\alpha$ can be a value in a range from about 5° to about 45°.

Figure 5A:
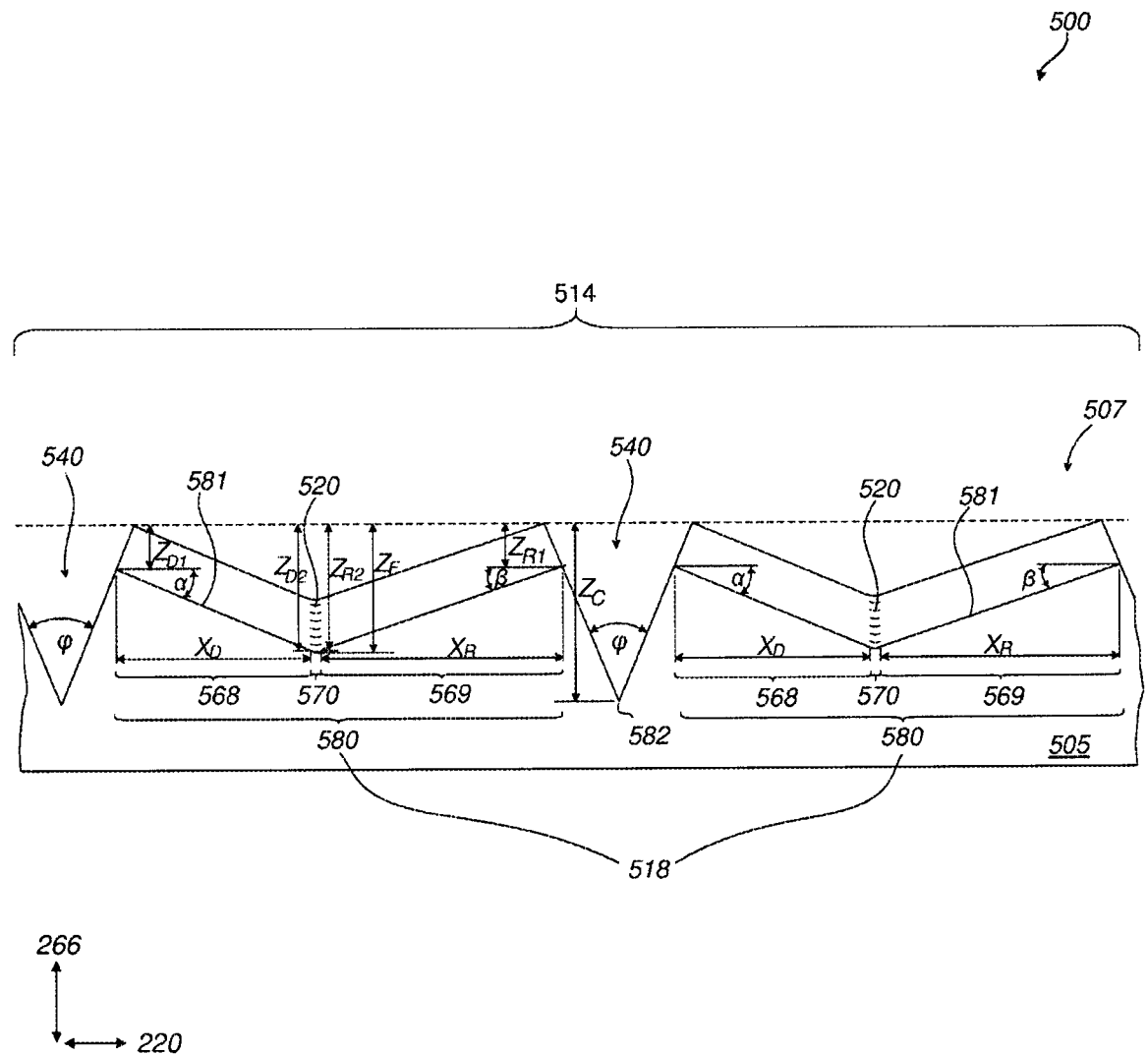
FIG. 5A presents a perspective view of another example article embodiment of the disclosure similar to the view shown in FIG. 4B.
Figure 5B:
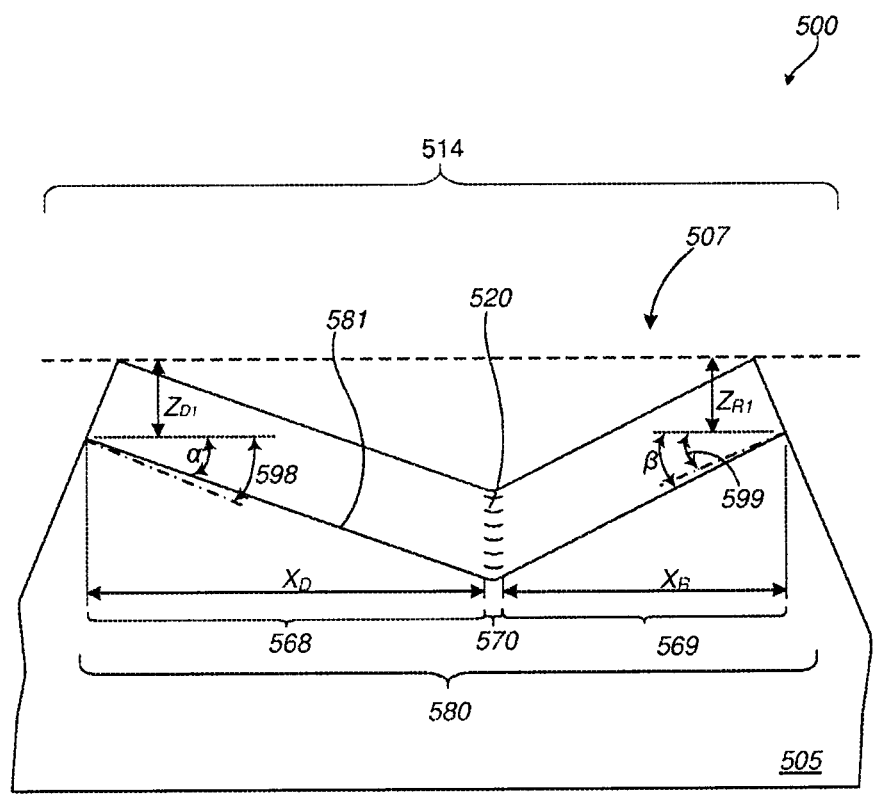
FIG. 5B presents a detailed perspective view of the example article embodiment of the disclosure shown in FIG. 5A similar to the view shown in FIG. 4B.
Figure 5B:
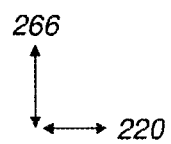
Figure 5C:
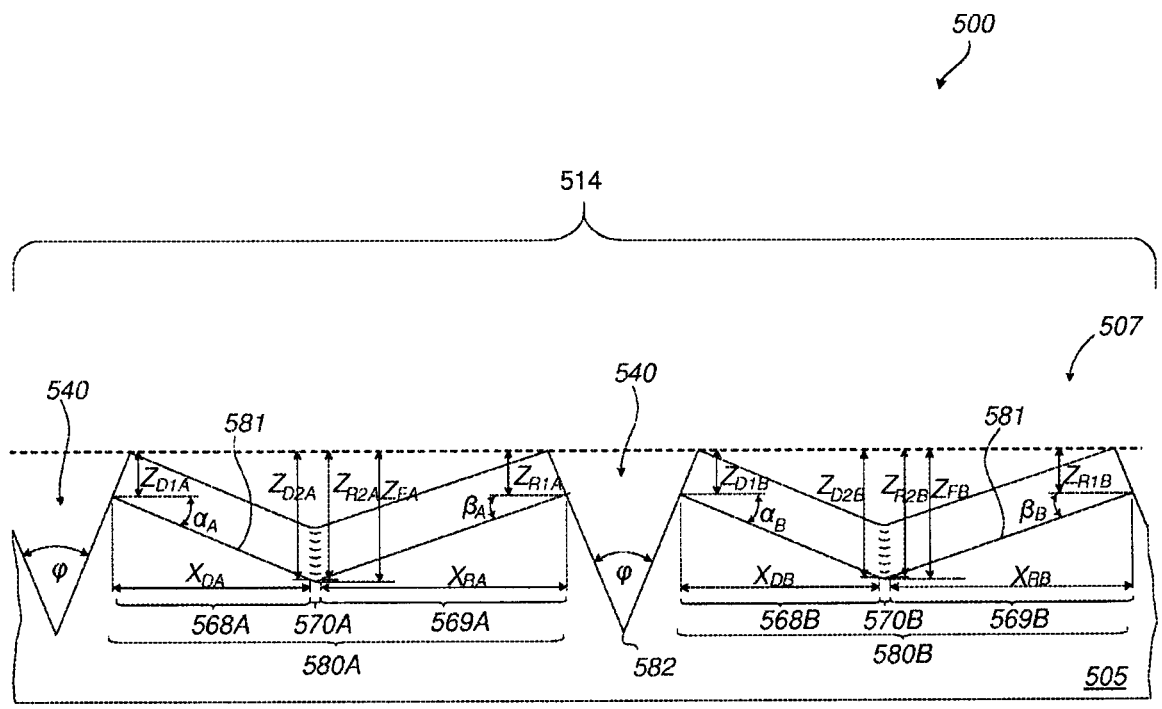
FIG. 5C presents another detailed perspective view of the example article embodiment of the disclosure shown in FIG. 5A similar to the view shown in FIG. 4B.
Figure 5C:
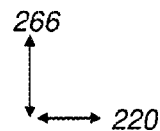

In some embodiments, the dive section 568 has a dive angle $\alpha$ which is less than a corresponding angle of orthogonality 598 by about 0.25° to about 1.0°, and the rise section 569 has a rise angle $\beta$ which is greater than a corresponding angle of orthogonality 599 by 0.25° to about 1.0°. (FIG. 5B). The corresponding angle of orthogonality 598, 599 refers to that dive angle $\alpha$ or that rise angle $\beta$ necessary for the resulting microprisms to be substantially orthogonal.

In some embodiments, the set 518 of variable depth zones 580 includes two or more subsets of variable depth zones, including a first subset 518A and a second subset 518B. The variable depth zones 580A of the first subset 518A includes (and in some embodiments consists of): the first dive section 568A having a first dive angle $\alpha_A$, the first rise section 569A having a first rise angle $\beta_A$, the first transition section 570A located between the first dive section 568A and the first dive section 569A, and the first dive angle $\alpha_A$ is about equal to the first rise angle $\beta_A$ (e.g., within ±0.25°). The variable depth zones 580B of the second subset 518B includes (and in some embodiments consists of): the second dive section 568B having a second dive angle $\alpha_B$, the second rise section 569B having a second rise angle $\beta_B$, the second transition section 570B located between the second dive section 568B and the second dive section 569B, and the second dive angle $\alpha_B$ differs from the second rise angle $\beta_B$ by about 0.25° to about 1.0°. In some such embodiments, the variable depth zones 580A of the first subset 518A and the variable depth zones 580B of the second subset 518B are arranged in an alternating pattern along the first direction 220 of the first grooves 514. E.g., arranged in a A,B,A,B,A,B or B,A,B,A, B,A pattern where 'A' equals the variable depth zones 580A of the first subset 518A and 'B' equals the variable depth zones 580B of the second subset 518B.

Figure 5D:
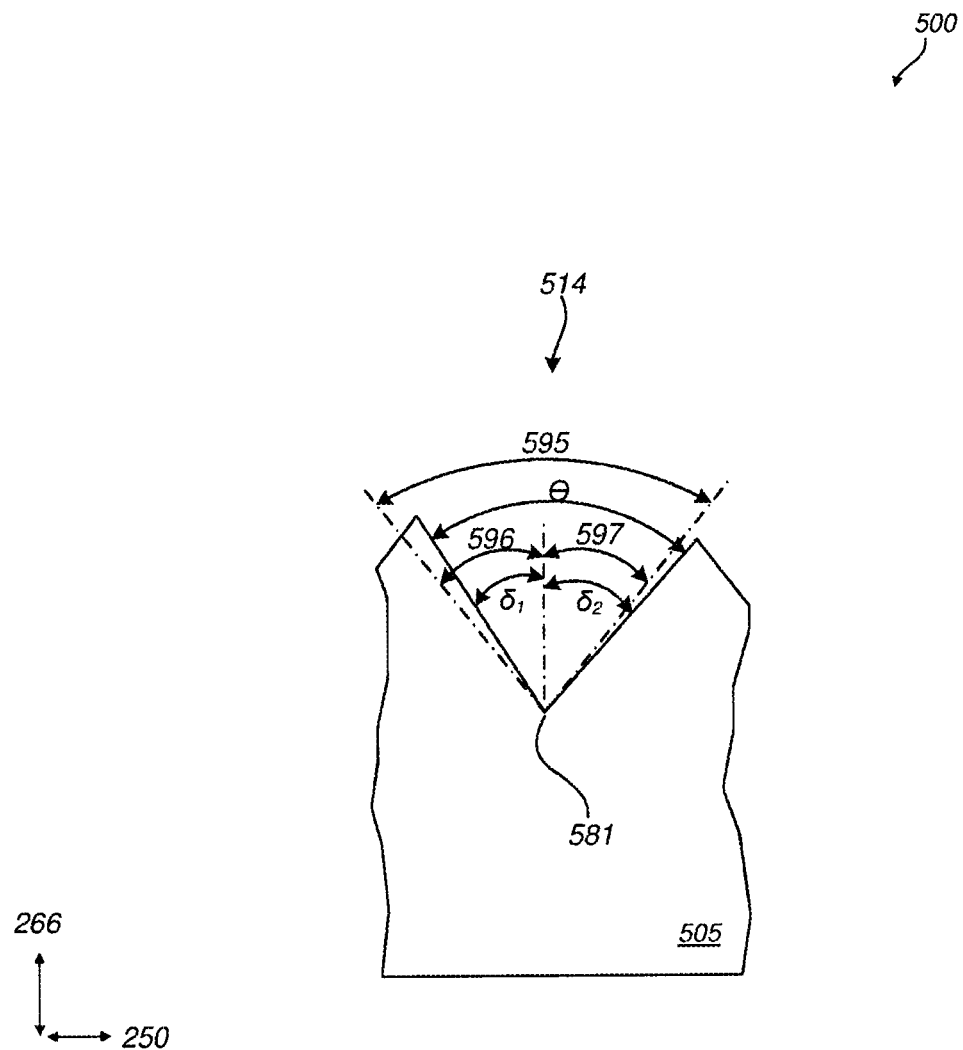
FIG. 5D presents another detailed perspective view of the example article embodiment of the disclosure shown in FIG. 5A along a view line analogous to the view shown in FIG. 2N.

In some embodiments, the first grooves 514 have a constant vertical included angle $\theta$ that differs from a corresponding angle of orthogonality 595 by about 0.25° to about 1.0°. (FIG. 5D)

In some embodiments, the first grooves 514 have a constant vertical included angle $\theta$ that is non-symmetrical relative to the groove base 581 of the first grooves 514.

In some embodiments, the first grooves 514 have a constant vertical included angle $\theta$ between about 65° and about 90°.

In some embodiments, the first grooves 514 have a constant vertical included angle $\theta$ consisting of two half angles $\delta_1$ and $\delta_2$, wherein the first half angle $\delta_1$ is greater than the second half $\delta_2$ from about 0.25° to about 1.0°.

In some embodiments, first grooves 514 have a constant vertical included angle $\theta$ consisting of two half angles $\delta_1$ and $\delta_2$, wherein the first half angle $\delta_1$ is less than a corresponding angle of orthogonality 596 by about 0.25° to about 1.0° and the second half angle $\delta_2$ is greater than a corresponding angle of orthogonality 597 by about 0.25° to about 1.0°. (FIG. 5D).

Figure 5E:
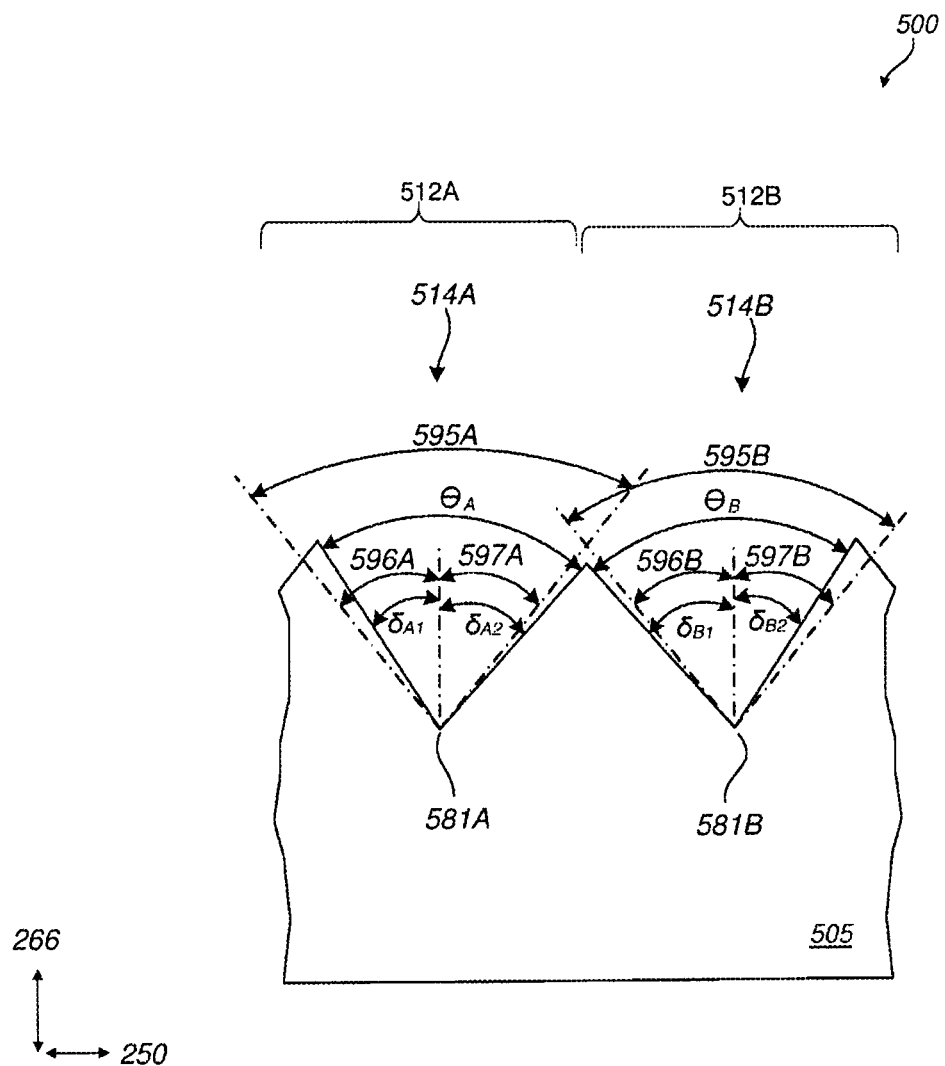
FIG. 5E presents another detailed perspective view of the example article embodiment of the disclosure shown in FIG. 5A along a view line analogous to the view shown in FIG. 2N.
Figure 5F:
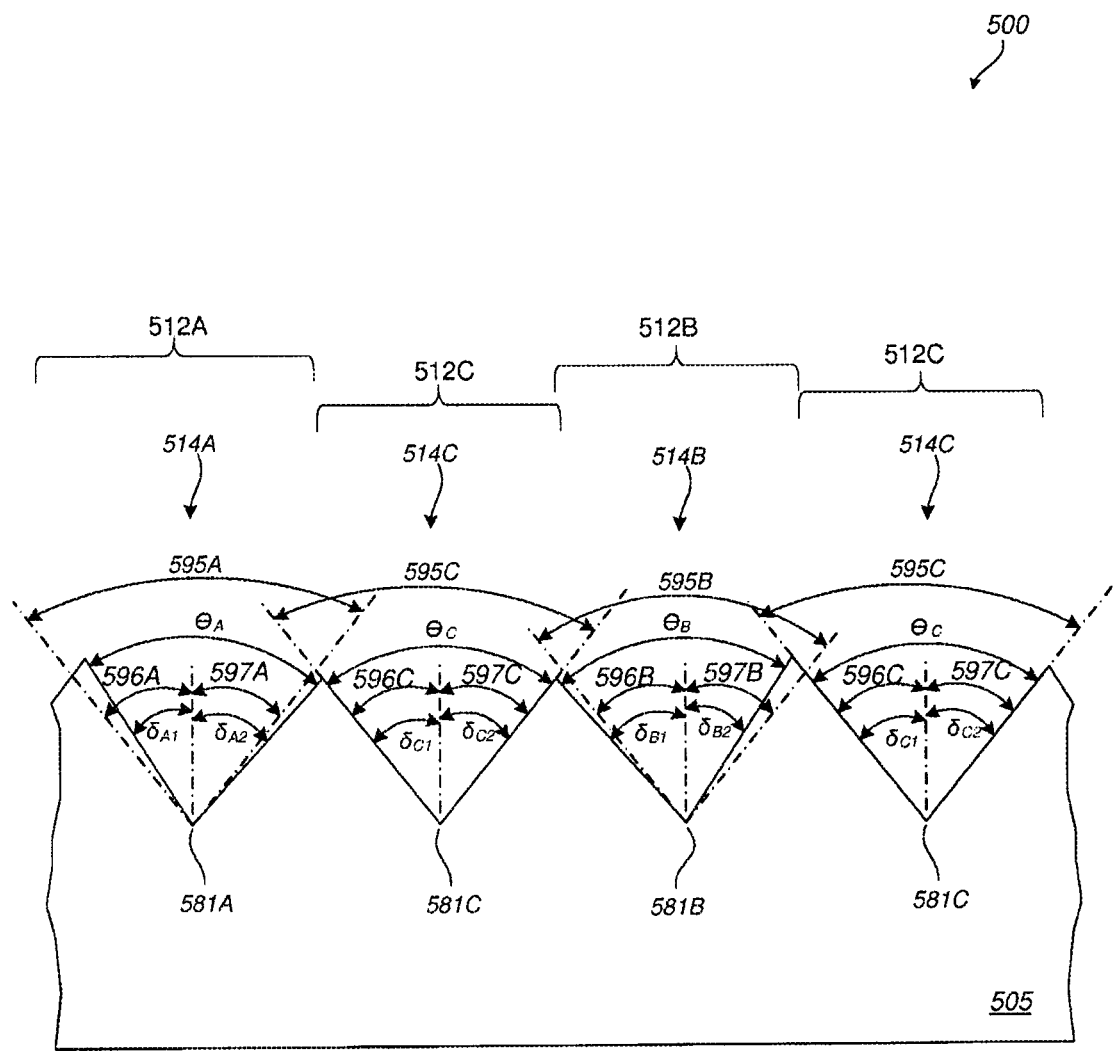
FIG. 5F presents another detailed perspective view of the example article embodiment of the disclosure shown in FIG. 5A along a view line analogous to the view shown in FIG. 2N.

In some embodiments, the first set 512 of first grooves 514 includes two or more subsets 512A, 512B, including a first subset 512A of the first grooves 514A having a first constant vertical included angle $\theta_A$ and a second subset 512B of the first grooves 514B having a second constant vertical included angle $\theta_B$ (FIG. 5E). The first constant vertical included angle $\theta_A$ can be symmetrical about a groove base 581A of the first grooves 514A, and the second constant vertical included angle $\theta_B$ can be non-symmetrical about a groove base 581B of the first grooves 514B by from about 0.25° up to about 1.0°. In some such embodiments, the first grooves 514A of the first subset 512A and the first grooves 514B of the second subset 512B are arranged in an alternating pattern across the groove pattern 555 (e.g., a A,B,A,B,A,B or B,A,B,A,B,A pattern, where 'A' equals the first grooves 514A of the first subset 512A and 'B" equals the first grooves 514B of the second subset 512B), In some embodiments, the first set 512 of the first grooves 514 includes two or more subsets 512A, 512B including a first subset 512A of the first grooves 514A having a first constant vertical included angle $\theta_A$ consisting of two half angles $\delta_{A1}$ and $\delta_{A2}$, and a second subset 512B of the first grooves 514B having a second constant vertical included angle $\theta_B$, consisting of two half angles $\delta_{B1}$ and $\delta_{B2}$ (FIG. 5E). The first half angle $\delta_{A1}$ of the first constant vertical included angle $\theta_A$ can be less than a corresponding angle of orthogonality 596A by about 0.25° to about 1.0°. and the second half angle $\delta_{A2}$ of the first constant vertical included angle $\theta_A$ can be greater than a corresponding angle of orthogonality 597A by about 0.25° to about 1.0°. The first half angle $\delta_{B1}$ of the second constant vertical included angle $\theta_B$ can be greater than a corresponding angle of orthogonality 596B by about 0.25° to about 1.0° and the second half angle $\delta_{B2}$ of the second constant vertical included angle $\theta_B$ can be less than a corresponding angle of orthogonality 597B by about 0.25° to about 1.0°. In some such embodiments, the first grooves 514A of the first subset 512A and the first grooves 514B of the second subset 512B are arranged in an alternating pattern across the groove pattern 555 (e.g., a A,B,A,B,A,B or B,A,B,A,B,A pattern, where 'A' equals the first grooves 514A of the first subset 512A and 'B" equals the first grooves 514B of the second subset 512B). In some such embodiments, the first set 512 of the first grooves 514 can include a third subset 512C of the first grooves 514C having a third constant vertical included angle $\theta_C$ where the third constant vertical included angle $\theta_C$ can be symmetrical about a groove base 581C of the first grooves 514C of the third subset 512C (FIG. 5F). In some such embodiments, the third constant vertical included angle $\theta_C$ can be about equal to a corresponding angle of orthogonality 595C (e.g., within ±0.25°). In some such embodiments, the first grooves 514A of the first subset 512A, the first grooves 514B of the second subset 512B, and the first grooves 514C of the third subset 512C are arranged in a repeating pattern across the groove pattern 555. E.g., any of A,C,B,C,A,C,B,C; C,A,B,C,A,B; A,B,C,A,B,C, B,A,C,B,A,C . . . patterns where 'A' equals the first grooves 514A of the first subset 512A, 'B' equals the first grooves 514B of the second subset 512B, and 'C' equals the first grooves 514C of the third subset 512C.

Figure 5G:
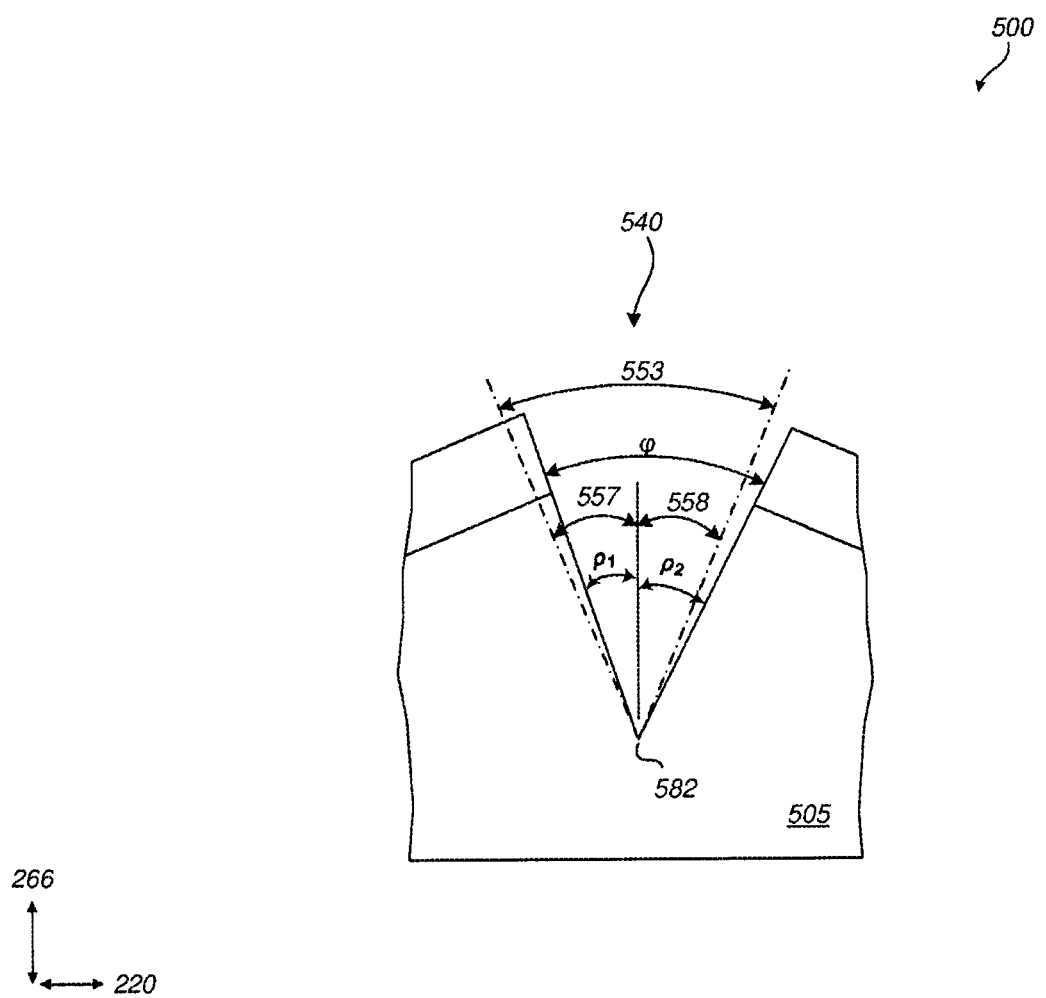
FIG. 5G presents another detailed perspective view of the example article embodiment of the disclosure shown in FIG. 5A along a view line analogous to the view shown in FIG. 2L.
Figure 5H:
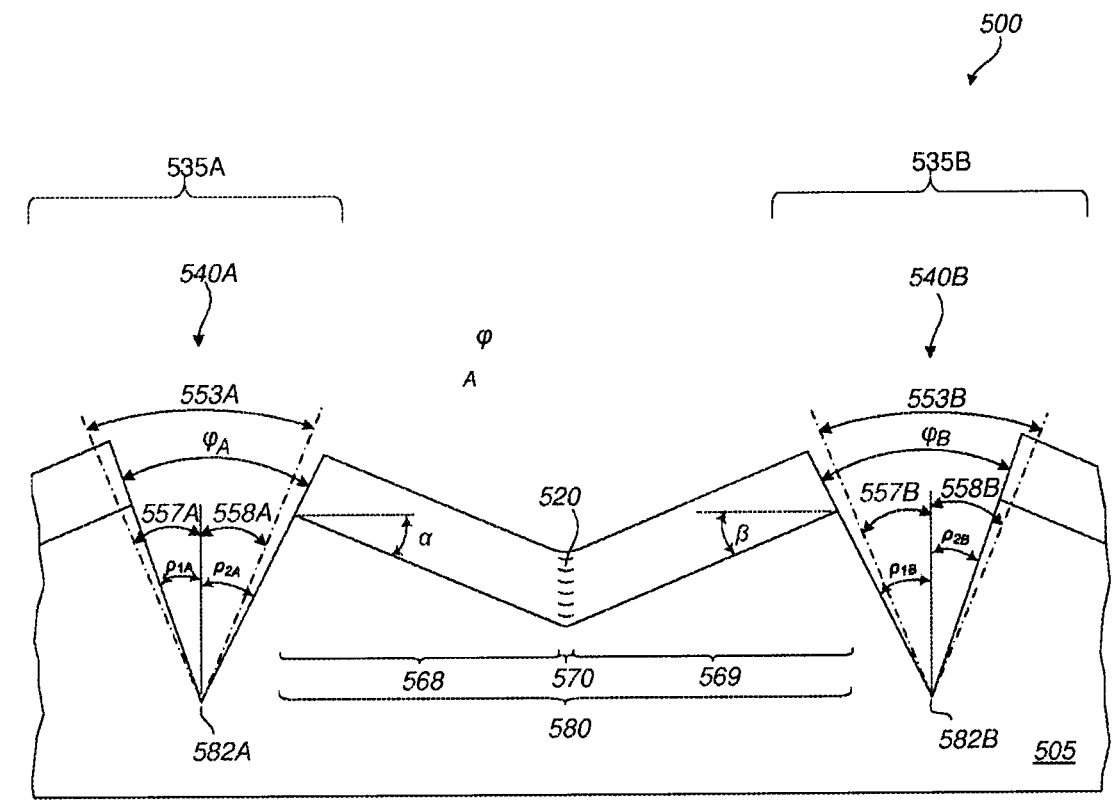
FIG. 5H presents another detailed perspective view the example article embodiment of the disclosure shown in FIG. 5A similar to the view shown in FIG. 4B.
Figure 5H:
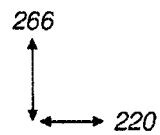

In some embodiments, the second grooves 540 can have a constant vertical included angle φ that is non-symmetrical relative to a groove base 582 of the second grooves 540 (FIG. 5G).

In some embodiments, the second grooves 540 can have a constant vertical included angle φ between about 10° and about 100°.

In some embodiments, the second grooves 540 can have a constant vertical included angle φ that differs from a corresponding angle of orthogonality 553 about 0.25° to about 1.0°.

In some embodiments, the second grooves 540 can have a constant vertical included angle φ consisting of two half angles $\rho_1$ and $\rho_2$, and the first half angle $\rho_1$ can be greater than the second half angle $\rho_2$ by about 0.25° to about 1.0°

In some embodiments, the second grooves 540 can have a constant vertical included angle φ consisting of two half angles $\rho_1$ and $\rho_2$, and the first half angle $\rho_1$ can be less than a corresponding angle of orthogonality 557 about 0.25° to about 1.0°, and the second half angle $\rho_2$ can be greater than a corresponding angle of orthogonality 558 about 0.25° to about 1.0°.

In some embodiments, the set 535 of the second grooves 540 includes a first subset 535A of the second grooves 540A having a first constant vertical included angle $\phi_A$ consisting of two half angles $\rho_{1A}$ and $\rho_{2A}$, and a second subset 535B of the second grooves 540B having a second constant vertical included angle $\phi_B$ consisting of two half angles $\rho_{1B}$ and $\rho_{2B}$. The first half angle $\rho_{1A}$ of the first constant vertical included angle $\phi_A$ can be less than a corresponding angle of orthogonality 557A by about 0.25° to about 1.0°, the second half angle $\rho_{2A}$ of the first constant vertical included angle $\phi_A$ can be greater than a corresponding angle of orthogonality 558A by about 0.25° to about 1.0°, the first half angle $\rho_{1B}$ of the second constant vertical included angle $\phi_B$ can be greater than a corresponding angle of orthogonality 557B by about 0.25° to about 1.0°, and the second half angle $\rho_{2B}$ of the second constant vertical included angle $\phi_B$ can be less than a corresponding angle of orthogonality 558B by about 0.25° to about 1.0°.

In some such embodiments, the second grooves 540A of the first subset 535A and the second grooves 540B of the second subset 535B are arranged in an alternating pattern across the groove pattern 555. E.g., A,B,A,B,A,B or, B,A,B,A,B,A patterns where 'A' equals the second grooves 540A and 'B' equals the second grooves 540B.

Figure 5I:
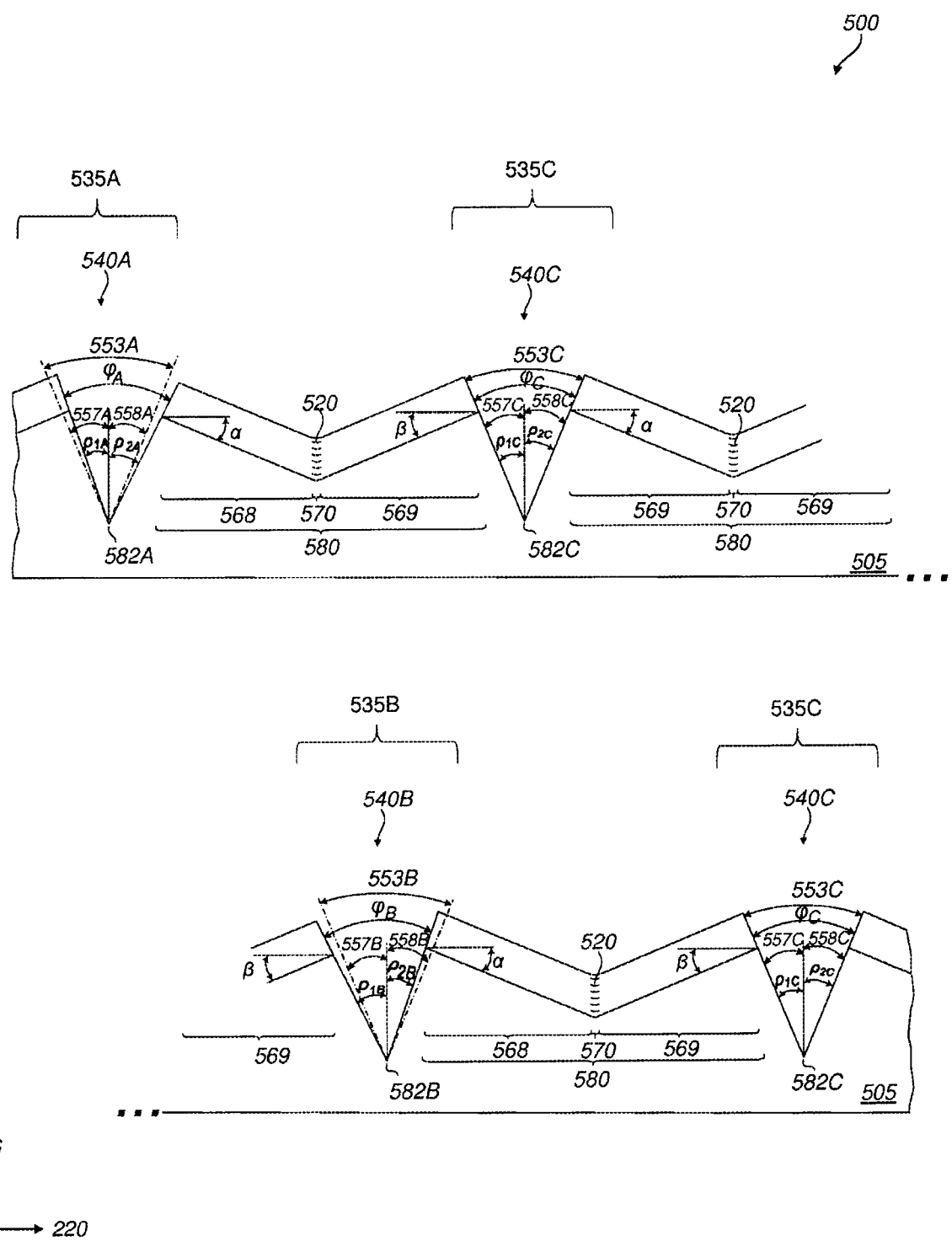
FIG. 5I presents another detailed perspective view the example article embodiment of the disclosure shown in FIG. 5A similar to the view shown in FIG. 4B.

In some such embodiments, the set 535 of the second grooves 540 includes a third subset 535C of the second grooves 540C having a third constant vertical included angle $\phi_C$ that is symmetrical about a groove base 582C of the second grooves 540C (FIG. 5I).

In some such embodiments, the third constant vertical included angle $\phi_C$ is about equal to a corresponding angle of orthogonality 553C (e.g., within ±0.25°). In some such embodiments, the second grooves 540A of the first subset 535A, the second grooves 540B of the second subset 535B, and the second grooves 540C of the third subset 535C are arranged in a repeating pattern across the groove pattern 555. E.g., any of A,C,B,C,A,C,B,C; C,A,B,C,A,B; A,B,C, A,B,C, B,A,C,B,A,C . . . patterns where 'A' equals the second grooves 540A of the first subset 535A, 'B' equals the second grooves 540B of the second subset 535B, and 'C' equals the second grooves 540C of the third subset 535C.

In some embodiments, the second set 535 of the second grooves 540 includes a first subset 535A of the second grooves 540A having a fist constant vertical included angle $\phi_A$ and a second subset 535B of second grooves 540B having a second constant vertical included angle $\phi_B$. The first constant vertical included angle $\phi_A$ can be symmetrical about the groove base 582A of the second grooves 540A of the first subset 535A, and the second constant vertical included angle $\phi_B$ can be non-symmetrical about the groove base 582B of the first grooves 540B of the second subset 535B by about 0.25° to about 1.0°. In some such embodiments, the second grooves 540A of the first subset 535A and the second grooves 540B of the second subset 535B are arranged in an alternating pattern across the groove pattern 555. E.g., A,B,A,B,A,B or, B,A,B,A,B,A patterns, where 'A' equals the second grooves 540A and 'B' equals the second grooves 540B.

In any such embodiments, the substrate can be a monolithic block substrate. In any such embodiments, the substrate can be or include a polymeric film. In any such embodiments, the article can be configured as a master mold to make replica article copies of the article. In any such embodiments, the article can be a retroreflective sheeting.

Still another embodiment of an article of the disclosure is presented in FIGS. 6A-6G. With continuing reference to FIGS. 6A-6G throughout, the article 600 includes a substrate 605 having a structured surface 607, with slightly non-orthogonal microprisms thereon (e.g., RIA microprisms analogous to the microprisms 410 discussed in the context of FIG. 4A-4B but slightly non-orthogonal as discussed in the context of FIGS. 5A-5I). The structured surface 607 includes a first set 612 of first grooves 614 about aligned along a first direction 220 and intersecting with a second set 635 of second grooves 640 about aligned along a second direction 250. Each of the first grooves 614 include a set 618 of variable depth zones 680, each variable depth zone 680 including: a dive section 668 having a first minimum depth $Z_{D1}$ and a first maximum depth $Z_{D2}$, a rise section 669 having a second minimum depth $Z_{R1}$ and a second maximum depth $Z_{R2}$, and a transition section 670 located between the dive section 668 and rise section 669, wherein the transition section 670 includes a continuous surface transition 674 between the dive section 668 and rise section 669. (e.g., analogous to dive, rise and transition sections 268, 269, 270, the continuous surface transition 274, and the depths $Z_{D1}$, $Z_{D2}$, $Z_{R1}$ $Z_{R2}$; disclosed in the context of FIG. 2H-2J). The first direction 220 is substantially perpendicular (e.g., 90°±1°) to the second direction 250. At least a portion 629 (FIG. 6A) of the first grooves 614 are aligned along a non-parallel skewed first direction 620 as compared to the first direction 220, wherein a skew angle ψ between the first direction 220 and the skewed first direction 620 is less than about 2°. Alternatively or additionally, at least a portion 630 (FIG. 6D) of the second grooves 640 are aligned along a non-parallel skewed second direction 650 as compared to the second direction 250 wherein a skew angle τ between the second direction 250 and the skewed second direction 650 is less than about 2°.

For example, in some embodiments, only the portion 629 of the first grooves 614 may be aligned in the skewed first direction 620 with the skew angle ψ having a non-zero value and no portion 630 of the second grooves 640 may be aligned in the skewed second direction 650. Or, in some embodiments, only portions 630 of the second grooves 640 are aligned in the skewed second direction 640 with the skew angle τ having a non-zero value and none of the portions 629 of the first grooves 614 are aligned in the skewed first direction 620. Or, in some embodiments, both the portion 629 of the first grooves 614 have a non-zero value skew angle ψ and the portion 630 of the second grooves 640 have a non-zero value skew angle τ.

In other embodiments, the least a portion 629 of the first grooves 614 are aligned along a non-parallel skewed first direction 620 as compared to the first direction 220, wherein a skew angle ψ between the first direction 220 and the skewed first direction 620 is less than about 1.5°. In still other embodiments, a skew angle ψ between the first direction 220 and the skewed first direction 620 has a value in a range from about 0.1° to about 1.0°, or a value in a range from about 0.25° to about 1.0°.

In other embodiments, the least a portion 630 of the second grooves 640 are aligned along a non-parallel skewed second direction 650 as compared to the second direction 250, wherein a skew angle τ between the second direction 250 and the skewed second direction 650 is less than about 1.5°. In still other embodiments, a skew angle τ between the second direction 250 and the skewed second direction 650 has a value in a range from about 0.1° to about 1.0°, or a value in a range from about 0.25° to about 1.0°.

In some embodiments, the intersection between the at least portion 629 of the first grooves 614 and the at least portion 630 of the second grooves 640 are non-perpendicular up to about 2°. (e.g., 90°±2° but not equal to 90°±0.1°). In other embodiments, the at least portion 629 of the first grooves 614 and the at least portion 630 of the second grooves 640 are non-perpendicular up to about 1°.

In some embodiments, the set 618 of variable depth zones 680 includes first and second subsets 618A, 618B of variable depth zones 680A, 680B, the skewed first direction 620 includes first and second sub skewed first directions 620A, 620B. The first grooves 614 of the first subset 618A have a first groove base 681A aligned in the first sub skewed first direction 620A, the first grooves 614 of the second subset 618B have a second groove base 681B aligned in the second sub skewed first direction 620B, and the first sub skewed first direction 620A and the second sub skewed first direction 620B are non-parallel to each other.

Figure 6A:
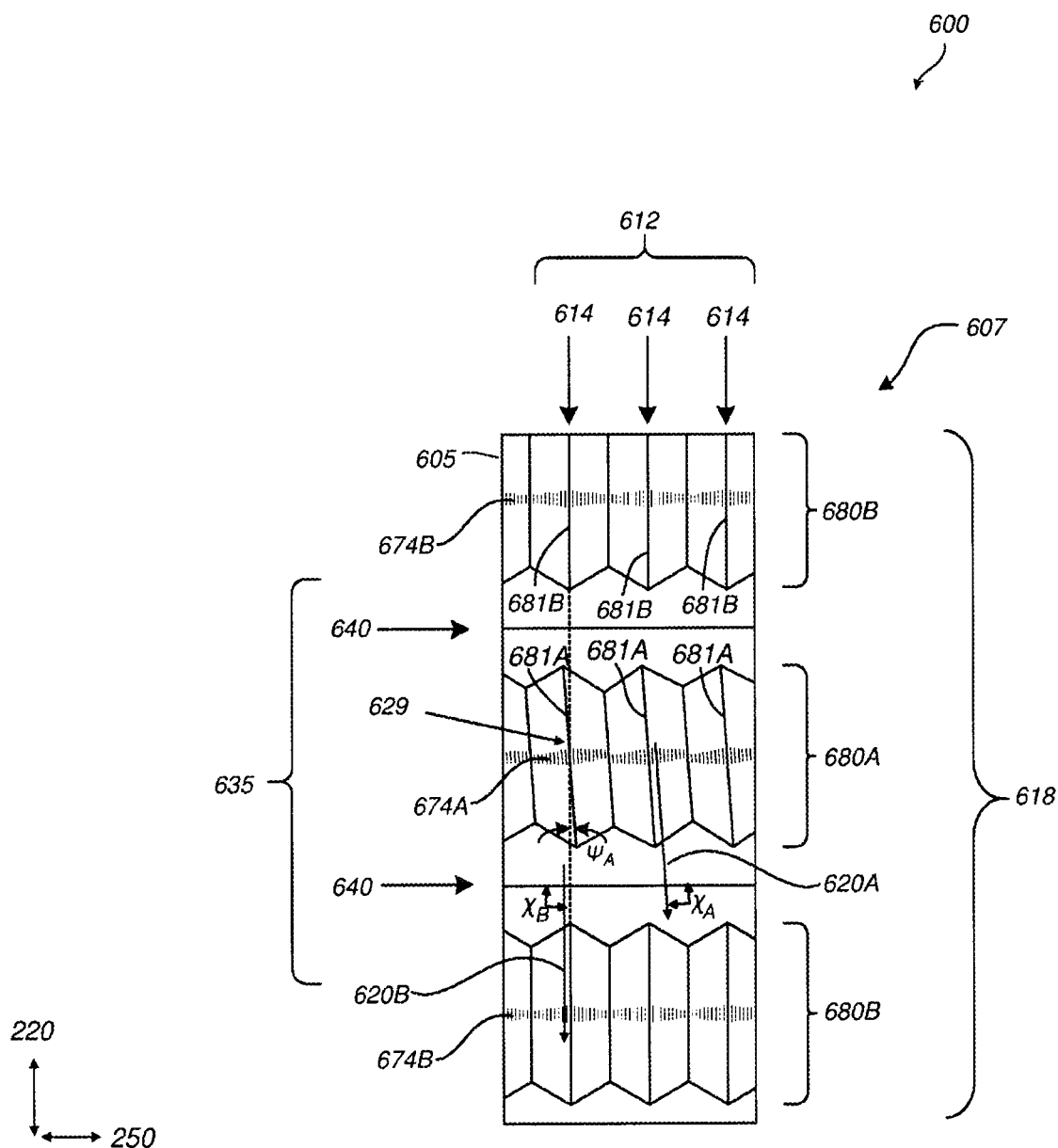
FIG. 6A presents a plan view of an another example article embodiment of the disclosure similar to the plan view shown in FIG. 4A.

In some embodiments, the first sub skewed first direction 620A can be non-perpendicular to the second direction 250 by a skew angle $\chi_A$ equal to 90°±2° (FIG. 6A) and a skew angle $\chi_A$ is not equal to 90°±0.1°. E.g., a skew angle $\chi_A$ can equal to 90°±2° but not equal 90° exactly (e.g., 90°±0.1°). Similarly, the first sub skewed first direction 620A can be non-parallel to the first direction 220 by the skew angle $\psi_A$ equal to 1±1° (FIG. 6A). E.g., skew angle $\psi_A$ can equal 1±1° but not equal 0° exactly (e.g., 0°±0.1°). In other such embodiments, the second sub skewed first direction 620B is perpendicular to the second direction 250 by a non-skewed angle $\chi_B$. E.g. the skew angle $\chi_B$ is, in some embodiments, not skewed such that the angle $\chi_B$ have a value about equal to 90° (e.g. 90°±0.1°). Such an embodiment is beneficial when only a portion of the microprisms are desired to be slightly non-orthogonal. For example, the microprisms of the first subset of first variable depth zones may be slightly non-orthogonal and the microprisms of the second subset of second variable depth zones may be substantially orthogonal.

Figure 6B:
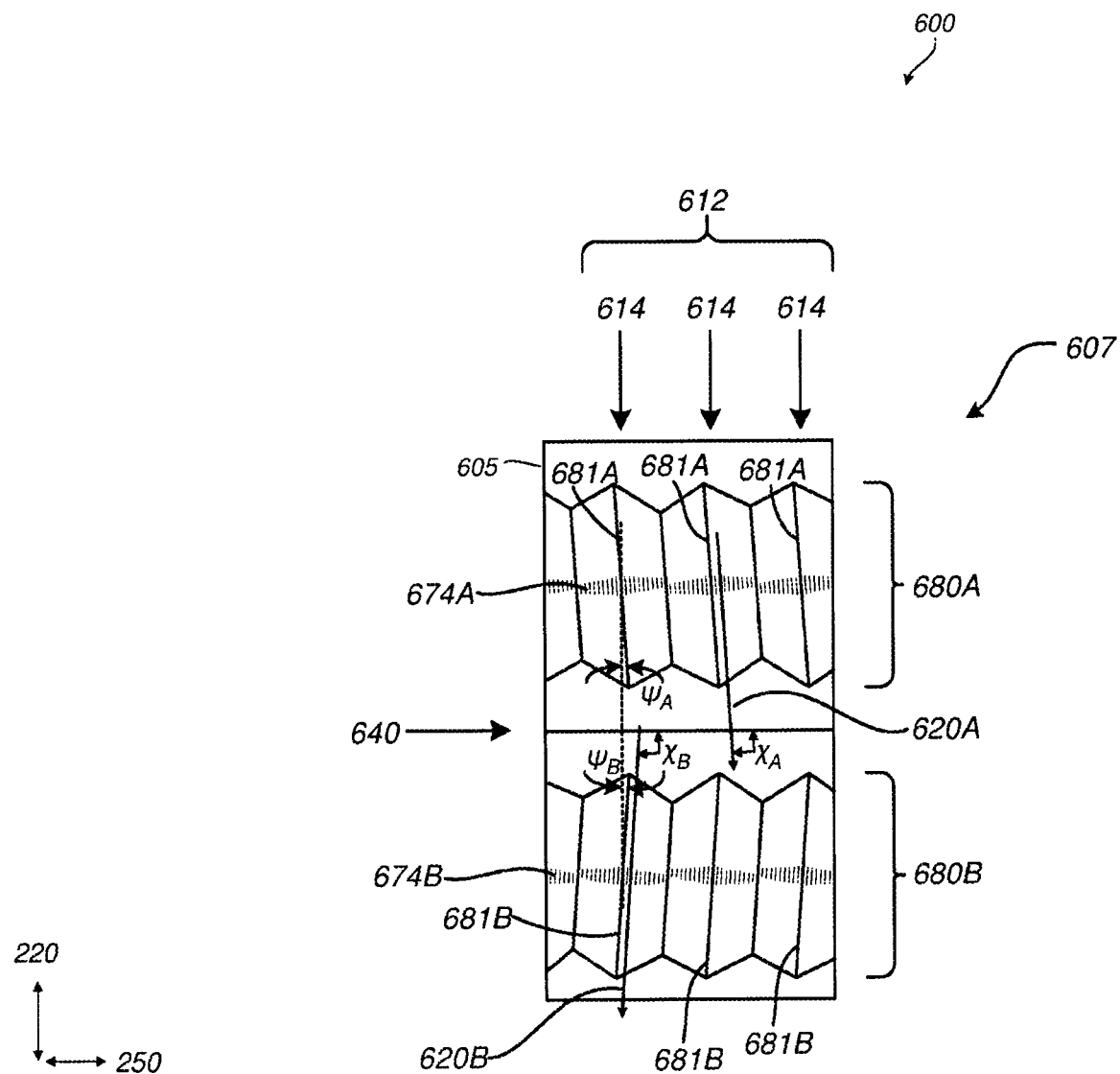
FIG. 6B presents another plan view of the example article embodiment of the disclosure similar to the view shown in FIG. 6A.

In some such embodiments, the first sub skewed first direction 620A can have a counterclockwise rotated non-perpendicular skew angle $\chi_A$ to the second direction 250, and, the second sub skewed first direction 620B can have a clockwise rotated non-perpendicular skew angle $\chi_B$ to the second direction 250 (FIG. 6B). E.g., $\chi_A$ and $\chi_B$ can equal 89°±1° and 91°±1°, respectively. In some such embodiments, a magnitude of the skew angle $\psi_A$ between the first direction 220 and the first sub skewed first direction 620A can be about equal to a magnitude of the skew angle $\psi_B$ between the first direction 220 and the second sub skewed first direction 620B. (E.g., magnitudes of both angle $\psi_A$ and angle $\psi_B$ can be equal to within ±0.1°). The advantage of such an embodiment where the grooves are skewed in opposing directions allows for the resulting microprisms to have non-orthogonal features in opposing directions.

In some embodiments, the first variable depth zones 680A of the first subset 618A and the second variable depth zones 680B of the second subset 618B can be arranged in an alternating pattern. E.g., an A,B,A,B,A,B or B,A,B,A,B,A pattern throughout the grooves 614 along the first direction 220, where 'A' equals the first variable depth zones 680A and 'B' equals the second variable depth zones 680B.

Figure 6C:
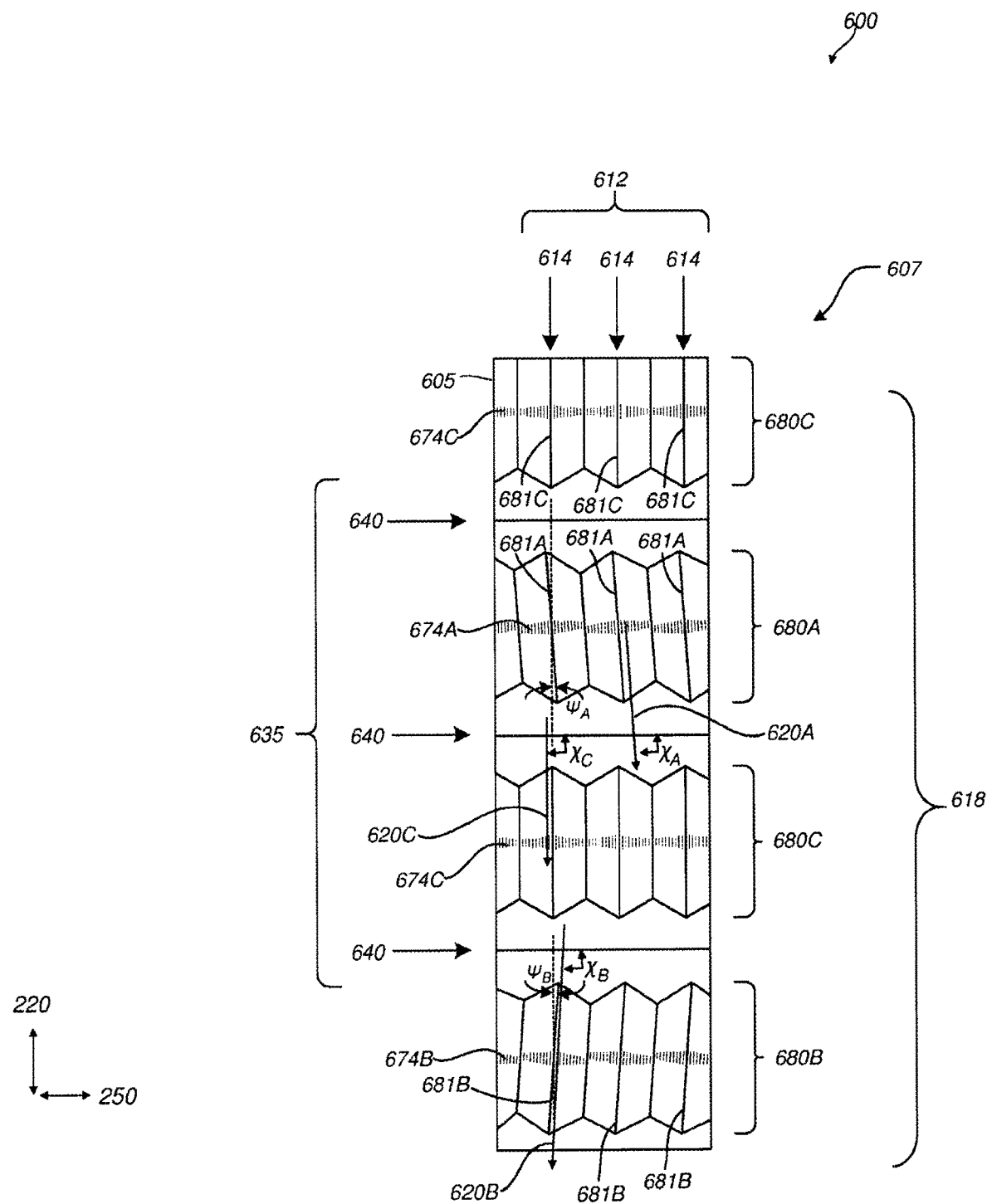
FIG. 6C presents another plan view of the example article embodiment of the disclosure similar to the view shown in FIG. 6A.
Figure 6D:
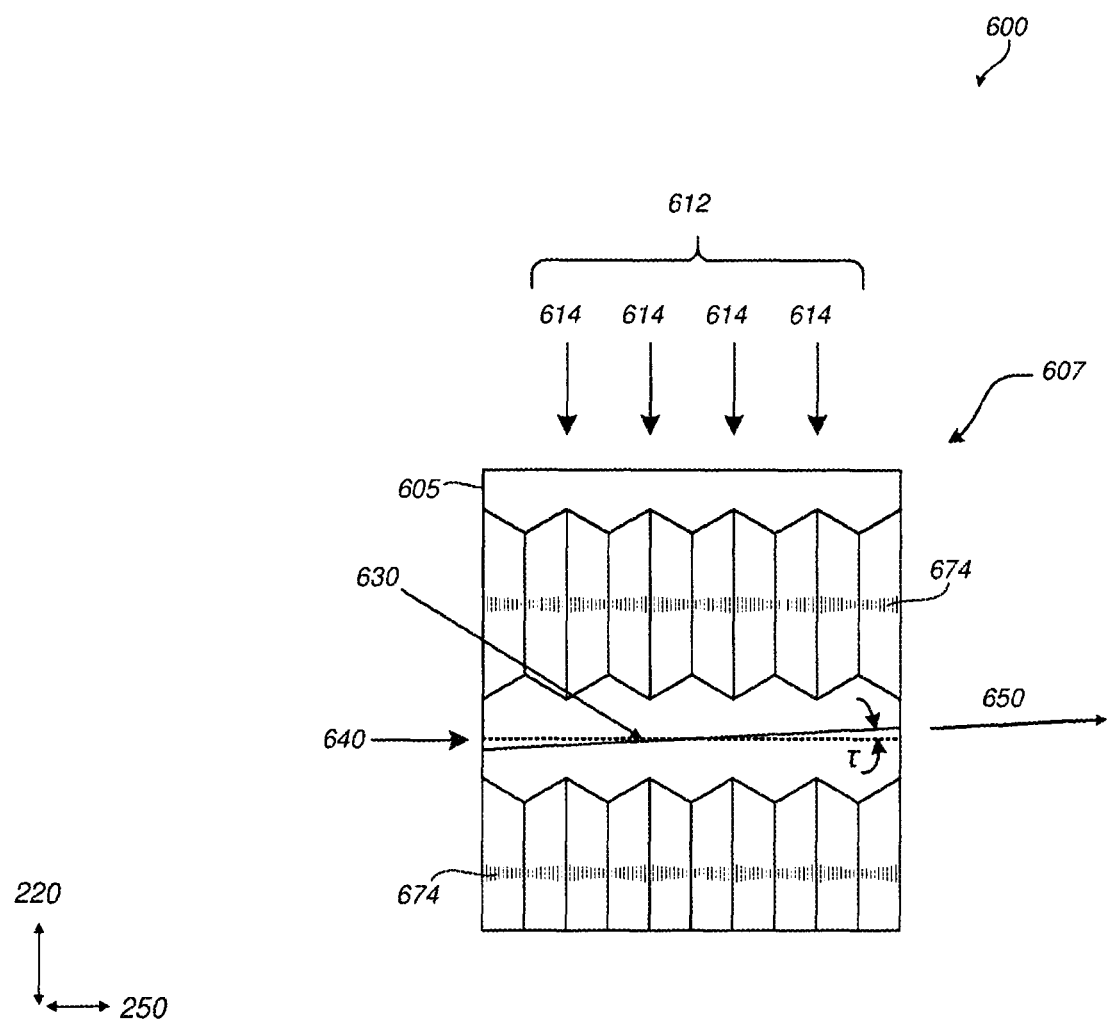
FIG. 6D presents another plan view of the example article embodiment of the disclosure similar to the view shown in FIG. 6A.

In some embodiments, the set 618 of variable depth zones 680 further includes a third subset 618C of third variable depth zones 680C having a third groove base 681C aligned in a third sub skewed first direction 620C, the third sub skewed first direction 620C being non-parallel to both the first sub skewed first direction 620A and the second sub skewed first direction 620B (FIG. 6C). In some such embodiments, the first sub skewed first direction 620A has a counterclockwise rotated non-perpendicular skew angle $\chi_A$ to the second direction 250 (e.g., 89°±1°), the second sub skewed first direction 620B has a clockwise rotated non-perpendicular skew angle $\chi_B$ to the second direction 250 (e.g., 91°±1°) and the third sub skewed first direction 620C has a perpendicular skew angle $\chi_C$ to the second direction 250 (e.g., 90°±0.1°). In some such embodiments, a magnitude of the skew angle $\psi_A$ between the first direction 220 and the first sub skewed first direction 620A is about equal to a magnitude of the skew angle $\psi_B$ between the first direction 220 and the second sub skewed first direction 620B. (E.g., magnitudes of both angle $\psi_A$ and angle $\psi_B$ can be equal to within ±0.1°). (FIG. 6C). In some such embodiments, the first variable depth zones 680A of the first subset 618A, the second variable depth zones 680B of the second subset 618B, and the third variable depth zones 680C of the third subset 618C are arranged in a repeating pattern. E.g., an A,C,B,C,A,C,B,C pattern (or other similar patterns such as disclosed elsewhere herein) throughout the first grooves 614 along the first direction 220 where 'A' equals the first variable depth zones 680A, 'B' equals the second variable depth zones 680B, and 'C' equals the third variable depth zones 680C.

In some embodiments, the at least the portion 630 of the second grooves 640 are non-parallel to the second direction 250 by a skew angle $\tau$ of up to 2° (FIG. 1D).

Figure 6E:
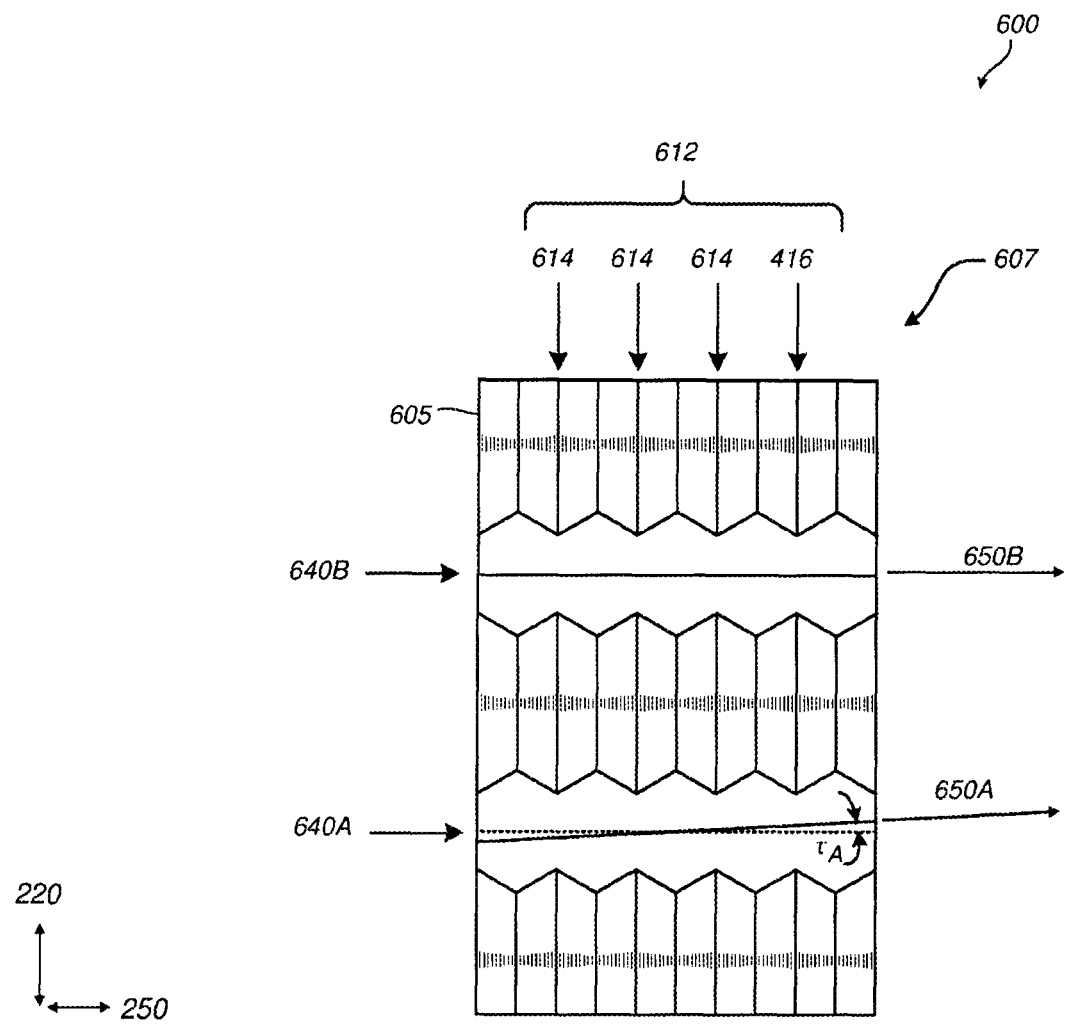
FIG. 6E presents another plan view of the example article embodiment of the disclosure similar to the view shown in FIG. 6A.

In some embodiments, second set 635 of second grooves 640 includes two or more subsets 635A, 635B, the first subset 635A of the second grooves 640A aligned in a first sub skewed second direction 650A and the second subset 635B of the second grooves 640B aligned in a second sub skewed second direction 650B, wherein first sub skewed second direction 650A is non-parallel to the second sub skewed second direction 650B (FIG. 6E). In some such embodiments, the first sub skewed second direction 650A can be non-parallel to the second direction 250 by a skew angle $\tau_A$ of up to 2°. E.g., $\tau_A$ can equal 1°±1° but not equal to 0°±0.1°. In some such embodiments, the second sub skewed second direction 650B can be parallel to the second direction 250. E.g., $\tau_A$ can equal 0°±0.1°.

Figure 6F:
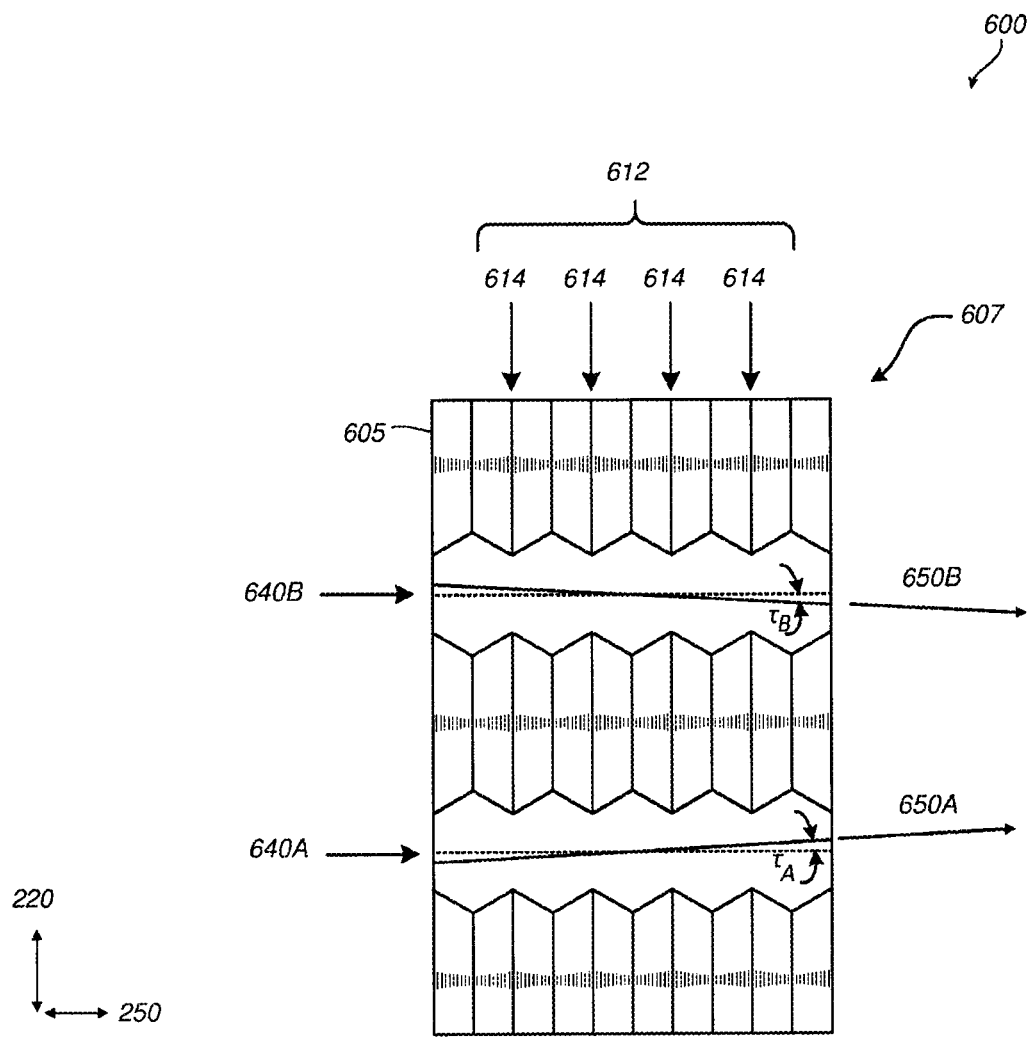
FIG. 6F presents another plan view of the example article embodiment of the disclosure similar to the view shown in FIG. 6A.

In some such embodiments, the alignment of the first sub skewed second direction 650A is rotated clockwise by a skew angle $\tau_A$ up to 2° from a parallel alignment with the second direction 250 (e.g., +1°±1°) and the alignment of the second sub skewed second direction 650B is rotated counterclockwise (e.g., −1°±1°) by a skew angle $\tau_B$ up to 2° from a parallel alignment with the second direction 250 (FIG. 6F). In other such embodiments, the alignment of the first sub skewed second direction 650A is rotated clockwise by a skew angle $\tau_A$ up to 1° from a parallel alignment with the second direction 250 (e.g., +0.5°±0.5°) and the alignment of the second sub skewed second direction 650B is rotated counterclockwise (e.g., −0.5°±0.5°) by a skew angle $\tau_B$ up to 1° from a parallel alignment with the second direction 250 (FIG. 6F). In some such embodiments, a magnitude of the skew angle $\tau_A$ is about equal to a magnitude of the skew angle $\tau_B$. (E.g., magnitudes of both angle $\tau_A$ and angle $\tau_B$ can be equal to within ±0.1°). In some such embodiments, the second grooves 640A of the first subset 635A and the second grooves 640B of the second subset 635B are arranged in an alternating pattern. E.g., an A,B,A,B,A,B or B,A,B,A,B,A pattern across structured surface 607 along the first direction 220, where 'A' equals the second grooves 640A and 'B' equals the second grooves 640B.

Figure 6G:
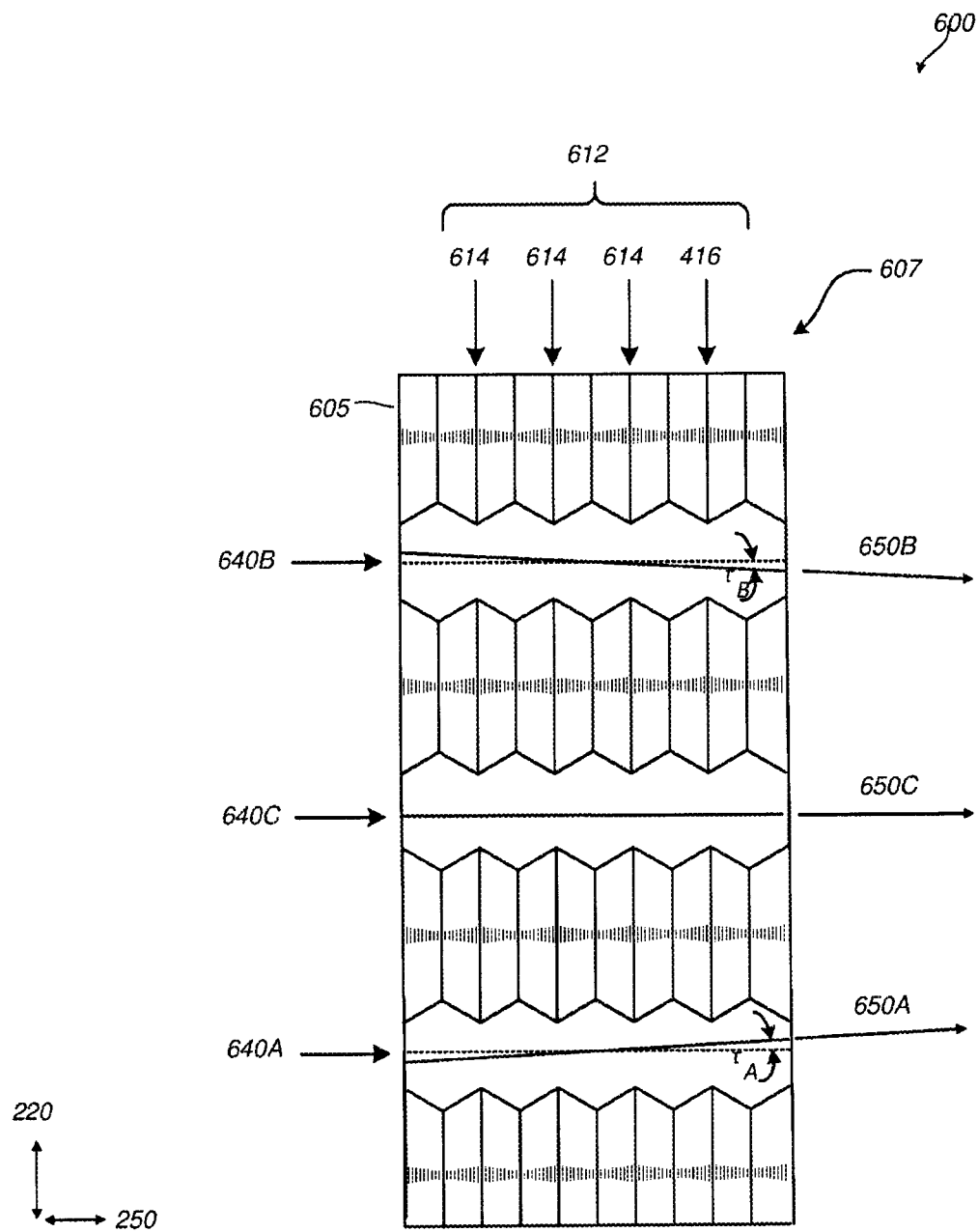
FIG. 6G presents another plan view of the example article embodiment of the disclosure similar to the view shown in FIG. 6A.

In some embodiments, the set 635 of second grooves 640 further includes a third subset 635C of second grooves 640C aligned in a third sub skewed second direction 650C, wherein third sub skewed second direction 650C is non-parallel to both the first sub skewed second direction 650A and the second sub skewed second direction 650B (FIG. 6G). In some such embodiments, the alignment of the first sub skewed second direction 650A can be rotated clockwise by a skew angle $\tau_A$ up to 2° from a parallel alignment with the second direction 250, the alignment of the second sub skewed second direction 650B can be rotated counterclockwise by a skew rotation angle $\tau_B$ up to 2° from a parallel alignment with the second direction 250 and the third sub skewed second direction 650C can be substantially parallel to the second direction 250. In some such embodiments, a magnitude of the skew rotation angle $\tau_A$ can be about equal to a magnitude of the skew angle $\tau_B$. (e.g., magnitudes of $\tau_A$ and angle $\tau_B$ can be equal within ±0.1°). In some such embodiments, the second grooves 640A of the first subset 635A, the second grooves 640B of the second subset 635B, and the second groove 640C of the third subset 635C can be arranged in a repeating pattern. E.g., A,C,B,C,A,C,B,C pattern (or other pattern disclosed herein) across structured surface 607 along the first direction 220 where 'A' equals the second grooves 640A of the first subset 635A, 'B' equals the second grooves 640B of the second subset 635B, and 'C' equals the second grooves 640C of the third subset 635C.

In any such embodiments, the substrate can be a monolithic block substrate.

In any such embodiments, the article can be configured as a master mold to make replica article copies of the article.

In any such embodiments, the substrate can be a polymeric film substrate.

In any such embodiments, the article can be configured as a retroreflective sheeting.

Still another embodiment of an article of the disclosure is a substrate having an inverted groove pattern containing inverted microprisms as depicted in FIG. 2A. Such an article can be utilized as a production mold (i.e. production tool) for the manufacture of retroreflective sheeting (e.g. such as the cylindrical tooling discussed in the context of method 100). Such an article can also be used as an intermediate mold to be replicated and assembled together to create larger production tooling (e.g. likewise as discussed in the context of method 100). Further, such as article can also be used as a retroreflector when the surface of the inverted pattern consists of a specularly reflective material (e.g. such as a metallic material). Such retroreflectors could be used as a retroreflective delineator, a road marker, or similar retroreflective devices.

The article 260 comprises a substrate 263 having a surface 262 with an inverted groove pattern 261 containing inverted microprisms 256' (FIG. 2A). The inverted groove pattern 261 is a mirror image of a groove pattern 255 of a master mold article 200. The master mold article 200 having a master mold surface 206 with a groove pattern 255 including microprisms 256 thereon. The groove pattern 255 includes a first set 212 of first grooves 214 intersecting with a second set 235 of second grooves 240. The first grooves 214 are parallel to each other along a same first direction 220 across the groove pattern 255. Each of the first grooves 214 include a plurality of repeating variable depth zones 280 (FIG. 2I). Each of the variable depth zones 280 include a dive section 268 having a first maximum depth, $Z_{D2}$, a rise section 269 having a second maximum depth, $Z_{R2}$, and a transition section 270 located between the dive section 268 and rise section 269. The second grooves 240 are parallel to each other along a same second direction 250 across the surface, the second direction 250 being substantially perpendicular to the first direction 220.

In the context of the inverted groove pattern 261 and inverted microprisms 256', the term mirror image refers to a three-dimensional mirror image, where, e.g., raised portions of the groove pattern 255 are replicated as recessed portions in the inverted groove pattern 261 and recessed portions of the groove pattern 255 are replicated as raised portions in the inverted groove pattern 261.

In some embodiments, the inverted microprisms 256' are reduced inactive area microprisms. In still other embodiments, adjacent pairs of the microprisms 256' are arranged as symmetrically opposite matched pairs of microprisms 256' corresponding to the mirror images of adjacent pairs 290 of the microprisms 256 of the master mold article 200 arranged as symmetrically opposite matched pairs of microprisms 256.

In any of the embodiments, the inverted microprisms 256' can be an inverted mirror image of backward-tilted microprisms, forward-tilted microprisms, equilateral microprisms, or sideways-tilted microprisms. Further, the inverted microprisms 256' can be substantially orthogonal or slightly non-orthogonal. Further, as discussed within the context of this disclosure, multiple categories of inverted microprisms 256' can be simultaneously included within the inverted groove pattern 261.

In some embodiments, where the inverted groove pattern 261 includes an inverted transition section corresponding to a mirror image of the transition section 270, the inverted transition section includes an inverted continuous surface transition corresponding to a mirror image of a continuous surface transition 274 between the dive section 268 and rise section 269 of the groove pattern 255 of the master mold article 200. In some embodiments, where the inverted groove pattern 261 includes an inverted transition section corresponding to a mirror image of the transition section 270, the inverted transition section includes an inverted curved surface corresponding to a mirror image of a curved surface 271 located along a groove base 272 of the first groove 214 of the master mold article. In some such embodiments, the inverted curved surface has a radius r in a range from about 1 micron to about 50 microns. In still other embodiments, the inverted curved surface has a radius r in a range from about 1 micron to about 25 microns. In still other embodiments, the inverted curved surface has a radius r in a range from about 1 micron to about 10 microns.

In some embodiments, where the inverted groove pattern 261 includes an inverted dive section corresponding to a mirror image of the dive section 268 of the master mold article 200, the inverted dive section has a dive angle α' value in a range from about 5° to about 50°. In other embodiments, where the inverted groove pattern 261 includes an inverted dive section corresponding to a mirror image of the dive section 268 of the master mold article 200, the inverted dive section has a dive angle α' value in a range from about 5.26° to about 35.25°. In still other embodiments, where the inverted groove pattern 261 includes an inverted dive section corresponding to a mirror image of the dive section 268 of the master mold article 200, the inverted dive section has a dive angle α' value in a range from about 18.26° to about 32.26°.

In some embodiments, the surface 262 of the substrate 263 includes a specularly reflective surface. In some embodiments, the specularly reflective surface consists of a metallic material. In some embodiments, the metallic material of the specularly reflective surface may comprise a material selected from the group consisting of gold, silver, aluminum, cobalt, nickel, copper, brass, bronze or alloys thereof. The benefit of a having the surface 262 consist of a specularly reflective surface is to maximize levels of retroreflectivity when the article 260 is to be used as a retroreflective device. In some instances, depending upon the environment in which the retroreflective device may be utilized, it may be desirable to have the specularly reflective surface made from a material such as gold, which can be resistant to rust or oxidation. In other instances, a material such as aluminum may be utilized as the specularly reflective surface due to cost considerations.

In some embodiments, the substrate 262 consists of a metallic material. For example, if the article 260 is manufactured through an electroforming process as described in the context of method 100, the substrate can consist of nickel or nickel alloys. In other embodiments, the substrate 262 consists of a polymeric material. In still other embodiment, the article 260 is configured as a retroreflector. For example, in one contemplated embodiment, the substrate 262 can consist of a polymeric material such as acrylic or polycarbonate and then a reflective coating (such as aluminum) can be applied to the surface 261 to create a specularly reflective surface so that the article can function as a retroreflector.

Example of Calculating Percent Active Area

As discussed above, the microprisms in any of the embodiments disclosed herein will have a percent active area greater than that of traditional trihedral-shaped microprisms. One method to characterize the percent active area is to analyze the light returned from a microprismatic retroreflective sheeting when viewed through a measuring microscope. To assess the percent active area, a microprismatic retroreflective sheeting sample should be placed on the stage of a microscope with its front surface facing normal towards the objective lens of the microscope. Then, by shining light through the objective lens directly onto the front surface of the sample at an angle approximately perpendicular to the front surface, the active and inactive areas of the microprism can be assessed. Any light entering the active area of the microprism will be retroreflected by the microprisms of the sample to be returned back through the objective lens and through the eyepiece to appear significantly brighter than surrounding areas. On the other hand, the inactive areas will appear dark. Then, by measuring the boundaries of the active area and the overall boundaries of the microprism base, the surface areas of each can be calculated. The percent active area can then be calculated as the ratio of the measured active area relative to the overall area of the microprism base. To obtain a consistent measurement of each area, the focal point of the microscope should be on the apex of the microprisms.

Figure 8:
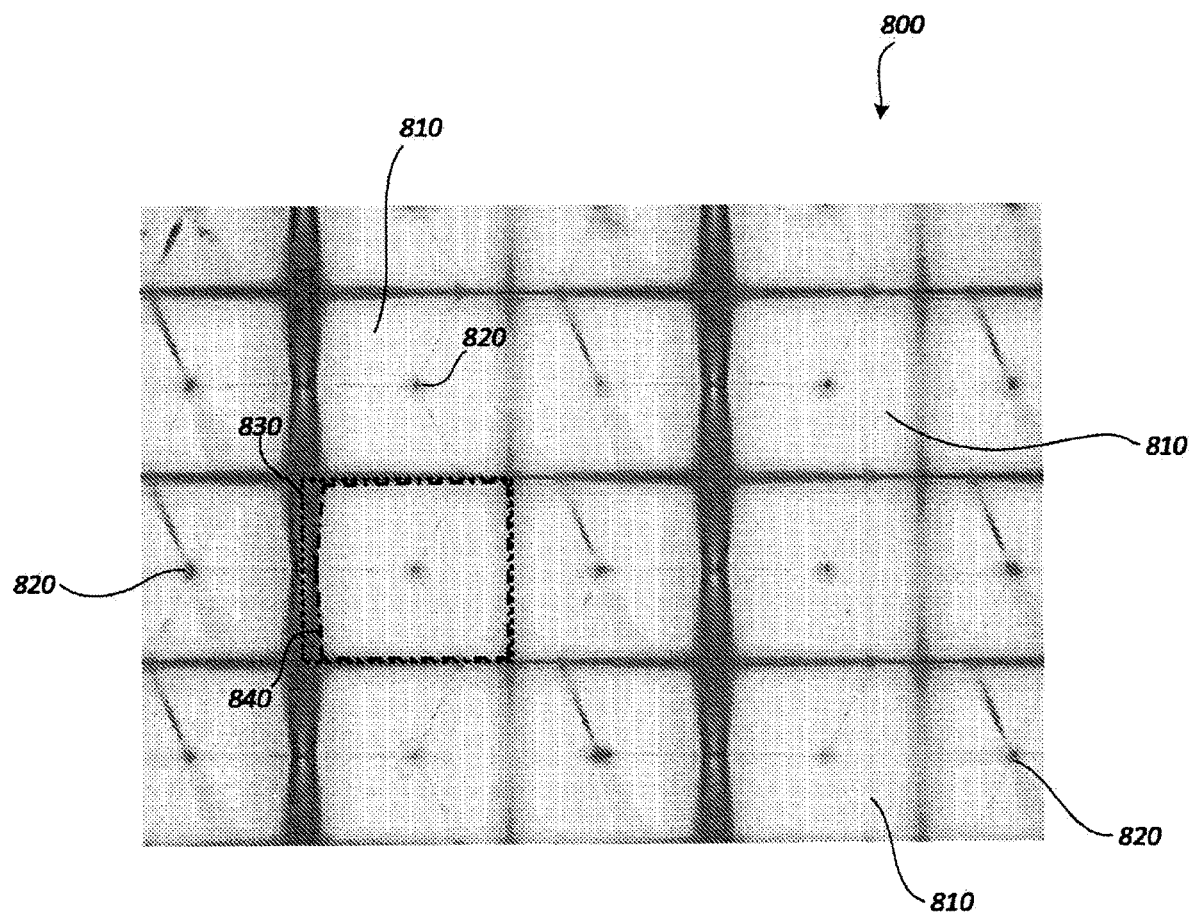
FIG. 8 shows a photograph of an example article embodiment of the disclosure analogous to the article embodiment discussed in the context of FIG. 3A-3E.

FIG. 8 shows a photograph of an array 800 of microprisms 810 when viewed through the front surface of a retroreflective sheeting sample as light from the objective lens is retroreflected back through the objective lens. This photo was taken at 200× magnification using a Nikon MM-400 Measuring Microscope with the apex 820 of the microprisms 810 being the focal point. The overall boundary of the microprism base is outlined by line 830. The overall area of the microprism base was measured to be approximately 18,342 square microns. The active area is outlined by line 840. The area of the active area was measured at approximately 15,963 square microns. Thus, the percent active area is calculated at approximately 87%.

Example Embodiments

Using the novel method disclosed herein, an array of reduced inactive area microprisms was directly machined into a copper surface of a monolithic ruling block using two different V-shaped cutting tools. The first V-shaped cutting tool had a cutting angle θ of approximately 82.90° and was used to directly machine a set of first grooves. The first groove index distance $Y_P$ between each of the first grooves was 130.0 microns. Each first groove contained a repeating series of first zones and second zones. Each first zone was a variable depth zone containing: a dive section having a dive angle α of approximately 27.81° with a dive section length $X_D$ of approximately 108.3 microns; a rise section having a rise angle β of approximately 27.81° with a rise section length $X_R$ of approximately 108.3 microns; and a transition section having a transition section length $X_T$ of approximately 4 microns. The maximum depth $Z_T$ of the first zone of each first groove was approximately 112.16 microns, and the transition section contained a curved surface having a radius of approximately 4 microns along the base of the groove. Each second zone of the first grooves was machined at constant maximum depth $Z_S$ of approximately 58.0 microns with a second zone length $X_S$ of approximately 69.45 microns. Each first groove was machined to be symmetrical about the groove base with approximately equal groove half angles.

Using the second V-shaped cutting tool with a cutting angle φ of approximately 55.43°, a second set of second grooves was directly machined into the surface of the ruling block. Each of the second grooves was machined to be approximately perpendicular to the first grooves to within 90°+/−0.2°. Each second groove had a constant depth $Z_C$ below the surface of approximately 124.1 microns, and the second groove index distance $X_P$ between each second groove was approximately 290.0 microns. Each second groove was substantially symmetrical about its groove base. Substantially all of each second zone of the first grooves was removed by the cutting process to form each of the second grooves.

The resulting microprisms formed on the surface of the ruling block had a rectangular microprism base with a length of approximately 145 microns and a width of approximately 130 microns. The height of the resulting microprism as measured from the apex to the base was approximately 123.7 microns. The resulting microprisms were backwards-tilted microprisms with an optical axis tilt angle of approximately 7.5°.

After direct machining, the ruling block was utilized as a master mold and was replicated using known nickel electroforming techniques to produce a negative (inverted) copy of it. The thickness of the resulting nickel inverted copy was approximately 0.025 inches thick. The nickel inverted copy was tested as a metallic retroreflector by measuring the coefficient of retroreflection at a −4° entrance angle and 0.2° observation angle. The measured coefficients of retroreflection were approximately 980 cd/lx/m² and 675 cd/lx/m² at 0° and 90° rotations of the nickel inverted copy, respectively.

After the retroreflectivity measurements were taken, the inverted copy was then utilized as a flat embossing tool. Several microprismatic retroreflective sheeting samples were then prepared by forming the microprism array of the nickel embossing tool into a 175 micron film of Lexan™ 8A35 polycarbonate (available from SABIC Americas of Pittsfield, Mass.) using a heated laboratory platen press. The temperatures of the upper and lower platens were both set to 385° F. To protect the outer surface of the polycarbonate film, a sheet of 50 micron high-gloss polyester film was placed over the polycarbonate and a silicone rubber pad was placed over the polyester film. The pressure during the embossing was approximately 1,200 psi and the dwell time under heat and pressure was 600 seconds. The film was cooled and the embossed polycarbonate film containing the structure surface of reduced inactive area microprisms was removed from the tool. The resulting microprismatic retroreflective sheeting had a cross-sectional structure analogous to that of FIG. 3A.

The retroreflectivity levels across several of these samples were measured at a −4° entrance angle and several different observation angles and rotation angles. Although the samples displayed some level of rotational sensitivity between the 0° and 90° rotations, the overall retroreflectivity values are significantly higher than what would have been expected from a microprismatic sheeting containing trihedral-shaped backward-tilted microprisms with a similar optical axis tilt angle. The results can be found in the Table 2 below.

TABLE 2

| Observation Angle | 0° Rotation (cd/lx/m²) | 90° Rotation (cd/lx/m²) | Average of 0° and 90° Rotations (cd/lx/m²) |
|---|---|---|---|
| 0.2° | 1950 | 990 | 1470 |
| 0.33° | 1790 | 865 | 1330 |
| 0.5° | 935 | 390 | 660 |

Note 1:
Average values are rounded

Figure 9A:
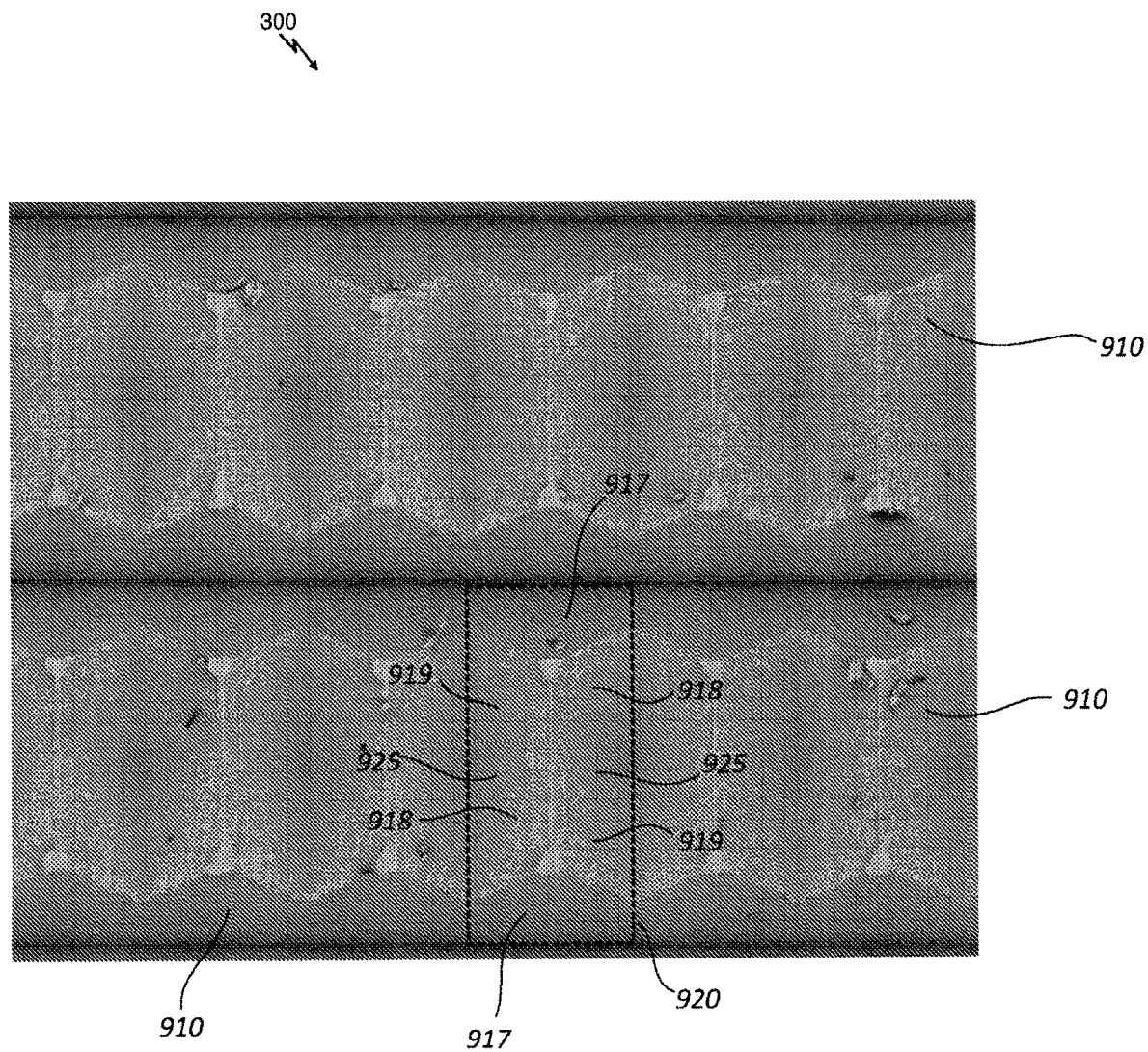
FIG. 9A shows an SEM photograph of the structured surface of an example article embodiment of the disclosure analogous to the article embodiment discussed in the context of FIG. 3A-3E.
Figure 9B:
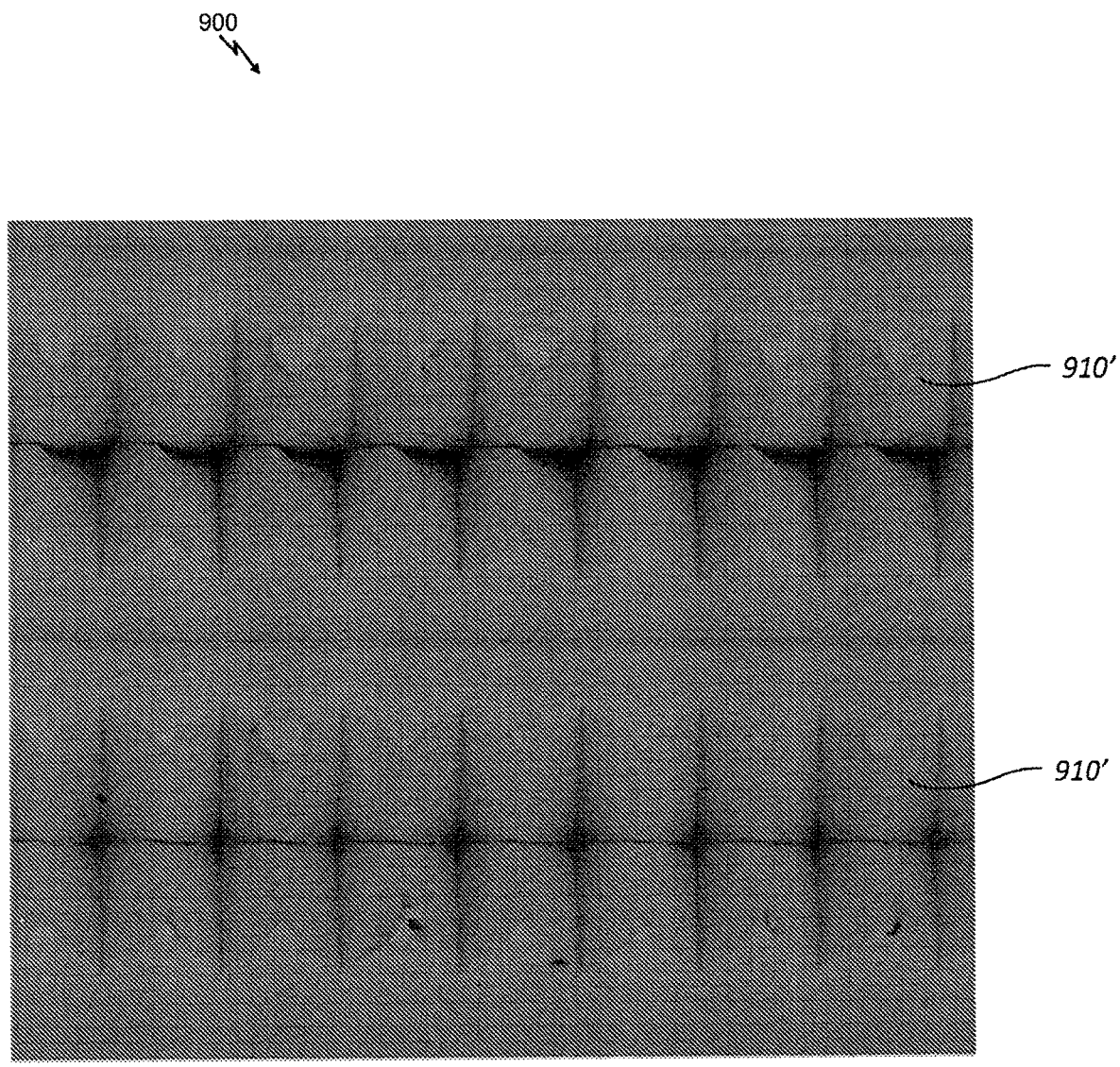
FIG. 9B shows an SEM photograph of the structured surface analogous to the view shown in FIG. 9A of a commercially available microprismatic sheeting article.

FIG. 9A shows an SEM photograph of the structured surface of an example article 300 embodiment of the disclosure analogous to the article 300 embodiment discussed in the context of FIG. 3A-3E. FIG. 9B shows an SEM photograph of the structured surface analogous to the view shown in FIG. 9A of commercially available microprismatic sheeting article 900 (Avery Dennison Corporation of Pasadena, Calif. sold under the product name OmniCube™ T-11000 Series).

FIGS. 9A and 9B respectively show SEM photographs of the structured surface of the polycarbonate microprismatic sheeting sample article 300 of preceding example and a comparative sample of a commercially available microprismatic sheeting article 900. Both SEM photographs were taken using a Zeiss Axial Vision scanning-electron microscope, and prior to inspection with the SEM equipment, the structured surface of each was coated a 4.2 nm gold-palladium coating to prevent over-charging of the samples during inspection.

The SEM photograph of FIG. 9A depicts an array of microprisms 910 for the article 300 of the present disclosure arranged as symmetrically opposite matched pairs 920. The photo further shows the first lateral face 917, second lateral face 918, and third lateral face 919 of each microprism 910. As can be seen, there are no seams or gaps between any of the microprisms 910. Instead, the continuous surface transition 925 is visible between the second lateral face 918 and the third lateral face 919 of adjacent microprisms 910 within each symmetrically opposite matched pair 920. Conversely, however, FIG. 9B depicts the comparative material, which appears to have been manufactured through laminae techniques as described above. Unlike the example sample article of the present disclosure depicted in FIG. 9A, the commercial sheeting article 900 has small gaps and seams that are clearly visible between opposing microprisms (e.g., microprisms 910').

Claim Concepts 1

1. A method 100, comprising:
  manufacturing an article 200, (step 102), including:
    providing a substrate 205 having a surface 206 (step 105);
    forming a first set 212 of first grooves 214 in the surface 206 (step 110), wherein:
      the first grooves 214 are parallel to each other along a same first direction 220 across the surface 206, and
      each of the first grooves 214 include a repeating interleaved pattern of at least two first zones 222 and at least two second zones 223, wherein a maximum depth $Z_T$ of the first zones 222 is greater than a maximum depth $Z_S$ of the second zones 223; and
    forming a second set 235 of second grooves 240 in the surface 206 (step 112), wherein:
      the second grooves 240 are parallel to each other along a same second direction 250 across the surface 206, the second direction 250 being substantially perpendicular to the first direction 220, and
      the second grooves 240 pass through the second zones 223 of the first grooves 214, wherein a groove pattern 255 is thereby formed on the surface 206, the groove pattern 255 including microprisms 256.

2. The method of Claim 1, wherein the providing of the substrate includes providing a monolithic block substrate.

3. The method of Claim 1, wherein the article 200 is configured as a master mold.

4. The method of Claim 1, further including forming a replicate article 260, using the article 200 configured as a master mold, the replicate article 260 having an inverted copy of the grooved pattern 255 on a surface 262 of a replicate substrate 263 of the replicate article 260 (step 115).

5. The method of Claim 1, wherein the forming of the first zones 222 of the first grooves 214 includes moving a first cutting tool 264 through the surface 206 in a repeating rising and diving motion along a third direction 266 and the moving is also along the first direction 220, wherein the third direction 266 is perpendicular to the first direction 220 and to the second direction 250 (step 120).

6. The method of Claim 1, wherein the forming of the first zones 222 of the first grooves 214 includes forming a dive section 268 and a rise section 269. (step 125)

7. The method of Claim 6, wherein the dive section 268 is formed at a dive angle, α, having a value in a range from about 5° to about 50° and the rise section 269 is formed at a rise angle, β, having a value in a range from about 5° to about 50°.

8. The method of Claim 7, wherein the dive angle, α, is about equal to the rise angle, β.

9. The method of Claim 7, wherein the dive angle, α, is within 1° of the rise angle, β.

10. The method of Claim 7, wherein the dive angle, α, has a value in a range from about 5.26° to about 35.25°.

11. The method of Claim 7, wherein the dive angle, α, has a value in a range from about 18.26° to about 32.26°.

12. The method of Claim 6, wherein the forming of the first zones 222 of the first grooves 214 includes forming a transition section 270 located between the dive section 268 and the rise section 269. (step 130)

13. The method of Claim 12, wherein the transition section 270 includes a curved surface 271 located along a groove base surface 272 of the first groove 214.

14. The method of Claim 13, wherein the curved surface 271 has a radius 273 in a range from about 1 micron to about 50 microns.

15. The method of Claim 13, wherein the curved surface 271 has a radius 273 in a range from 1 micron to about 25 microns.

16. The method of Claim 13, wherein the curved surface has a radius 273 in a range from about 1 micron to about 10 microns.

17. The method of Claim 1, wherein the first grooves 214 have a V-shape with a constant vertical included angle, θ.

18. The method of Claim 17, wherein the constant vertical included angle, θ, is a value in a range from about 65° to about 90°.

19. The method of Claim 17, wherein the constant vertical included angle, θ, is a value in a range from about 78.47° to about 90°.

20. The method of Claim 17, wherein the constant vertical included angle, θ, is a value in a range from about 80° to about 87°.

21. The method of Claim 1, wherein the maximum depth $Z_T$ of the first zones 222 of the first grooves 214 is a value in a range from about 10 microns to about 1000 microns.

22. The method of Claim 1, wherein the maximum depth $Z_T$ of the first zones 222 of the first grooves 214 is a value in a range from about 20 microns to about 250 microns.

23. The method of Claim 1, wherein the forming of the first set 212 of the first grooves 214 includes using a first cutting tool having a first cutting angle θ, and, the forming of the second set 235 of the second grooves 240 includes using a second cutting tool having a second cutting angle φ, wherein the value of the first cutting angle θ is different than value of the second cutting angle φ.

24. The method of Claim 1, wherein the forming of the second set 235 of the second grooves 240 includes removing at least portions of the second zones 223 of the first grooves 214. (step 140)

25. The method of Claim 1, wherein the maximum depth, $Z_C$, of each of the second grooves 240 are substantially a same depth as each other.

26. The method of Claim 1, wherein the maximum depth of $Z_C$ of the second grooves 240 are greater than the maximum depth $Z_T$ of the first zones 222 of the first grooves 214.

27. The method of Claim 1, wherein the maximum depth, $Z_C$, of the second grooves 240 are less than the maximum depth $Z_T$ of the first zones 222 of the first grooves 214.

28. The method of Claim 1, wherein the forming of the first set 212 of the first grooves 214 includes forming at least a first subset 212A of first subset grooves 214A and a second subset 212B of second subset grooves 214B, wherein the first subset grooves 214A have a constant vertical included angle, $θ_A$, that is greater than a constant vertical included angle, $θ_B$, of the second subset grooves 214B. (step 135)

29. The method of Claim 28, wherein the first subset grooves 214A alternates with the second subset grooves 214B across the top surface 206 in the second direction 250.

30. The method of Claim 28, where the first subset grooves 214A and the second subset grooves 214B are formed using two different cutting tools 264a, 264b, where each cutting tool has a different cutting angle.

Claim Concepts 2
1. An article 200, comprising:
a substrate 205 having a surface 206 with a groove pattern 255 including microprisms 256 thereon, wherein:
the groove pattern 255 includes a first set 212 of first grooves 214 intersecting with a second set 235 of second grooves 240;
the first grooves 214 are parallel to each other along a same first direction 220 across the groove pattern 255, and each of the first grooves 214 include a plurality of repeating variable depth zones 280, each of the variable depth zones 280 including:
a dive section 268 having a first maximum depth, $Z_{D2}$, and
a rise section 269 having a second maximum depth, $Z_{R2}$; and
the second grooves 240 are parallel to each other along a same second direction 250 across the surface, the second direction 250 being substantially perpendicular to the first direction 220.

2. The article of Claim 1, wherein the first grooves 214 are V-shaped grooves and the second grooves 240 are V-shaped grooves.

3. The article of Claim 1, wherein the substrate 205 is a monolithic block substrate.

4. The article of Claim 1, wherein microprisms 256 are reduced inactive area microprisms.

5. The article of Claim 1, wherein the article is a configured as a master mold.

6. The article of Claim 1, wherein the article is configured as a cylindrical tooling.

7. The article of Claim 1, wherein each of the variable depth zones 280 further includes a transition section 270 located between the dive section 268 and the rise section 269.

8. The article of Claim 7, wherein the transition section 270 includes a continuous surface transition 274 between the dive section 268 and the rise section 269.

9. The article of Claim 7, wherein the transition section 270, includes a transition entrance 282, a transition exit 284, and a third maximum depth $Z_F$ there-between.

10. The article of Claim 9, wherein the transition entrance 282 is adjacent to the dive section 268 at the location of the first maximum depth $Z_{D2}$ and the transition exit 284 is adjacent to the rise section 269 at the location of the second maximum depth $Z_{R2}$.

11. The article of Claim 7, wherein the transition section 270 includes a curved surface 271 located along a groove base surface 272 of the first groove 214.

12. The article of Claim 11, wherein the curved surface 271 has a radius r in a range from about 1 micron to about 50 microns.

13. The article of Claim 11, wherein the curved surface 271 has a radius r in a range from 1 micron to about 25 microns.

14. The article of Claim 11, wherein the curved surface has a radius r in a range from about 1 micron to about 10 microns.

15. The article of Claim 1, wherein adjacent pairs 290 of the microprisms 256 are arranged as symmetrically opposite matched pairs of microprisms.

16. The article of Claim 1, wherein the first grooves 214 have a V-shape with a constant vertical included angle, θ, value in a range from about 65° to about 90°.

17. The article of Claim 1, wherein the first grooves 214 have a V-shape with a constant vertical included angle, θ, value in a range from about 78.47° to about 90°.

18. The article of Claim 1, wherein the first grooves 214 have a V-shape with a constant vertical included angle value, θ, in a range from about 80° to about 87°.

19. The article of Claim 1, wherein the first maximum depth, $Z_{D2}$ or the second maximum depth, $Z_{R2}$ of the first grooves 214 have a value in a range from about 10 microns to about 1000 microns.

20. The article of Claim 1, wherein the first maximum depth, $Z_{D2}$ or the second maximum depth, $Z_{R2}$ of the first grooves 214 have a value in a range from about 20 microns to about 250 microns.

21. The article of Claim 9, wherein the third maximum depth $Z_F$ of the first grooves 214 has a value in a range from about 10 microns to about 1000 microns.

22. The article of Claim 9, wherein the third maximum depth $Z_F$ of the first grooves 214 has a value in a range from about 20 microns to about 250 microns.

23. The article of Claim 1, wherein the dive section 268 has a dive angle a value in a range from about 5° to about 50°

24. The article of Claim 1, wherein the dive section 268 has a dive angle a value in a range from about 5.26° to about 35.25°.

25. The article of Claim 1, wherein the dive section 268 has a dive angle α value in a range from about 18.26° to about 32.26°.

26. The article of Claim 1, wherein the first set 212 of the first grooves 214 includes at least a first subset 212A of first subset grooves 214A and a second subset 212B of second subset grooves 214B, wherein the first subset grooves 214A have a constant vertical included angle, $θ_A$, that is greater than a constant vertical included angle, $θ_B$, of the second subset grooves 214B.

27. The article of Claim 26, wherein the first groove subset 214A alternates with the second groove subset 214B across top surface 206 in the second direction 250.

28. The article of Claim 26, wherein a quaternary set 291 of the microprisms 256 are arrange as a quaternary set of symmetrically opposite matched microprisms.

29. The article of Claim 26, wherein the first subset grooves 214A and the second subset grooves 214B each include a transition section 270 located between the dive section 268 and the rise section 269, the transition section 270 including a transition entrance 282, a transition exit 284, and a third maximum depth $Z_{FA}$ and $Z_{FB}$, respectively, wherein the third maximum depth $Z_{FA}$ of the first subset grooves 214A is greater than the third maximum depth $Z_{FB}$ of the second subset grooves 214B.

30. The article of Claim 1, wherein each of the second grooves 240 have substantially a same maximum depth $Z_C$.

31. The article of Claim 9, wherein the maximum depth $Z_C$ of each of the second grooves 240 is greater than the third maximum depth $Z_F$ of the transition section 270.

32. The article of Claim 9, wherein the maximum depth $Z_C$ of each of the second grooves 240 is less than the third maximum depth $Z_F$ of the transition section 270.

33. The article of Claim 1, wherein the substrate 205 is a polymeric film.

34. The article of Claim 1, wherein the article 200 is configured as retroreflective sheeting.

Claim Concepts 3
1. An article 300, comprising:
a transparent sheet 302 having a first side 304 with a structured surface 306, wherein:
the structured surface 306 includes microprisms 310 thereon, the microprisms 310 being part of a microprism array 312 on the structured surface 306; and each one of the microprisms 310 are part of adjacent pairs 314 of the microprisms 310A, 310B, such that for each one of the adjacent pairs 314:

the first microprism 310A has a first lateral face 317A, a second lateral face 318A, and a third lateral face 319A, the second microprism 310B has a first lateral face 317B, a second lateral face 318B, and a third lateral face 319B, and there is a continuous surface transition 320 between the second lateral face 318A of the first microprism 310A and the third lateral face 319B of the second microprism 310B.

2. The article of Claim 1, wherein the transparent sheet 302 includes a second side 322 opposite the first side 304, the second side 322 having a substantially smooth and planar second surface 324.

3. The article of Claim 1, wherein a thickness 327 of the transparent sheet 302 from the apex 350 of the microprisms 310 on the structured surface 306 to the opposite surface 324 is a value in a range from about 50 microns to 1000 microns.

4. The article of Claim 1, wherein the microprisms 310 on the structured surface 306 are reduced inactive area microprisms.

5. The article of Claim 1, wherein the microprisms 310A, 310B of the adjacent pairs 314 are arranged as symmetrically opposite matched pairs of microprisms.

6. The article of Claim 1, wherein the first microprism 310A is a mirror image of the second microprism 310B.

7. The article of Claim 1, wherein each of the lateral faces (317, 318, 319) of each microprism 310 are angularly aligned relative to the second surface 324 such that an inclination angle ε for each of the lateral faces (317, 318, 319) is equal a value in a range from about 5° to about 50°.

8. The article of Claim 1, wherein the continuous surface transition 320 includes having a curved surface 328.

9. The article of Claim 8, wherein the curved surface 328 has a radius value, r, in a range from about 1 micron to about 50 microns.

10. The article of Claim 8, wherein the curved surface 328 has a radius value, r, in a range from about 1 micron to about 25 microns.

11. The article of Claim 8, wherein the curved surface 338 has a radius value, r, in a range from about 1 micron to about 10 microns.

12. The article of Claim 1, wherein each of the microprisms 310 are configured as one of backward-tilted, forward-tilted, or equilateral microprisms.

13. The article of Claim 1, wherein at least some of the microprisms 310 are configured as sideways-tilted microprisms.

14. The article of Claim 1, wherein a surface area of each second lateral face 318 and a surface area of each third lateral face 319 are about equal to each other.

15. The article of Claim 1, wherein two adjacent pairs 314A, 314B of microprisms 310 form a quaternary set 340 of symmetrically opposite matched microprisms, wherein the quaternary set 340 includes the first microprism 310A, the second microprism 310B, a third microprism 310C, and a fourth microprism 310D, wherein:

the third microprism 310C has a first lateral face 317C, a second lateral face 318C, and a third lateral face 319C;

the fourth microprism 310D has a first lateral face 319D, a second lateral face 318D, and a third lateral face 319D; and there is a continuous surface transition 320' between the second lateral face 318C of the third microprism 310C and the third lateral face 319D of the fourth microprism 310D.

16. The article of Claim 15, wherein:

a surface area of the second lateral face 318C of the third microprism 310C and a surface area of the third lateral face 319D of the fourth microprism 310D are about equal to each other; and a surface area of the second lateral face 318C of the third microprism 310C and a surface area of the third lateral face 319C of the third microprism 310C are not equal to each other.

17. The article of Claim 15, wherein the first microprism 310A is a mirror image of the third microprism 310C and the third microprism 310C is a mirror image of the fourth microprism 310D.

Claim Concepts 4

1. An article 400, comprising:

a substrate 405 having a structured surface 407, wherein:

the structured surface 407 includes an array 408 of microprisms 410 thereon, the microprisms 410 being part of the microprism array 408 on the structured surface 407; and the microprism array 408 includes a first microprism subarray 408A and a second microprism subarray 408B, wherein:

the first subarray 408A includes a first microprism 410A and a second microprism 410B, the first microprism 410A having a first lateral face 417A, a second lateral face 418A, and a third lateral face 419A, the second microprism 410B having a first lateral face 417B, a second lateral face 418B, and a third lateral face 419B, there is a continuous surface transition 420 between the second lateral face 418A of the first microprism 410A and the third lateral face 419B of the second microprism 410B, the second subarray 408B includes a third microprism 410C and a fourth microprism 410D, the third microprism 410C having a first lateral face 417C, a second lateral face 418C, and a third lateral face 419C, the fourth microprism 410D having a first lateral face 417D, a second lateral face 418D, and a third lateral face 419D, there is a continuous surface transition 420' between the second lateral face 418C of the third microprism 410C and the third lateral face 419D of the fourth microprism 410D, and an inclination angle $\varepsilon_{1A}$ of the first lateral face 417A of the first microprism 410A is greater than an inclination angle $\varepsilon_{1C}$ of the first lateral face 417C of the third microprism 410C.

2. The article of Claim 1, wherein the first microprism 410A is a mirror image of the second microprism 410B and the third microprism 410C is a mirror image of the fourth microprism 410D.

3. The article of Claim 1, where in the microprisms 410 are reduced inactive area microprisms.

4. The article of Claim 1, wherein the inclination angle $\varepsilon_{1A}$ of the first lateral face 417A of the first microprism 410A and the inclination angle $\varepsilon_{1C}$ of the first lateral face 417C of the third microprism 410C both have values in a range from about 5° to about 50°.

5. The article of Claim 1, wherein the inclination angle $\varepsilon_{1A}$ of the first lateral face 417A of the first microprism 410A and the inclination angle $\varepsilon_{1C}$ of the first lateral face 417C of the third microprism 410C both have values in a range from about 5° to about 35°.

6. The article of Claim 1, wherein the inclination angle $\varepsilon_{1A}$ of the first lateral face 417A of the first microprism 410A and the inclination angle $\varepsilon_{1C}$ of the first lateral face 417C of the third microprism 410C range both have values in a range from about 18° to about 32°.

7. The article of Claim 1, wherein the inclination angle $\varepsilon_{1A}$ of the first lateral face 417A of the first microprism 410A is at least 2° greater than the inclination angle $\varepsilon_{1C}$ of the first lateral face 417C of the third microprism 410C.

8. The article of Claim 1, wherein the inclination angle $\varepsilon_{1A}$ of the first lateral face 417A of the first microprism 410A is at least 5° greater than the inclination angle $\varepsilon_{1C}$ of the first lateral face 417C of the third microprism 410C.

9. The article of Claim 1, wherein each of the first microprism subarrays 408A of the microprism array 408 consists of the first microprism 410A and the second microprism 410B, and, each of the second microprism subarrays 408B of the microprism array 408 consists of the third microprism 410C and the fourth microprism 410D.

10. The article of Claim 1, wherein the microprisms 410 are configured as one of backward-tilted, forward-tilted, or equilateral microprisms.

11. The article of Claim 1, wherein the first subarrays 408A and the second subarrays 408B are arranged in an alternating pattern across structured surface 407.

12. The article of Claim 1, wherein each of the first subarrays 408A include a first row 430 of pairs of the first microprisms and the second microprisms that are mirror images of each other, and, each of the second subarrays 408B include a second row 432 of pairs of the third microprisms 410C and the fourth microprisms 410D that are mirror images of each other.

13. The article of Claim 1, wherein the continuous surface transition 420 includes a curved surface 428.

14. The article of Claim 13, wherein the curved surface 428 has a radius r value in a range from about 1 micron to about 50 microns.

15. The article of Claim 13, wherein the curved surface 428 has a radius r value in a range from about 1 micron to about 25 microns.

16. The article of Claim 13, wherein the curved surface 428 has a radius r value in a range from about 1 micron to about 10 microns.

17. The article of Claim 1, wherein a height $h_A$ of the first microprism 410A is different than the height $h_C$ of the third microprism 410C.

18. The article of Claim 17, wherein a difference between the height $h_A$ and the height $h_C$ is greater than about 25 microns.

19. The article of Claim 1, wherein the maximum depth $Z_{FA}$ of the microprisms 410A, 410B of the first subarray 408A is different than the maximum depth $Z_{FB}$ of the microprisms 410C, 410D of the second subarray 408B.

20. The article of Claim 19, wherein a difference between the maximum depth $Z_{FA}$ and the maximum depth $Z_{FB}$ is greater than about 25 microns.

21. The article of Claim 1, wherein the substrate 405 is a monolithic block substrate.

22. The article of Claim 1, wherein the substrate is a polymeric film.

23. The article of Claim 1, wherein the article is configured as a master mold.

24. The article of Claim 1, wherein the article is a retroreflective sheeting.

25. The article of Claim 1, wherein each of the first and second microprisms 410A, 410B of the first subarrays 408A are arranged as adjacent pairs 460A of symmetrically opposite matched pairs of microprisms, and each of the third and fourth microprisms 410C, 410D of the second subarrays 408B are arranged as adjacent pairs 460B of symmetrically opposite matched pairs of microprisms.

Claim Concepts 5

1. An article 500, comprising:
   a substrate 505 having a surface 507 with a groove pattern 555 including slightly non-orthogonal microprisms 510 thereon, wherein:
   the groove pattern 555 includes a first set 512 of first grooves 514 intersecting with a second set 535 of second grooves 540, and
   the first grooves 514 are parallel to each other along a same first direction 220 across the groove pattern 555, and each of the first grooves 514 include a set 518 of variable depth zones 580, wherein each of the variable depth zone 580 includes:
   a dive section 568 having a first minimum depth $Z_{D1}$, a first maximum depth $Z_{D2}$, and a first horizontal distance $X_D$,
   a rise section 569 having a second minimum depth $Z_{R1}$, a second maximum depth $Z_{R2}$, and a second horizontal distance $X_R$, and
   a transition section 570 having a transition entrance 584, a transition exit 585, a third maximum depth $Z_F$, wherein the third maximum depth $Z_F$ is greater than both the first minimum depth $Z_{D1}$ and the second minimum depth $Z_{R1}$; and
   the second grooves 540 are parallel to each other along a same second direction 250 across the surface, the second direction 250 being substantially perpendicular to the first direction 220.

2. The article of Claim 1, wherein the first horizontal distance $X_D$ is less than the second horizontal distance $X_R$.

3. The article of Claim 2, wherein a difference between the first horizontal distance $X_D$ and the second horizontal distance $X_R$ is a value between about 1 micron and about 15 microns.

4. The article of Claim 1, wherein the dive section 568 has a dive angle $\alpha$, the rise section 569 has a rise angle $\beta$, and the dive angle $\alpha$ differs from the rise angle $\beta$ by about 0.25° to about 1.0°.

5. The article of Claim 4, wherein the dive angle $\alpha$ is a value in a range from about 5° to about 50°.

6. The article of Claim 1 wherein the dive section 568 has a dive angle $\alpha$ which is less than a corresponding angle of orthogonality 598 by about 0.25° to about 1.0° and the rise section 569 has a rise angle $\beta$ which is greater than a corresponding angle of orthogonality 599 by about 0.25° to about 1.0°.

7. The article of Claim 1, wherein the set 518 of variable depth zones 580 includes two or more subsets 518 of variable depth zones, including a first subset 518A and a second subset 518B, and
   the variable depth zones 580A of the first subset 518A includes:
   the first dive section 568A having a first dive angle $\alpha_A$;
   the first rise section 569A having a first rise angle $\beta_A$; and
   the first transition section 570A located between the first dive section 568A and the first dive section 569A, wherein the first dive angle $\alpha_A$ is about equal to the first rise angle $\beta_A$;

the variable depth zones 580B of the second subset 518B includes:
- the second dive section 568B having a second dive angle $\alpha_B$;
- the second rise section 569B having a second rise angle $\beta_B$;
- the second transition section 570B located between the second dive section 568B and the second dive section 569B, wherein the second dive angle $\alpha_B$ differs from the second rise angle $\beta_B$ by about 0.25° to about 1.0°.

8. The article of Claim 7, wherein the variable depth zones 580A of the first subset 518A and the variable depth zones 580B of the second subset 518B are arranged in an alternating pattern along the first direction 220 of the first grooves 514.

9. The article of Claim 1, wherein the first grooves 514 have a constant vertical included angle θ that differs from a corresponding angle of orthogonality 595 by about 0.25° to about 1.0°.

10. The article of Claim 1, wherein the first grooves 514 have a constant vertical included angle θ that is non-symmetrical relative to the groove base 581 of the first grooves 514.

11. The article of Claim 1, wherein the first grooves 514 have a constant vertical included angle θ between about 65° and about 90°.

12. The article of Claim 1, wherein the first grooves 514 have a constant vertical included angle θ consisting of two half angles δ1 and δ2, wherein the first half angle δ1 is greater than the second half angle δ2 by about 0.25° to about 1.0°.

13. The article of Claim 1, wherein the first grooves 514 have a constant vertical included angle θ consisting of two half angles δ1 and δ2, wherein the first half angle δ1 is less than a corresponding angle of orthogonality 596 by about 0.25° to about 1.0° and second half angle δ2 is greater than a corresponding angle of orthogonality 597 by about 0.25° to about 1.0°.

14. The article of Claim 1, wherein the first set 512 of the first grooves 514 includes two or more subsets 512A, 512B, including a first subset 512A of the first grooves 514A having a first constant vertical included angle $\theta_A$ and a second subset 512B of the first grooves 514B having a second constant vertical included angle $\theta_B$, wherein:
- the first constant vertical included angle $\theta_A$ is symmetrical about a groove base 581A of the first grooves 514A of the first subset 512A, and
- the second constant vertical included angle $\theta_B$ is non-symmetrical about a groove base 581B of the first grooves 514B of the second subset 512B by about 0.25° to about 1.0°.

15. The article of Claim 14, wherein the first grooves 514A of the first subset 512A and the first grooves 514B of the second subset 512B are arranged in an alternating pattern across the groove pattern 555.

16. The article of Claim 1, wherein the first set 512 of first grooves 514 includes two or more subsets 512A, 512B, including:
- a first subset 512A of the first grooves 514A having a first constant vertical included angle $\theta_A$ consisting of two half angles $\delta_{A1}$ and $\delta_{A2}$, and
- a second subset 512B of the first grooves 514B having a second constant vertical included angle $\theta_B$, consisting of two half angles $\delta_{B1}$ and $\delta_{B2}$, wherein:
  - the first half angle $\delta_{A1}$ of the first constant vertical included angle $\theta_A$ is less than a corresponding angle of orthogonality 596A by about 0.25° to about 1.0° and the second half angle $\delta_{A2}$ of the first constant vertical included angle $\theta_A$ is greater than a corresponding angle of orthogonality 597A by about 0.25° to about 1.0°, and
  - the first half angle $\delta_{B1}$ of the second constant vertical included angle $\theta_B$ is greater than a corresponding angle of orthogonality 596B by about 0.25° to about 1.0° and the second half angle $\delta_{B2}$ of the second constant vertical included angle $\theta_B$ is less than a corresponding angle of orthogonality 597B by about 0.25° to about 1.0°.

17. The article of Claim 16, wherein the first grooves 514A of the first subset 512A and the first grooves 514B of the second subset 512B are arranged in an alternating pattern across the groove pattern 555.

18. The article of Claim 16, wherein the first set 512 of the first grooves 514 include a third subset 512C of the first grooves 514C having a third constant vertical included angle $\theta_C$ wherein the third constant vertical included angle $\theta_C$ is symmetrical about a groove base 581C of the first grooves 514C of the third subset 512C.

19. The article of Claim 18, wherein the third constant vertical included angle $\theta_C$ is about equal to a corresponding angle of orthogonality 595C.

20. The article of Claim 18, wherein the first grooves 514A of the first subset 512A, the first grooves 514B of the second subset 512B, and the first grooves 514C of the third subset 512C are arranged in a repeating pattern across the groove pattern 555.

21. The article of Claim 1 wherein the second grooves 540 have a constant vertical included angle ϕ that is non-symmetrical relative to a groove base 582 of the second grooves 540.

22. The article of Claim 1 wherein the second grooves 540 have a constant vertical included angle ϕ between about 10° and about 100°.

23. The article of Claim 1 wherein the second grooves 540 have a constant vertical included angle ϕ that differs from a corresponding angle of orthogonality 553 about 0.25° to about 1.0°.

24. The article of Claim 1, wherein the second grooves 540 have a constant vertical included angle ϕ consisting of two half angles ρ1 and ρ2, and the first half angle ρ1 is greater than the second half angle ρ2 by about 0.25° to about 1.0°

25. The article of Claim 1, wherein the second grooves 540 have a constant vertical included angle ϕ consisting of two half angles ρ1 and ρ2, and the first half angle ρ1 is less than a corresponding angle of orthogonality 557 by about 0.25° to about 1.0° and the second half angle ρ2 is greater than a corresponding angle of orthogonality 558 by about 0.25° to about 1.0°.

26. The article of Claim 1 wherein the set 535 of the second grooves 540 includes:
- a first subset 535A of the second grooves 540A having a first constant vertical included angle $\phi_A$ consisting of two half angles $\rho1_A$ and $\rho2_A$, and
- a second subset 535B of the second grooves 540B having a second constant vertical included angle $\phi_B$ consisting of two half angles $\rho1_B$ and $\rho2_B$, wherein:
  - the first half angle $\rho1_A$ of the first constant vertical included angle $\phi_A$ is less than a corresponding angle of orthogonality 557A by about 0.25° to about 1.0°, the second half angle $\rho2_A$ of the first constant vertical included angle $\phi_A$ is greater than a corresponding angle of orthogonality 558A by about 0.25° to about 1.0°, the first half angle $\rho1_B$ of the second constant vertical included angle $\phi_B$ is greater than a corresponding angle of orthogonality 557B by about 0.25° to about 1.0°, and the second half angle $\rho2_B$ of the second constant vertical included angle $\phi_B$ is less than a corresponding angle of orthogonality 558B by about 0.25° to about 1.0°.

27. The article of Claim 26, wherein the second grooves 540A of the first subset 535A and the second grooves 540B of the second subset 535B are arranged in an alternating pattern across the groove pattern 555.

28. The article of Claim 26, wherein the set 535 of the second grooves 540 includes a third subset 535C of the second grooves 540C having a third constant vertical included angle $\phi_C$ that is symmetrical about a groove base 582C of the second grooves 540C.

29. The article of Claim 28, wherein the third constant vertical included angle $\phi_C$ is about equal to a corresponding angle of orthogonality 553C.

30. The article of Claim 28, wherein the second grooves 540A of the first subset 535A, the second grooves 540B of the second subset 535B, and the third grooves 540C of the third subset 535C are arranged in a repeating pattern across the groove pattern 555.

31. The article of Claim 1, wherein the second set 535 of the second grooves 540 includes a first subset 535A of the second grooves 540A having a first constant vertical included angle $\phi_A$ and a second subset 535B of second grooves 540B having a second constant vertical included angle $\phi_B$, wherein:

the first constant vertical included angle $\phi_A$ is symmetrical about the groove base 582A of the second grooves 540A, and the second constant vertical included angle $\phi_B$ is non-symmetrical about the groove base 582B of the first grooves 540B by about 0.25° to about 1.0°.

32. The article of Claim 31, wherein the second grooves 540A of the first subset 535A and the second grooves 540B of the second subset 535B are arranged in an alternating pattern across the groove pattern 555.

33. The article of Claim 1, wherein the transition section 570 includes a continuous surface transition 520 between the dive sections 568 and rise sections 569.

34. The article of Claim 1, wherein the transition section 570 includes a curved surface 571 located along groove base 581 of the first grooves 514.

35. The article of Claim 34, wherein the curved surface 571 has a radius, r, in a range from about 1 micron to about 50 microns.

36. The article of Claim 34, wherein the curved surface 571 has a radius, r, in a range from about 1 micron to about 25 microns.

37. The article of Claim 34, wherein the curved surface 571 has a radius, r, in a range from about 1 micron to about 10 microns.

38. The article of Claim 1, wherein the substrate is a monolithic block substrate.

39. The article of Claim 1, wherein the substrate is a polymeric film.

40. The article of Claim 1, wherein the article is configured as a master mold.

41. The article of Claim 1, wherein the article is a retroreflective sheeting.

Claim Concepts 6

1. An article 600, comprising:
a substrate 605 having a structured surface 607, with slightly non-orthogonal microprisms 610 thereon, wherein:

the structured surface 607 includes a first set 612 of first grooves 614 about aligned along a first direction 220 and intersecting with a second set 635 of second grooves 640 about aligned along a second direction 250;

each of the first grooves 614 include a set 618 of variable depth zones 680, each variable depth zone 680 including:

a dive section 668 having a first minimum depth $Z_{D1}$ and a first maximum depth $Z_{D2}$, a rise section 669 having a second minimum depth $Z_{R1}$ and a second maximum depth $Z_{R2}$, and a transition section 670 located between the dive section 668 and rise section 669, wherein the transition section 670 includes a continuous surface transition 674 between the dive section 668 and rise section 669; and the first direction 220 is substantially perpendicular to the second direction 250; and at least a portion 629 of the first grooves 614 are aligned along a non-parallel skewed first direction 620 as compared to the first direction 220, wherein a skew angle $\psi$ between the first direction 220 and the skewed first direction 620 is less than 2°, or, at least a portion 630 (FIG. 6D) of the second grooves 640 are aligned along a non-parallel skewed second direction 650 as compared to the second direction 250 wherein a skew angle $\tau$ between the second direction 250 and the skewed second direction 650 is less than 2°.

2. The article of Claim 1, wherein the intersection between the at least portion 629 of the first grooves 614 and the at least portion 630 of the second grooves 640 are non-perpendicular up to about 2°.

3. The article of Claim 1, wherein:
the set 618 of variable depth zones 680 includes first and second subsets 618A, 618B of variable depth zones 680A, 680B, the skewed first direction 620 includes first and second sub skewed first directions 620A, 620B, the first grooves 614 of the first subset 618A have a first groove base 681A aligned in the first sub skewed first direction 620A, the first grooves 614 of the second subset 618B have a second groove base 681B aligned in the second sub skewed first direction 620B, and the first sub skewed first direction 620A and the second sub skewed first direction 620B are non-parallel to each other.

4. The article of Claim 3, wherein the first sub skewed first direction 620A is non-perpendicular to the second direction 250 by a skew angle $\chi_A$ equal to 90°±2° and skew angle $\chi_A$ is not equal to 90°±0.1°.

5. The article of Claim 4, wherein the second sub skewed first direction 620B is perpendicular to the second direction 250 by a non-skewed angle $\chi_B$ equal to 90°±0.1°.

6. The article of Claim 3, wherein the first sub skewed first direction 620A has a counterclockwise rotated non-perpendicular skew angle $\chi_A$ to the second direction 250 and the second sub skewed first direction 620B has a clockwise rotated non-perpendicular skew angle $\chi_B$ to the second direction 250 (FIG. 6B).

7. The article of Claim 6, wherein a magnitude of the skew angle $\psi_A$ between the first direction 220 and the first sub skewed first direction 620A is about equal to a magnitude of the skew angle $\psi_B$ between the first direction 220 and the second sub skewed first direction 620B.

8. The article of Claim 3, wherein the first variable depth zones 680A of the first subset 618A and the second variable depth zones 680B of the second subset 618B are arranged in an alternating pattern.

9. The article of Claim 3, wherein the set 618 of variable depth zones 680 further includes a third subset 618C of third variable depth zones 680C having a third groove base 681C aligned in a third sub skewed first direction 620C, the third sub skewed first direction 620C being non-parallel to both the first sub skewed first direction 620A and the second sub skewed first direction 620B (FIG. 6C).

10. The article of Claim 9, wherein:
the first sub skewed first direction 620A has a counterclockwise rotated non-perpendicular skew angle $\chi_A$ to the second direction 250,
the second sub skewed first direction 620B has a clockwise rotated non-perpendicular skew angle $\chi_B$ to the second direction 250, and
the third sub skewed first direction 620C has a perpendicular non-skewed angle $\chi_C$ to the second direction 250.

11. The article of Claim 10, wherein a magnitude of the skew angle $\psi_A$ between the first direction 220 and the first sub skewed first direction 620A is about equal to a magnitude of the skew angle $\psi_B$ between the first direction 220 and the second sub skewed first direction 620B.

12. The article of Claim 10, wherein the first variable depth zones 680A of the first subset 618A, the second variable depth zones 680B of the second subset 618B, and the third variable depth zones 680C of the third subset 618C are arranged in a repeating pattern.

13. The article of Claim 1, wherein the at least the portion 630 of the second grooves 640 are non-parallel to the second direction 250 by a skew angle $\tau$ of up to 2°.

14. The article of Claim 1, wherein the second set 635 of second grooves 640 includes two or more subsets 635A, 635B, the first subset 635A of the second grooves 640A aligned in a first sub skewed second direction 650A and the second subset 635B of the second grooves 640B aligned in a second sub skewed second direction 650B, wherein first sub skewed second direction 650A is non-parallel to the second sub skewed second direction 650B.

15. The article of Claim 14, wherein the first sub skewed second direction 650A is non-parallel to the second direction 250 by a skew angle $\tau_A$ of up to 2°.

16. The article of Claim 15, wherein the second sub skewed second direction 650B is parallel to the second direction 250.

17. The article of Claim 14, wherein the alignment of the first sub skewed second direction 650A is rotated clockwise by a skew angle $\tau_A$ up to 2° from a parallel alignment with the second direction 250 and the alignment of the second sub skewed second direction 650B is rotated counterclockwise by a skew angle $\tau_B$ up to 2° from a parallel alignment with the second direction 250.

18. The article of Claim 17, wherein a magnitude of the skew angle $\tau_A$ is about equal to a magnitude of the skew angle $\tau_B$.

19. The article of Claim 17, wherein the second grooves 640A of the first subset 635A and the second grooves 640B of the second subset 635B are arranged in an alternating pattern.

20. The article of Claim 14, wherein the set 635 of second grooves 640 further includes a third subset 635C of second grooves 640C aligned in a third sub skewed second direction 650C, wherein the third sub skewed second direction 650C is non-parallel to both the first sub skewed second direction 650A and the second sub skewed second direction 650B (FIG. 6G).

21. The article of Claim 20, wherein
the alignment of the first sub skewed second direction 650A is rotated clockwise by a skew angle $\tau_A$ up to 2° from a parallel alignment with the second direction 250;
the alignment of the second sub skewed second direction 650B is rotated counterclockwise by a skew rotation angle $\tau_B$ up to 2° from a parallel alignment with the second direction 250; and
the third sub skewed second direction 650C is substantially parallel to the second direction 250.

22. The article of Claim 21, wherein a magnitude of the skew rotation angle $\tau_A$ is equal to a magnitude of the skew angle $\tau_B$.

23. The article of Claim 21, wherein the second grooves 640A of the first subset 635A, the second grooves 640B of the second subset 635B, and the second groove 640C of the third subset 635C are arranged in a repeating pattern.

24. The article of Claim 1, wherein the substrate is a monolithic block substrate.

25. The article of Claim 1, wherein the article is configured as a master mold to make replica article copies of the article.

26. The article of Claim 1, wherein the substrate is a polymeric film substrate.

27. The article of Claim 1, wherein the article is a retroreflective sheet.

Claim Concept 7

1. An article 260, comprising:
a substrate 263 having a surface 262 with an inverted groove pattern 261 containing inverted microprisms 256', wherein:
the inverted groove pattern 261 is a mirror image of a groove pattern 255 of a master mold article 200, the master mold article 200 having master mold substrate surface 206 with a groove pattern 255 including microprisms 256 thereon, wherein:
the groove pattern 255 includes a first set 212 of first grooves 214 intersecting with a second set 235 of second grooves 240;
the first grooves 214 are parallel to each other along a same first direction 220 across the groove pattern 255, and each of the first grooves 214 include a plurality of repeating variable depth zones 280, each of the variable depth zones 280 including:
a dive section 268 having a first maximum depth, $Z_{D2}$,
a rise section 269 having a second maximum depth, $Z_{R2}$; and
a transition section 270 located between the dive section 268 and the rise section 269; and
the second grooves 240 are parallel to each other along a same second direction 250 across the surface, the second direction 250 being substantially perpendicular to the first direction 220.

2. The article of Claim 1, wherein the inverted microprisms 256' are inverted reduced inactive area microprisms.

3. The article of Claim 1, wherein adjacent pairs of the inverted microprisms 256' are arranged as symmetrically opposite matched pairs of inverted microprisms 256' corresponding to mirror images of adjacent pairs 290 of the microprisms 256 of the master mold article 200 arranged as symmetrically opposite matched pairs of the microprisms 256.

4. The article of Claim 1, wherein the inverted groove pattern 261 includes an inverted transition section, corresponding to a mirror image of the transition section 270, the inverted transition section including an inverted continuous surface transition corresponding to a mirror image of a continuous surface transition 274 between the dive section 268 and rise section 269 of the groove pattern 255 of the master mold article 200.

5. The article of Claim 1, wherein the inverted groove pattern 261 includes an inverted transition section, corresponding to a mirror image of the transition section 270, the inverted transition section including an inverted curved surface corresponding to a mirror image of a curved surface 271 located along a groove base surface 272 of the first groove 214 of the master mold article 200.

6. The article of Claim 5, wherein the inverted curved surface has a radius r in a range from about 1 micron to about 50 microns.

7. The article of Claim 5, wherein the inverted curved surface has a radius r in a range from about 1 micron to about 25 microns.

8. The article of Claim 5, wherein the inverted curved surface has a radius r in a range from about 1 micron to about 10 microns.

9. The article of Claim 1, wherein the inverted groove pattern 261 includes an inverted dive section, corresponding to a mirror image of the dive section 268 of the master mold article 200, the inverted dive section has a dive angle α' value in a range from about 5° to about 50°.

10. The article of Claim 1, wherein the inverted groove pattern 261 includes an inverted dive section, corresponding to a mirror image of the dive section 268 of the master mold article 200, the inverted dive section has a dive angle α' value in a range from about 5.26° to about 35.25°.

11. The article of Claim 1, wherein the inverted groove pattern 261 includes an inverted dive section, corresponding to a mirror image of the dive section 268 of the master mold article 200, the inverted dive section has a dive angle α' value in a range from about 18.26° to about 32.26°.

12. The article of Claim 1, wherein the surface 262 of the substrate 263 includes a specularly reflective surface.

13. The article of Claim 12, wherein the specularly reflective surface consists of a metallic material.

14. The article of Claim 13, where the metallic material is selected from the group consisting of nickel, cobalt, aluminum, silver, gold, copper, brass, bronze, or alloys thereof.

15. The article of Claim 1, wherein the article 260 is configured as a retroreflector.

16. The article of Claim 1, wherein the substrate is a polymeric material.

17. The article of Claim 1, wherein the substrate is a metallic material.

Those skilled in the art to which this application relates will appreciate that other and further additions, deletions, substitutions and modifications may be made to the described embodiments.

The invention claimed is:

1. A method, comprising:
   manufacturing an article, including:
   providing a substrate having a surface;
   forming a first set of first grooves in the surface, including moving a cutting tool through the surface in a repeating rising and diving motion along a first direction across the surface to form first zones of the first grooves with alternating dive sections and rise sections, wherein:
   the first grooves are parallel to each other along the same first direction across the surface,
   each of the first grooves include a repeating interleaved pattern of at least two first zones and at least two second zones, wherein a maximum depth $Z_T$ of the first zones is greater than a maximum depth $Z_S$ of the second zones, and
   each of the first zones of the first grooves include the rise section formed by the rising motion, the dive section formed by the diving motion, and a transition section located between the dive section and the rise section, wherein:
   the transition section entrance occurs at a depth equal to the maximum depth $Z_{D2}$ of the dive section,
   the transition section exit occurs at a depth equal to the maximum depth $Z_{R2}$ of the rise section, and
   the transition section includes a continuous surface transition between the dive section and the rise section to maintain surface continuity between the dive sections and rise sections without the presence of a seam, ridge, gap or tooling line; and
   forming a second set of second grooves in the surface, wherein:
   the second grooves are parallel to each other along a same second direction across the surface, the second direction being substantially perpendicular to the first direction such that an intersection of the first and second directions of the first and second grooves form an angle of 90±1 degrees, and
   the second grooves pass through the second zones of the first grooves, wherein a groove pattern is thereby formed on the surface, the groove pattern including microprisms.

2. The method of claim 1, wherein the providing of the substrate includes providing a monolithic block substrate.

3. The method of claim 1, wherein the article is configured as a master mold.

4. The method of claim 1, further including forming a replicate article, using the article configured as a master mold, the replicate article having an inverted copy of the grooved pattern on a surface of a replicate substrate of the replicate article.

5. The method of claim 1, wherein the forming of the first zones of the first grooves includes moving the cutting tool through the surface in a repeating rising and diving motion along a third direction, wherein the third direction is perpendicular to the first direction and to the second direction.

6. The method of claim 1, wherein the dive section is formed at a dive angle, α, having a value in a range from about 5° to about 50° and the rise section is formed at a rise angle, β, having a value in a range from about 5° to about 50°.

7. The method of claim 6, wherein the dive angle, α, is about equal to the rise angle, β.

8. The method of claim 6, wherein the dive angle, α, is within 1° of the rise angle, β.

9. The method of claim 1, wherein the continuous surface transition includes a curved surface located along the first direction along a groove base surface of the first groove.

10. The method of claim 9, wherein the curved surface has a radius in a range from about 1 micron to about 50 microns.

11. The method of claim 1, wherein the forming of the first set of the first grooves includes using the cutting tool having a first cutting angle θ, and, the forming of the second set of the second grooves includes using a second cutting tool having a second cutting angle φ, wherein the value of the first cutting angle θ is different than value of the second cutting angle φ.

12. The method of claim 1, wherein the forming of the second set of the second grooves includes removing at least portions of the second zones of the first grooves.

13. The method of claim 1, wherein the maximum depth of $Z_C$ of the second grooves are greater than the maximum depth $Z_T$ of the first zones of the first grooves.

14. The method of claim 1, wherein the maximum depth, $Z_C$, of the second grooves are less than the maximum depth $Z_T$ of the first zones of the first grooves.

15. The method of claim 1, wherein each of the first grooves are formed by moving the cutting tool through the substrate surface in a continuous motion across an entire length of the substrate surface.

\* \* \* \* \*

UNITED STATES PATENT AND TRADEMARK OFFICE
CERTIFICATE OF CORRECTION

PATENT NO. : 11,351,745 B2
APPLICATION NO. : 17/298821
DATED : June 7, 2022
INVENTOR(S) : Drew J. Buoni It is certified that error appears in the above-identified patent and that said Letters Patent is hereby corrected as shown below:

In the Specification

In Column 6, Line 49, after --perpendicular to the-- delete "first" and insert --second--

In Column 7, Line 40, after --included angle-- delete "$\theta_A$" and insert --$\theta_B$--

In Column 19, Line 27, after --percentage of 90%-- delete "of" and insert --or--

In Column 37, Line 12, after --fourth microprisms 410C,-- delete "401D" and insert --410D--

In Column 42, Line 19, after --and the first-- delete "dive" and insert --rise--

In Column 42, Line 27, after --second-- delete "dive" and insert --rise--

In Column 44, Line 49, after --having a-- delete "fist" and insert --first--

In Column 44, Line 56, after --the-- delete "first grooves" and insert --second grooves--

In Column 60, Line 65, after --first-- delete "dive section 569A" and insert --rise section 569A--

In Column 61, Lines 8 and 9, after --second-- delete "dive section 569B" and insert --rise section 569B--

In Column 63, Lines 41 and 42, after --of the-- delete "first grooves" and insert --second grooves--

Signed and Sealed this
Thirty-first Day of January, 2023

Katherine Kelly Vidal
*Director of the United States Patent and Trademark Office*